United States Patent
Ogawa et al.

(10) Patent No.: US 7,698,696 B2
(45) Date of Patent: Apr. 13, 2010

(54) COMPILER APPARATUS WITH FLEXIBLE OPTIMIZATION

(75) Inventors: Hajime Ogawa, Suita (JP); Taketo Heishi, Osaka (JP); Toshiyuki Sakata, Osaka (JP); Shuichi Takayama, Takarazuka (JP); Shohei Michimoto, Takatsuki (JP); Tomoo Hamada, Ibaraki (JP); Ryoko Miyachi, Hirakata (JP)

(73) Assignee: Panasonic Corporation, Osaka (JP)

( * ) Notice: Subject to any disclaimer, the term of this patent is extended or adjusted under 35 U.S.C. 154(b) by 1604 days.

(21) Appl. No.: 10/608,040

(22) Filed: Jun. 30, 2003

(65) Prior Publication Data

US 2004/0098713 A1  May 20, 2004

(30) Foreign Application Priority Data

Jul. 3, 2002  (JP) ............................. 2002-195305

(51) Int. Cl.
G06F 9/45 (2006.01)
G06F 9/44 (2006.01)

(52) U.S. Cl. ........................ 717/151; 717/150; 717/152; 717/153; 717/154; 717/159; 717/160; 717/161; 712/241

(58) Field of Classification Search ........................ None
See application file for complete search history.

(56) References Cited

U.S. PATENT DOCUMENTS

| 5,606,697 A | 2/1997 | Oho |
| 5,748,965 A | 5/1998 | Isozaki |
| 5,799,183 A | 8/1998 | Iwashita |
| 5,930,507 A | 7/1999 | Nakahira et al. |
| 6,064,818 A | 5/2000 | Brown et al. |
| 6,067,542 A | 5/2000 | Cariño, Jr. |

(Continued)

FOREIGN PATENT DOCUMENTS

EP  0 883 060  12/1998

(Continued)

OTHER PUBLICATIONS

Richard M. Stallman, Using and Proting the GNU Compiler Collection for GCC 3.1, Last updated Jun. 22, 2001, Published by the Free Software Foundation, pp. 7-74 and 177-182.*

(Continued)

*Primary Examiner*—Tuan Q Dam
*Assistant Examiner*—Zheng Wei
(74) *Attorney, Agent, or Firm*—Wenderoth, Lind & Ponack, L.L.P.

(57) ABSTRACT

A compiler comprises an analysis unit that detects directives (options and pragmas) from a user to the compiler, an optimization unit that is made up of a processing unit (a global region allocation unit, a software pipelining unit, a loop unrolling unit, a "if" conversion unit, and a pair instruction generation unit) that performs individual optimization processing designated by options and pragmas from a user, following the directives and the like from the analysis unit, etc. The global region allocation unit performs optimization processing, following designation of the maximum data size of variables to be allocated to a global region, designation of variables to be allocated to the global region, and options and pragmas regarding designation of variables not to be allocated in the global region.

10 Claims, 50 Drawing Sheets

U.S. PATENT DOCUMENTS

| | | | |
|---|---|---|---|
| 6,367,067 | B1 | 4/2002 | Odani et al. |
| 6,401,187 | B1 | 6/2002 | Motokawa et al. |
| 6,539,541 | B1 * | 3/2003 | Geva .......................... 717/150 |
| 6,567,895 | B2 | 5/2003 | Scales |
| 6,892,380 | B2 * | 5/2005 | Granston et al. ............ 717/160 |
| 2002/0016887 | A1 | 2/2002 | Scales |
| 2002/0112228 | A1 * | 8/2002 | Granston et al. ............ 717/155 |

FOREIGN PATENT DOCUMENTS

| | | |
|---|---|---|
| EP | 0 883 060 A2 | 12/1998 |
| JP | 63-155264 | 6/1988 |
| JP | 2-41562 | 2/1990 |
| JP | 3-164835 | 7/1991 |
| JP | 6-222928 | 8/1994 |
| JP | 6-290057 | 10/1994 |
| JP | 7-21031 | 1/1995 |
| JP | 7-93269 | 4/1995 |
| JP | 8-101776 | 4/1996 |
| JP | 8-328870 | 12/1996 |
| JP | 9-265402 | 10/1997 |
| JP | 10-91456 | 4/1998 |
| JP | 10-116197 | 5/1998 |
| JP | 10-340193 | 12/1998 |
| JP | 11-73325 | 3/1999 |
| JP | 2001-134446 | 5/2001 |
| JP | 2002-7140 | 1/2002 |
| JP | 2002-7141 | 1/2002 |
| JP | 2002-073579 | 3/2002 |
| WO | 99/30231 | 6/1999 |

OTHER PUBLICATIONS

Hakamura et al., Architecture and Compiler Co-Optimization fo righ Performance Computing, 2002 IEEE, pp. 50-56.*
PRCREF Project—High level design Software Pipelining Branch Optimizations, IBM Israel—Science and Technology, Mar. 5, 1996, pp. 1-18.*
Stephen Prata, The Waite Group's C Primer Plus, Third Edition,Published by Sam's Publishing on Sep. 1998, pp. 576-581.*
Sun WorkShop Compiler C 4.2 Docuemtation: C User's Guide, published by Sun Microsystems, Publication Date 1998, pp. 1-13.*
PGI Workstation User;s Guide, Chapter 9, Optimization Directives and Pragmas, published by the Portian Group Inc., publication date: 2000, pp. 1-14.*
Popovic et al., A C Compiler Design concept Used for MAS FAmily of Digital Signal Processors, published by TELSIKs 2001, pp. 607-610.*
Faraboschi et al., The latest Word in Digital and Media Processing, published by IEEE, publication date 1998, pp. 58-85.*
Richard M. Stallman, Using and Porting the GNU Compiler Collection for GCC 3.1, Last updated Jun. 22, 2001, Published by the Free Software Foundation, pp. 7-74 and 177-182.*
Nakamura et al., Architecture and Compiler Co-Optimization fo righ Performance Computing, 2002 IEEE, pp. 50-56.*
PPCREF Project - High level design Software Pipelining Branch Optimizations, IBM Israel - Science and Technology, Mar. 5, 1996, pp. 1-18.*
Stephen Prata, The Waite Group's C Primer Plus, Third Edition, Published by Sam's Publishing on Sep. 1998, pp. 576-581.*
Sun WorkShop Compiler C 4.2 documentation: C Users Guide, published by Sun Microsystems, Publication Date 1998, pp. 1-13.*
PGI Workstation User's Guide, Chapter 9, Optimization Directives and Pragmas, published by the Portland Group Inc., publication date: 2000, pp. 1-14.*
Popovic et al., A C Compiler Design concept Used for MAS FAmily of Digital Signal Processors, published by TELSIKs 2001, pp. 607-610.*
Faraboschi et al., The lastest Word in Digital and Media Processing, published by IEEE, publication date 1998, pp. 58-85.*
European Search Report mailed Mar. 7, 2008 for European Application No. 03013492.8-2211.
Alverson, G. et al.: "Tera Hardware Software Cooperation" Proceedings of the $2^{nd}$ ACM Workshop On Role-Based Access Control, RBAC '97. Fairfax, VA, Nov. 6-7, 1997, ACM Role-Based Access Control Workshop, New York, NY: ACM. US, Nov. 15, 1997, pp. 38-38, XP010893039.
Hammes, J. et al.: "Loop Fusion and Temporal Common Subexpression Elimination In Window-Based Loops" Parallel and Distributed Processing Symposium, Proceedings $15^{th}$ International, San Francisco, CA, USA Apr. 23-27, 2001, Los Alamitos, CA, USA, IEEE Comput. Soc, US, Apr. 23, 2001, pp. 1433-1440, XP010544553.
Hewlett-Packhard Development Company, L.P.: "New features in HP C for IPF" [Online] 2001, pp. 1-3, XP002470034 Retrieved from the Internet: URL:http://docs.hp.com/en/5971-2263/ch01s02.html#d0e298> [retrieved on Feb. 19, 2008] *p. 2, line 28*.
Carol Thompson: "Developing High Performance hp-ux Applications on the Intel (R) IntaniumTM processor" [Online] Mar. 2001, pp. 1-37, XP002470035 Retrieved from the Internet: URL:http://www.securitytechnet.com/resource/rsc-center/presentation/intel/spring2001/sdts254.pdf> [retrieved on Feb. 19, 2008] *p. 18*.
Ho, H. T.: "Windows NT Device Driver Design In A Multi-Link Translator and Display System" Military Communications Conference Proceedings, 1999. MILCOM 1999., IEEE Atlantic City, NJ USA, Oct. 31-Nov. 3, 1999, Piscataway, NJ, USA, IEEE, US, vol. 2, Oct. 31, 1999, pp. 1277-1281, XP010369755.
Shaw, A. et al.: "Performance Tuning Scientific Codes for Dataflow Execution" Parallel Architectures and Compilation Techniques, 1996.; Proceedings of the 1996 Conference on Boston, MA, USA Oct. 20-23, 1996, Los Alamitos, CA, USA, IEEE Comput. Soc, US, Oct. 20, 1996, pp. 198-207, XP010199395.
Gokhale M. B. et al., "NAPA C: Compiling for a Hybrid RISC/FPGA Architecture", FPGAS for Custom Computing Machines, Apr. 1998, pp. 126-135 XP010298178.
Paolo Faraboschi, Giuseppe Desoli, Joseph A. Fisher, "The Latest Word in Digital and Media Processing", IEEE Signal Processing Magazine, Mar. 1998, pp. 59-85 XP011089800.
Popovic M. et al., "A C Compiler Design Concept Used for MAS Family of Digital Signal Processors", Telecommunications in Modern Satellite, Cable and Broadcasting Service, TELSIKS, Sep. 2001, pp. 607-610, XP010561367.
Kole R.E., "The Impact of Language Extensions on DSP Programming", IEEE, Apr. 1996, pp. 191-194.
Eder Karl-Heinz et al., "Optimized Parallel Sets for Data Intensive Applications", IEEE, Sep. 1996, pp. 185-191.
SX System Software SUPER-UX C Programing Manual, Japan, NEC Corporation, Dec. 2001, $12^{th}$ Edition, pp. 147, 150-151 and 186-193 (with partial English translation).
UXP/V C/VP Operation Manual V10, Japan, Fujitsu Limited, Mar. 1998, $3^{rd}$ Edition, pp. 73-74 (with partial English translation).
AS/400 Advanced Series ILE C OS/400 Programmer's Reference Version 3, Release 7, Japan, IBM Japan Co., Ltd., Nov. 1996, $1^{st}$ Edition, pp. 168-169 (with English version).
OS/390 C/C++ Language Reference, Japan, IBM Japan Co., Ltd., Dec. 1998, $1^{st}$ Edition, pp. 285-286 (with English version).
AIX 5L Porting Guide, Japan, IBM Japan Co., Ltd., May 2002, $1^{st}$ Edition, p. 604 (with English version).

* cited by examiner

Fig. 11

| Bit | 31 | 30 | 29 | 28 | 27 | 26 | 25 | 24 |
|---|---|---|---|---|---|---|---|---|
| Bit name | reserved | SWE | FXP | reserved | IH | EH | PL | |
| Bit | 23 | 22 | 21 | 20 | 19 | 18 | 17 | 16 |
| Bit name | FIE3 | FIE2 | FIE1 | FIE0 | reserved | reserved | AEE | IE |
| Bit | 15 | 14 | 13 | 12 | 11 | 10 | 9 | 8 |
| Bit name | Reserved | | | | | | | |
| Bit | 7 | 6 | 5 | 4 | 3 | 2 | 1 | 0 |
| Bit name | IM[7:0] | | | | | | | |

| Bit | 31 | 30 | 29 | 28 | 27 | 26 | 25 | 24 |
|---|---|---|---|---|---|---|---|---|
| Bit name | ALN | | reserved | | | BPO | | |
| Bit | 23 | 22 | 21 | 20 | 19 | 18 | 17 | 16 |
| Bit name | | | reserved | | VC3 | VC2 | VC1 | VC0 |
| Bit | 15 | 14 | 13 | 12 | 11 | 10 | 9 | 8 |
| Bit name | | | | | | | OVS | CAS |
| Bit | 7 | 6 | 5 | 4 | 3 | 2 | 1 | 0 |
| Bit name | | | reserved | | | | | |
| Bit | C7 | C6 | C5 | C4 | C3 | C2 | C1 | C0 |

| Category | SIMD | Size | Instruction | Operand | CFR | PSR | Typical behavior | Operation unit | 31:16 |
|---|---|---|---|---|---|---|---|---|---|
| ALU add system | SINGLE | Word | add | Rc,Ra,Rb<br>Rb,Ra,i12s<br>SP,i19s | | | | | 32 |
| | | | | Ra2,Rb2<br>Rc3,Ra3,Rb3<br>Ra2,i05s<br>SP,i11s | | | | | 16 |
| | | | addu | Rb,GP,i16u<br>Rb,SP,i16u | | | | | 32 |
| | | | | Ra3,SP,i08u | | | | | 16 |
| | | | addc | Rc,Ra,Rb | W:cas,c0:c1 | | Addition with carry | | |
| | | | addvw | Rc,Ra,Rb | W:ovs | | Addition with overflow | | |
| | | | adds | Rc,Ra,Rb | | | (Ra + Rb) >>1 → Rc | | 32 |
| | | | addsr | Rc,Ra,Rb | | | (Ra + Rb + 1) >>1 → Rc | | |
| | | | s1add | Rc,Ra,Rb | | | (Ra + Rb>>1) → Rc | | |
| | | | | Rc3,Ra3,Rb3 | | | | | 16 |
| | | | s2add | Rc,Ra,Rb | | | (>>2) | | 32 |
| | | | | Rc3,Ra3,Rb3 | | | | | 16 |
| | | | addmsk | Rc,Ra,Rb | R:BP0 | | Ra / CFR.BP / Rb → Rc | | |
| | | | addarvw | Rc,Ra,Rb | | | | | |
| | | Half word | faddvh | Rc,Ra,Rb | W:ovs | | | | |
| | SIMD | Half word | vaddh | Rc,Ra,Rb | | | Ra[16|16] + Rb[16|16] → Rc[16|16] | A | 32 |
| | | | vaddhvh | Rc,Ra,Rb | W:ovs | | | | |
| | | | vsaddh | Rb,Ra,i08s | | | +immediate +immediate value value → Rb | | |
| | | | vaddsh | Rc,Ra,Rb | | | Ra+Rb >>1 >>1 → Rc | | |
| | | | vaddsrh | Rc,Ra,Rb | | | (+1) (+1) (With rounding) | | |
| | | | vaddhvc | Rc,Ra,Rb | R:VC | | | | |
| | | | vaddrhvc | Rc,Ra,Rb | | | | | |
| | | | vxaddh | Rc,Ra,Rb | | | Ra[16|16] ×+ Rb[16|16] → Rc | | |
| | | | vxaddhvh | Rc,Ra,Rb | W:ovs | | | | |
| | | | vhaddh | Rc,Ra,Rb | | | | | |
| | | | vhaddhvh | Rc,Ra,Rb | W:ovs | | | | |
| | | | vladdh | Rc,Ra,Rb | | | | | |
| | | | vladdhvh | Rc,Ra,Rb | W:ovs | | | | |
| | | Byte | vaddb | Rc,Ra,Rb | | | Ra[8|8|8|8] + Rb[8|8|8|8] → Rc | | |
| | | | vsaddb | Rb,Ra,i08s | | | (Immediate value) | | |
| | | | vaddsb | Rc,Ra,Rb | | | Ra+Rb >>1 >>1 → Rc | | |
| | | | vaddsrb | Rc,Ra,Rb | | | (+1)(+1)(+1)(+1) (With rounding) | | |

Fig. 22

| Category | SIMD | Size | Instruction | Operand | CFR | PSR | Typical behavior | Operation unit | 31 16 |
|---|---|---|---|---|---|---|---|---|---|
| ALU sub system | SINGLE | Word | sub | Rc,Rb,Ra<br>Rb2,Ra2<br>Rc3,Rb3,Ra3 | | | | | 32<br>16 |
| | | | rsub | Rb,Ra,i08s<br>Ra2,Rb2<br>Ra2,i04s | | | Immediate value − Ra → Rb<br>( Rb2 ) | | 32<br>16 |
| | | | subc | Rc,Rb,Ra | W:cas,c0:c1 | | With carry | | |
| | | | subvw | Rc,Rb,Ra | W:ovs | | With overflow | | |
| | | | subs | Rc,Rb,Ra | | | Ra − Rb → Rc | | |
| | | | submsk | Rc,Rb,Ra | R:BP0 | | Ra / CFR.BP0 → Rc / Rb | | |
| | SIMD | Half word | fsubvh | Rc,Rb,Ra | | | | | |
| | | | vsubh | Rc,Rb,Ra | | | Ra[16|16] − Rb[16|16] → Rc[16|16] | | |
| | | | vsubhvh | Rc,Rb,Ra | W:ovs | | | | |
| | | | vsrsubh | Rb,Ra,i08s | | | Immediate value − Ra → Rb | A | 32 |
| | | | vsubsh | Rc,Rb,Ra | | | Ra − Rb >>1 >>1 → Rc | | |
| | | | vxsubh | Rc,Rb,Ra | | | Ra[16|16] × Rb[16|16] → Rc[16|16] | | |
| | | | vxsubhvh | Rc,Rb,Ra | W:ovs | | | | |
| | | | vhsubh | Rc,Rb,Ra | | | Ra[16|16] − Rb[16|16] → Rc | | |
| | | | vhsubhvh | Rc,Rb,Ra | W:ovs | | | | |
| | | | vlsubh | Rc,Rb,Ra | | | Ra[16|16] − Rb[16] → Rc[16|16] | | |
| | | | vlsubhvh | Rc,Rb,Ra | W:ovs | | | | |
| | | Byte | vsubb | Rc,Rb,Ra | | | (Immediate value)<br>Ra[8|8|8|8] − Rb[8|8|8|8] → Rc | | |
| | | | vsrsubb | Rb,Ra,i08s | | | | | |
| | | | vasubb | Rc,Rb,Ra | R:VC | | | | |

Fig. 23

| Category | SIMD | Size | Instruction | Operand | CFR | PSR | Typical behavior | Operation unit | 31 16 |
|---|---|---|---|---|---|---|---|---|---|
| ALU logic system | SINGLE | Word | and | Rc,Ra,Rb | | | AND | A | 32 |
| | | | | Rb,Ra,i08u | | | | | |
| | | | | Ra2,Rb2 | | | | | 16 |
| | | | andn | Rc,Ra,Rb | | | | | 32 |
| | | | | Rb,Ra,i08u | | | | | |
| | | | | Ra2,Rb2 | | | | | 16 |
| | | | or | Rc,Ra,Rb | | | OR | | 32 |
| | | | | Rb,Ra,i08u | | | | | |
| | | | | Ra2,Rb2 | | | | | 16 |
| | | | xor | Rc,Ra,Rb | | | Exclusive OR | | 32 |
| | | | | Rb,Ra,i08u | | | | | |
| | | | | Ra2,Rb2 | | | | | 16 |
| ALU mov system | SINGLE | Word | mov | Rb,Reg32 | | | Reg32 = TAR LR SVR PSR CFR MH0 MH1 ML0 ML1 EPSR IPC IPSR PC EPC PSR0 PSR1 PSR2 PSR3 CFR0 CFR1 CFR2 CFR3 Reg16 = TAR LR MH0 MH1 | A | 32 |
| | | | | Reg32,Rb | | | | | |
| | | | | Rb2,Reg16 | | | | | 16 |
| | | | | Reg16,Rb2 | | | | | |
| | | | | Ra2,Rb | | | | | |
| | | | | Ra,i16s | | | | | 32 |
| | | | | Ra2,i08s | | | | | 16 |
| | | | movp | Rc:Rc+1,Ra,Rb | | | Rc<-Ra; Rc+1<-Rb; | | 32 |
| | | | movcf | Ck,Cj,Cm,Cn | | | Ci<-Cj; Cm<-Cn; | | |
| | | | mvclovs | Cm:Cm+1 | W:ovs | | Cm:Cm+1<-CFR.OVS; CFR.OVS; CFR.OVS<-0; | | 16 |
| | | | mvclcas | Cm:Cm+1 | W:cas | | Cm:Cm+1<-CFR.CAS; CFR.CAS; CFR.CAS<-0; | | |
| | | | sethi | Ra,i16s | | | | | 32 |
| ALU max min system | SINGLE | Word | max | Rc,Ra,Rb | W:c0:c1 | | Rc <- max(Ra,Rb) | A | 32 |
| | | | min | Rc,Ra,Rb | W:c0:c1 | | Rc <- min(Ra,Rb) | | |
| | SIMD | Half word | vmaxh | Rc,Ra,Rb | | | | | |
| | | | vminh | Rc,Ra,Rb | | | | | |
| | | Byte | vmaxb | Rc,Ra,Rb | | | | | |
| | | | vminb | Rc,Ra,Rb | | | | | |
| ALU abs system | SINGLE | | abs | Rb,Ra | | | Absolute value | A | 32 |
| | | | absvw | Rb,Ra | W:ovs | | With overflow | | |
| | | | fabsvh | Rb,Ra | W:ovs | | | | |
| | SIMD | Half word | vabshvh | Rb,Ra | W:ovs | | | | |
| ALU neg system | SINGLE | Word | negvw | Rb,Ra | W:ovs | | | A | 32 |
| | | Half word | fnegvh | Rb,Ra | W:ovs | | | | |
| | SIMD | | vneghvh | Rb,Ra | W:ovs | | | | |
| ALU sum system | SIMD | Half word | vsumh | Rb,Ra | | | 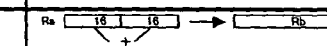 | A | 32 |
| | | | vsumh2 | Rb,Ra | | | 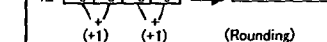 | | |
| | | | vsumrh2 | Rb,Ra | | | (+1) (+1) (Rounding) | | |
| | | Byte | vabssumb | Rc,Ra,Rb | | | | C | |
| ALU other | SINGLE | | frndvh | Rb,Ra | W:ovs | | Rounding | C | |
| | SIMD | | vfrndvh | Rb,Mn | W:ovs | | | | 32 |
| | | | vsel | Rc,Ra,Rb | R:VC | | | A | |
| | | | vsgnh | Rb,Ra | | | | C | |

Fig. 24

| Category | SIMD | Size | Instruction | Operand | CFR | PSR | Typical behavior | Operation unit | 31 16 |
|---|---|---|---|---|---|---|---|---|---|
| CMP | SINGLE | | cmpCCn | Cm,Ra,Rb,Cn<br>Cm,Ra,i05s,Cn<br>Cm:Cm+1,Ra,Rb,Cn<br>Cm:Cm+1,Ra,i05s,Cn | W:CF | | CC = eq, ne, gt, ge, gtu, geu, le, lt, leu, ltu<br>Cm <- result & Cn;<br>(Cm+1 <- ~result & Cn;) | A | 16 |
| | | | cmpCCa | Cm:Cm+1,Ra,Rb,Cn<br>Cm:Cm+1,Ra,i05s,Cn | W:CF | | Cm <- result & Cn;<br>Cm+1 <- ~(result & Cn); | | 32 |
| | | | cmpCCo | Cm:Cm+1,Ra,Rb,Cn<br>Cm:Cm+1,Ra,i05s,Cn | W:CF | | Cm <- result | Cn;<br>Cm+1 <- ~(result | Cn); | | |
| | | | cmpCC | C6,Ra2,Rb2<br>C6,Ra2,i04s | W:CF | | CC = eq, ne, gt, ge, le, lt<br>C6 <- result | | 16 |
| | | | tstzn | Cm,Ra,Rb,Cn<br>Cm,Ra,i05u,Cn<br>Cm:Cm+1,Ra,Rb,Cn<br>Cm:Cm+1,Ra,i05u,Cn | W:CF | | Cm <- (Ra & Rb == 0) & Cn;<br>(Cm+1 <- ~(Ra & Rb ==0) & Cn;) | | |
| | | | tstza | Cm:Cm+1,Ra,Rb,Cn<br>Cm:Cm+1,Ra,i05u,Cn | W:CF | | Cm <- (Ra & Rb == 0) & Cn;<br>Cm+1 <- ~((Ra & Rb == 0) & Cn); | | 32 |
| | | | tstzo | Cm:Cm+1,Ra,Rb,Cn<br>Cm:Cm+1,Ra,i05u,Cn | W:CF | | Cm <- (Ra & Rb == 0) | Cn;<br>Cm+1 <- ~((Ra & Rb == 0) | Cn); | | |
| | | | tstnn | Cm,Ra,Rb,Cn<br>Cm,Ra,i05u,Cn<br>Cm:Cm+1,Ra,Rb,Cn<br>Cm:Cm+1,Ra,i05u,Cn | W:CF | | Cm <- (Ra & Rb != 0) & Cn;<br>(Cm+1 <- ~(Ra & Rb != 0) & Cn;) | | |
| | | | tstna | Cm:Cm+1,Ra,Rb,Cn<br>Cm:Cm+1,Ra,i05u,Cn | W:CF | | Cm <- (Ra & Rb != 0) & Cn;<br>Cm+1 <- ~((Ra & Rb != 0) & Cn); | | |
| | | | tstno | Cm:Cm+1,Ra,Rb,Cn<br>Cm:Cm+1,Ra,i05u,Cn | W:CF | | Cm <- (Ra & Rb != 0) | Cn;<br>Cm+1 <- ~((Ra & Rb != 0) | Cn); | | |
| | | | tstz | C6,Ra2,Rb2<br>C6,Ra2,i04u | W:CF | | C6 <- (Ra2&Rb2 == 0 ) | | 16 |
| | | | tstn | C6,Ra2,Rb2<br>C6,Ra2,i04u | W:CF | | C6 <- (Ra2&Rb2 != 0 ) | | |
| | SIMD | Half word | vcmpCCh<br>vscmpCCh | Ra,Rb<br>Ra,i05s | W:CF | | CC = eq, ne, gt, le, ge, lt | | 32 |
| | | Byte | vcmpCCb<br>vscmpCCb | Ra,Rb<br>Ra,i05s | W:CF | | CC = eq, ne, gt, le ge, lt | | |

Fig. 25

| Category | SIMD | Size | Instruction | Operand | CFR | PSR | Typical behavior | Operation unit |
|---|---|---|---|---|---|---|---|---|
| mul system | SINGLE | Word × Word | mul | Mm,Rc,Ra,Rb<br>Mm,Rb,Ra,i08s | | | Ra × Rb (Immediate value) → MHm MLm Rc | X2 |
| | | | mulu | Mm,Rc,Ra,Rb<br>Mm,Rb,Ra,i08s | | | Unsigned multiplication | |
| | | | fmulww | Mm,Rc,Ra,Rb | | fxp | Fixed point operation | |
| | | Word × Half word | hmul | Mm,Rc,Ra,Rb | | | Ra × Rb 16 → MHm MLm Rc | X1 |
| | | | lmul | Mm,Rc,Ra,Rb | | | ( 16 ) | |
| | | | fmulhww | Mm,Rc,Ra,Rb | | fxp | Ra × Rb 16 → MHm MLm 16 16 Rc | |
| | | Half word × Half word | fmulhw | Mm,Rc,Ra,Rb | | fxp | Ra 16 × Rb 16 → MHm MLm Rc | |
| | | | fmulhh | Mm,Rc,Ra,Rb | | fxp | Ra 16 × Rb 16 → MHm MLm 16 16 Rc | |
| | | | fmulhhr | Mm,Rc,Ra,Rb | | fxp | With rounding | |
| | SIMD | HALF WORD × HALF WORD | vmul | Mm,Rc,Ra,Rb | | | | 32 |
| | | | vfmulw | Mm,Rc,Ra,Rb | | fxp | | |
| | | | vfmulh | Mm,Rc,Ra,Rb | | fxp | | |
| | | | vfmulhr | Mm,Rc,Ra,Rb | | fxp | With rounding | |
| | | | vxmul | Mm,Rc,Ra,Rb | | | | |
| | | | vxfmulw | Mm,Rc,Ra,Rb | | fxp | | X2 |
| | | | vxfmulh | Mm,Rc,Ra,Rb | | fxp | | |
| | | | vxfmulhr | Mm,Rc,Ra,Rb | | fxp | With rounding | |
| | | | vhmul | Mm,Rc,Ra,Rb | | | | |
| | | | vhfmulw | Mm,Rc,Ra,Rb | | fxp | | |
| | | | vhfmulh | Mm,Rc,Ra,Rb | | fxp | | |
| | | | vhfmulhr | Mm,Rc,Ra,Rb | | fxp | With rounding | |
| | | | vlmul | Mm,Rc,Ra,Rb | | | | |
| | | | vlfmulw | Mm,Rc,Ra,Rb | | fxp | | |
| | | | vlfmulh | Mm,Rc,Ra,Rb | | fxp | | |
| | | | vlfmulhr | Mm,Rc,Ra,Rb | | fxp | With rounding | |
| | | Word × Half word | vpfmulhww | Mm,Rc:Rc+1,Ra,Rb<br>Mm,Rc:Rc+1,Ra,Rb | | fxp<br>fxp | | |

Fig. 26

| Category | SIMD | Size | Instruction | Operand | CFR | PSR | Typical behavior | Operation unit | 31 16 |
|---|---|---|---|---|---|---|---|---|---|
| mac system | SINGLE | Word × Word | mac | Mm,Rc,Ra,Rb,Mn M0,Rc,Ra,Rb,Rx | | | Sum of products operation using mul | X2 | 32 |
| | | | fmacww | Mm,Rc,Ra,Rb,Mn M0,Rc,Ra,Rb,Rx | | fxp | Sum of products operation using fmulww | | |
| | | Word × Half word | hmac | Mm,Rc,Ra,Rb,Mn M0,Rc,Ra,Rb,Rx | | | Sum of products operation using hmul | X1 | 16 |
| | | | lmac | Mm,Rc,Ra,Rb,Mn M0,Rc,Ra,Rb,Rx | | | Sum of products operation using lmul | | 32 |
| | | | fmachww | Mm,Rc,Ra,Rb,Mn M0,Rc,Ra,Rb,Rx | | fxp | Sum of products operation using fmulhww | | 16 |
| | | | fmachw | Mm,Rc,Ra,Rb,Mn M0,Rc,Ra,Rb,Rx | | fxp | Sum of products operation using fmulhw | | |
| | | Half word × Half word | fmachh | Mm,Rc,Ra,Rb,Mn M0,Rc,Ra,Rb,Rx | | fxp | Sum of products operation using fmulhh | | 32 |
| | | | fmachhr | Mm,Rc,Ra,Rb,Mn M0,Rc,Ra,Rb,Rx | | fxp | With rounding | | |
| | SIMD | HALF WORD × HALF WORD | vmac | Mm,Rc,Ra,Rb,Mn M0,Rc,Ra,Rb,Rx | | | Sum of products operation using vmul | X2 | 16 |
| | | | vfmacw | Mm,Rc,Ra,Rb,Mn | | fxp | Sum of products operation using vfmulw | | 32 16 |
| | | | vxmac | Mm,Rc,Ra,Rb,Mn M0,Rc,Ra,Rb,Rx | | | Sum of products operation using vxmul | | |
| | | | vxfmacw | Mm,Rc,Ra,Rb,Mn | | fxp | Sum of products operation using vxfmulw | | |
| | | | vxfmach | Mm,Rc,Ra,Rb,Mn M0,Rc,Ra,Rb,Rx | | fxp | Sum of products operation using vxfmulh | | |
| | | | vxfmachr | Mm,Rc,Ra,Rb,Mn M0,Rc,Ra,Rb,Rx | | fxp | With rounding | | |
| | | | vhmac | Mm,Rc,Ra,Rb,Mn M0,Rc,Ra,Rb,Rx | | | Sum of products operation using vhmul | | |
| | | | vhfmacw | Mm,Rc,Ra,Rb,Mn | | fxp | Sum of products operation using vhfmulw | | |
| | | | vhfmach | Mm,Rc,Ra,Rb,Mn M0,Rc,Ra,Rb,Rx | | fxp | Sum of products operation using vhfmulh | | 32 |
| | | | vhfmachr | Mm,Rc,Ra,Rb,Mn M0,Rc,Ra,Rb,Rx | | | | | |
| | | | vlmac | Mm,Rc,Ra,Rb,Mn M0,Rc,Ra,Rb,Rx | | | Sum of products operation using vlmul | | |
| | | | vlfmacw | Mm,Rc,Ra,Rb,Mn | | fxp | Sum of products operation using vlfmulw | | |
| | | | vfmach | Mm,Rc,Ra,Rb,Mn M0,Rc,Ra,Rb,Rx | | fxp | Sum of products operation using vfmulh | | |
| | | | vfmachr | Mm,Rc,Ra,Rb,Mn M0,Rc,Ra,Rb,Rx | | fxp | With rounding | | |
| | | | vlfmach | Mm,Rc,Ra,Rb,Mn Mm,Rc,Ra,Rb,Mn | | fxp | Sum of products operation using vlfmulh | | |
| | | | vlfmachr | Mm,Rc,Ra,Rb,Mn M0,Rc,Ra,Rb,Rx | | fxp | With rounding | | |
| | | Word × Half word | vpfmachww | Mm,Rc;Rc+1,Ra,Rb,Mn | | fxp | | | |

Fig. 27

| Category | SIMD | Size | Instruction | Operand | CFR | PSR | Typical behavior | Operation unit | 31 16 |
|---|---|---|---|---|---|---|---|---|---|
| msu system | S I N G L E | Word × Word | msu | Mm,Rc,Ra,Rb,Mn M0,Rc,Ra,Rb,Rx | | | Difference of products operation using mul | X2 | |
| | | | fmsuww | Mm,Rc,Ra,Rb,Mn M0,Rc,Ra,Rb,Rx | | fxp | Difference of products operation using fmulww | | |
| | | Word × Half word | hmsu | Mm,Rc,Ra,Rb,Mn M0,Rc,Ra,Rb,Rx | | | Difference of products operation using hmul | X1 | |
| | | | lmsu | Mm,Rc,Ra,Rb,Mn M0,Rc,Ra,Rb,Rx | | | Difference of products operation using lmul | | |
| | | | fmsuhww | Mm,Rc,Ra,Rb,Mn M0,Rc,Ra,Rb,Rx | | fxp | Difference of products operation using fmulhww | | |
| | | Half word × Half word | fmsuhw | Mm,Rc,Ra,Rb,Mn M0,Rc,Ra,Rb,Rx | | fxp | Difference of products operation using fmulhw | | |
| | | | fmsuhh | Mm,Rc,Ra,Rb,Mn M0,Rc,Ra,Rb,Rx | | fxp | Difference of products operation using fmulhh | | |
| | | | fmsuhhr | Mm,Rc,Ra,Rb,Mn M0,Rc,Ra,Rb,Rx | | fxp | With rounding | | 32 |
| | | HALF WORD × HALF WORD | vmsu | Mm,Rc,Ra,Rb,Mn M0,Rc,Ra,Rb,Rx | | | Difference of products operation using vmul | | |
| | | | vfmsuw | Mm,Rc,Ra,Rb,Mn | | fxp | Difference of products operation using vfmul | | |
| | | | vfmsuh | Mm,Rc,Ra,Rb,Mn M0,Rc,Ra,Rb,Rx | | fxp | Difference of products operation using vfmulh | | |
| | | | vxmsu | Mm,Rc,Ra,Rb,Mn M0,Rc,Ra,Rb,Rx | | | Difference of products operation using vxmul | | |
| | | | vxfmsuw | Mm,Rc,Ra,Rb,Mn | | fxp | Difference of products operation using vxfmulw | | |
| | | | vxfmsuh | Mm,Rc,Ra,Rb,Mn M0,Rc,Ra,Rb,Rx | | fxp | Difference of products operation using vxfmulh | X2 | |
| | | | vhmsu | Mm,Rc,Ra,Rb,Mn M0,Rc,Ra,Rb,Rx | | | Difference of products operation using vhmul | | |
| | | | vhfmsuw | Mm,Rc,Ra,Rb,Mn | | fxp | Difference of products operation using vhfmulw | | |
| | | | vhfmsuh | Mm,Rc,Ra,Rb,Mn M0,Rc,Ra,Rb,Rx | | fxp | Difference of products operation using vhfmulh | | |
| | | WORD × HALF WORD | vlmsu | Mm,Rc,Ra,Rb,Mn M0,Rc,Ra,Rb,Rx | | | Difference of products operation using vlmul | | |
| | | | vlfmsuw | Mm,Rc,Ra,Rb,Mn | | fxp | Difference of products operation using vlfmulw | | |
| | | | vlfmsuh | Mm,Rc,Ra,Rb,Mn M0,Rc,Ra,Rb,Rx | | fxp | Difference of products operation using vlfmulh | | |

Fig. 28

| Category | SIMD | Size | Instruction | Operand | CFR | PSR | Typical behavior | Operation unit | 31 16 |
|---|---|---|---|---|---|---|---|---|---|
| MEM ld system | S I N G L E | Word | ld | Rb,(Ra,d10u)<br>Rb,(GP,d13u)<br>Rb,(SP,d13u)<br>Rb,(Ra+)i10s<br>Rb2,(Ra2)<br>Rb2,(Ra2,d05u)<br>Rb2,(GP,d06u)<br>Rb2,(SP,d06u)<br>Rb2,(Ra2+) | | | Register ← Memory<br>[ 32 ] ← [ 32 ] | M | 32<br><br>16 |
| | | Half word | ldh | Rb,(Ra,d09u)<br>Rb,(GP,d12u)<br>Rb,(SP,d12u)<br>Rb,(Ra+)i09s<br>Rb2,(Ra2)<br>Rb3,(Ra3,d04u)<br>Rb2,(GP,d05u)<br>Rb2,(SP,d05u)<br>Rb2,(Ra2+) | | | [ 32 ] ← [ 16 ] | | 32<br><br>16 |
| | | | ldhu | Rb,(Ra,d09u)<br>Rb,(GP,d12u)<br>Rb,(SP,d12u)<br>Rb,(Ra+)i09s | | | | | |
| | | Byte | ldb | Rb,(Ra,d08u)<br>Rb,(GP,d11u)<br>Rb,(SP,d11u)<br>Rb,(Ra+)i08s | | | Register ← Memory<br>[ 32 ] ← [ 8 ] | | 32 |
| | | | ldbu | Rb,(Ra,d08u)<br>Rb,(GP,d11u)<br>Rb,(SP,d11u)<br>Rb,(Ra+)i08s | | | | | |
| | | Byte-> Half word | ldbh<br>ldbuh | Rb,(Ra+)i07s<br>Rb,(Ra+)i07s | | | [ 16 | 16 ] ← [ 8 | 8 ] | | |
| | | P A I R | Word | ldp | Rb:Rb+1,(Ra,d11u)<br>LR:SVR,(Ra,d11u)<br>TAR:UDR,(Ra,d11u)<br>Rb:Rb+1,(GP,d14u)<br>LR:SVR,(GP,d14u)<br>TAR:UDR,(GP,d14u)<br>Rb:Rb+1,(SP,d14u)<br>LR:SVR,(SP,d14u)<br>TAR:UDR,(SP,d14u)<br>Rb:Rb+1,(Ra+)i11s<br>Rb:Rb+1,(SP,d07u)<br>LR:SVR,(SP,d07u)<br>Rb2:Re2,(Ra2+) | | | [ 32 ]<br>[ 32 ] ← [ 32 ]<br>[ 32 ] | | 16 |
| | | | Half word | ldhp | Rb:Rb+1,(Ra,d10u)<br>Rb:Rb+1,(Ra+)i10s<br>Rb2:Re2,(Ra2+) | | | [ 32 ]<br>[ 32 ] ← [ 16 | 16 ] | | 32<br>16 |
| | | | Byte | ldbp | Rb:Rb+1,(Ra,d09u)<br>Rb:Rb+1,(Ra+)i09s | | | [ 32 ]<br>[ 32 ] ← [ 8 | 8 ] | | 32 |
| | | | Byte-> Half word | ldbhp<br>ldbuhp | Rb:Rb+1,(Ra+)i07s<br>Rb:Rb+1,(Ra+)i07s | | | [ 16 | 16 ]<br>[ 16 | 16 ] ← [ 8 | 8 | 8 | 8 ] | | 32 |

Fig. 29

| Category | SIMD | Size | Instruction | Operand | CFR | PSR | Typical behavior | Operation unit | 31 16 |
|---|---|---|---|---|---|---|---|---|---|
| MEM store system | SINGLE | Word | st | (Ra,d10u),Rb<br>(GP,d13u),Rb<br>(SP,d13u),Rb<br>(Ra+)i10s,Rb | | | Register → Memory<br>32 → 32 | M | 32 |
| | | | | (Ra2),Rb2<br>(Ra2,d05u),Rb2<br>(GP,d06u),Rb2<br>(SP,d06u),Rb2<br>(Ra2+),Rb2 | | | | | 16 |
| | | Half word | sth | (Ra,d09u),Rb<br>(GP,d12u),Rb<br>(SP,d12u),Rb<br>(Ra+)i09s,Rb | | | 16 → 16 | | 32 |
| | | | | (Ra2),Rb2<br>(Ra2,d04u),Rb2<br>(GP,d05u),Rb2<br>(SP,d05u),Rb2<br>(Ra2+),Rb2 | | | | | 16 |
| | | Byte | stb | (Ra,d08u),Rb<br>(GP,d11u),Rb<br>(SP,d11u),Rb<br>(Ra+)i08s,Rb | | | 8 → 8 | | |
| | | Byte-><br>Half word | stbh | (Ra+)i07s,Rb | | | 8 8 → 16 | | |
| | PAIR | Word | stp | (Ra,d11u),Rb:Rb+1<br>(Ra,d11u),LR:SVR<br>(Ra,d11u),TAR:UDR<br>(GP,d14u),Rb:Rb+1<br>(GP,d14u),LR:SVR<br>(GP,d14u),TAR:UDR<br>(SP,d14u),Rb:Rb+1<br>(SP,d14u),LR:SVR<br>(SP,d14u),TAR:UDR<br>(Ra+)i11s,Rb:Rb+1<br>(SP,d07u),Rb:Re<br>(SP,d07u),LR:SVR<br>(Ra2+),Rb2:Re2 | | | 32 → 32<br>32 → 32 | | 32<br><br>16 |
| | | Half word | sthp | (Ra,d10u),Rb:Rb+1<br>(Ra+)i10s,Rb:Rb+1<br>(Ra2+),Rb2:Re2 | | | 16<br>16 → 32 | | 32<br>16 |
| | | Byte | stbp | (Ra,d09u),Rb:Rb+1<br>(Ra+)i09s,Rb:Rb+1 | | | 8 8 → 16 | | 32 |
| | | Byte-><br>Half word | stbhp | (Ra+)i07s,Rb:Rb+1 | | | 8 8<br>8 8 → 32 | | |

Fig. 30

| Category | SIMD | Size | Instruction | Operand | CFR | PSR | Typical behavior | Operation unit | 31 16 |
|---|---|---|---|---|---|---|---|---|---|
| BRA | | | setlr | d09s | | | Set LR | | |
| | | | | C5,d09s | | | Store instruction fetched from LR in branch buffer | | |
| | | | settar | d09s | | | Set TAR | | 32 |
| | | | | C6,d09s | W:c6 | | Store instruction fetched from TAR in branch buffer | | |
| | | | | C6,C2:C4,d09s | W:c2:c4,c6 | | | | |
| | | | | C6,Cm,d09s | W:c6,cm | | | | |
| | | | | C6,C4,d09s | W:c6 | | | | |
| | | | setbb | LR | | | Store instruction fetched from LR in branch buffer | | 16 |
| | | | | TAR | | | Store instruction fetched from TAE in branch buffer | | |
| | | | jloop | C5,LR,Ra,i08s | W:c5 | | Only predicate [c5] | | |
| | | | | C6,TAR,Ra,i08s | W:c6 | | Only predicate [c6] | | 32 |
| | | | | C6,C2:C4,TAR,Ra,i08s | W:c2:c4,c6 | | | B | |
| | | | | C6,Cm,TAR,Ra,i08s | W:c6,cm | | | | |
| | | | | C6,TAR,Ra2 | W:c6 | | | | |
| | | | | C6,C2:C4,TAR,Ra2 | W:c2:c4,c6 | | | | |
| | | | | C6,Cm,TAR,Ra2 | W:c6 | | | | |
| | | | jmp | TAR | | | | | |
| | | | | LR | | | | | |
| | | | jmpl | TAR | R:CF | | | | 16 |
| | | | | LR | | | | | |
| | | | jmpf | TAR | | | | | |
| | | | | LR | | | | | |
| | | | | Cm,TAR | | | | | |
| | | | | C6,C2:C4,TAR | | | | | |
| | | | jmpr | LR | | | | | |
| | | | br | d20s | | | | | 32 |
| | | | | d09s | | | Only predicates [c6][c7] | | 16 |
| | | | brl | d20s | R:CF | | | | 32 |
| | | | | d09s | | | | | 16 |
| | | | rti | | | W:PSR R:eh | | | |

| Category | SIMD | Size | Instruction | Operand | CFR | PSR | Typical behavior | Operation unit | 31 16 |
|---|---|---|---|---|---|---|---|---|---|
| CNV vain system | S I M D | | vain | Rc,Ra,Rb | R:ain[1:0] | | << (CFR.ALN[1:0] << 3) [63:32] Ra Rb → Rb | C | 32 |
| | | | vain1 | Rc,Ra,Rb | | | Ra [ (1) ] Rb [ (2) ] → [ (1) | (2) ] Rc | | |
| | | | vain2 | Rc,Ra,Rb | | | Ra [ (1) ] Rb [ (2) ] → [ (1) | (2) ] Rc | | |
| | | | vain3 | Rc,Ra,Rb | | | Ra [ (1) ] Rb [ (2) ] → [ (1) | (2) ] Rc | | |
| | | | vainvc1 | Rc,Ra,Rb | R:VC0 | | | | |
| | | | vainvc2 | Rc,Ra,Rb | R:VC0 | | | | |
| | | | vainvc3 | Rc,Ra,Rb | R:VC0 | | | | |
| | | | vainvc4 | Rc,Ra,Rb | R:VC0 | | | | |

Fig. 34

| Category | SIMD | Size | Instruction | Operand | CFR | PSR | Typical behavior | Operation unit | 31 16 |
|---|---|---|---|---|---|---|---|---|---|
| CNV | SINGLE | | bcnt1 | Rb,Ra | | | Count the number of 1s | C | 32 |
| | | | bseq0 | Rb,Ra | | | Count number of values from MSB until first 0 is reached | | |
| | | | bseq1 | Rb,Ra | | | Count number of values from MSB until first 1 is reached | | |
| | | | bseq | Rb,Ra | | | Count number of values from MSB until first -1 is reached | | |
| | | | mskbrvh | Rc,Ra,Rb | R:BP0 | | | | |
| | | | byterev | Rb,Ra | | | | | |
| | | | mskbrvb | Rc,Ra,Rb | R:BP0 | | | | |
| | SIMD | Half word | vintlh | Rc,Ra,Rb | | | | | |
| | | | vintlhh | Rc,Ra,Rb | | | | | |
| | | Byte | vintllb | Rc,Ra,Rb | | | | | |
| | | | vintlhb | Rc,Ra,Rb | | | | | |
| | | Half word | vhunpkh | Rb:Rb+1,Ra | | | | | |
| | | Byte | vhunpkb | Rb:Rb+1,Ra | | | | | |
| | | Half word | vlunpkh | Rb:Rb+1,Ra | | | | | |
| | | | vlunpkhu | Rb:Rb+1,Ra | | | | | |
| | | Byte | vlunpkb | Rb:Rb+1,Ra | | | | | |
| | | | vlunpkbu | Rb:Rb+1,Ra | | | | | |
| | | Half word | vunpk1 | Rb,Mn | | | | | |
| | | | vunpk2 | Rb,Mn | | | | | |
| | | | vstovh | Rb,Ra | | | | | |
| | | Byte | vstovb | Rb,Ra | | | | | |
| | | | vhpkb | Rc,Ra,Rb | | | | | |

Fig. 35

| Category | SIMD | Size | Instruction | Operand | CFR | PSR | Typical behavior | Operation unit | 31 16 |
|---|---|---|---|---|---|---|---|---|---|
| SAT vlpk system | S I M D | Word-> Half word | vlpkh | Rc,Ra,Rb | | | Ra (1) / Rb (2) With saturation → (1)(2) Rc | C | 32 |
| | | | vlpkhu | Rc,Ra,Rb | | | Ra (1) / Rb (2) With unsigned saturation → (1)(2) Rc | | |
| | | Half word-> Byte | vlpkb | Rc,Ra,Rb | | | Ra (1)(2) / Rb (3)(4) With saturation → (1)(2)(3)(4) Rc | | |
| | | | vlpkbu | Rc,Ra,Rb | | | Ra (1)(2) / Rb (3)(4) With unsigned saturation → (1)(2)(3)(4) Rc | | |
| SAT sat system | S I N G L E | Word | satw | Mm,Rb,Mn | | | Word saturation | C | 32 |
| | | | sath | Rb,Ra | | | Half word saturation | | |
| | | | satb | Rb,Ra | | | Byte saturation | | |
| | | | satbu | Rb,Ra | | | Unsigned byte saturation | | |
| | | | sat9 | Rb,Ra | | | 9-bit saturation | | |
| | | | sat12 | Rb,Ra | | | 12-bit saturation | | |
| | S I M D | Half word | vsath | Mm,Rb,Mn | | | MHm MLm (1)(2)(1)(2) With saturation MHm MLm → (1)(2) Rb | | |
| | | | vsath8 | Rb,Ra | | | Signed 8-bit saturation | | |
| | | | vsath8u | Rb,Ra | | | Unigned 8-bit saturation | | |
| | | | vsath9 | Rb,Ra | | | 9-bit saturation | | |
| | | | vsath12 | Rb,Ra | | | 12-bit saturation | | |

Fig. 36

| Category | SIMD | Size | Instruction | Operand | CFR | PSR | Typical behavior | Operation unit | 31 16 |
|---|---|---|---|---|---|---|---|---|---|
| MSK | | | mskgen | Rc,Rb<br>Rb,I05U,i05u | | | Generate mask | S2 | 32 |
| | | | msk | Rc,Ra,Rb<br>Rb,Ra,I05U,i05u | | | | S2 | 32 |
| EXTR | | | extr | Rc,Ra,Rb<br>Rb,Ra,I05U,i05u | | | With sign extension | S2 | 32 |
| | | | extru | Rc,Ra,Rb<br>Rb,Ra,I05U,i05u | | | (Without sign extension) | | |
| DIV | | | div<br>divu | MHm,Rc,MHn,Ra,Rb<br>MHm,Rc,MHn,Ra,Rb | W:ovs | | Division | DIV | 32 |
| ETC | | | piNl | | | W:ih,ie,fie,pl R:PSR | Software interrupt N=0~7 | B | 32 |
| | | | piN | | | W:ih,ie,pl R:PSR | Software interrupt N=0~7 | | 16 |
| | | | scN | | | W:ih,ie,pl R:PSR | System call N=0~7 | | |
| | | | ldstb | Rb,(Ra) | | | load bus lock | | |
| | | | rd | Rb,(Ra)<br>Rb,(d11u)<br>Rb2,(Ra2) | | R:eee | External register read | M | 32 16 |
| | | | wt | (Ra),Rb<br>(d11u),Rb<br>(Ra2),Rb2 | | R:eee | External register write | | 32 16 |
| | | | dpref | (Ra,d11u) | | | Pre-fetch | | |
| | | | dbgmN | i18u | | | N=0~3 | DBGM | |
| | | | vcchk | | W:CF R:VC | | VC flag check | | |
| | | | vmpsw<br>vmpsw | LR | | | VMP switching | | 32 |
| | | | vmpintd1<br>vmpintd2<br>vmpintd3 | | | W:ie<br><br>W:ie | VMP switching disabled | B | |
| | | | vmpinte1<br>vmpinte2<br>vmpinte3 | | | W:ie | VMP switching enabled | | |
| | | | nop | | | | no operation | A | 16 |

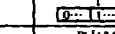

Fig. 40

Comparison of generated codes by change of maximum data size

| Default | Designate "-mmax-gp-datasize=40" |
|---|---|
| int a[8];<br>int c[10];<br><br>int sample(void)<br>{<br>  a[7] = c[0] + c[9];<br><br>  return a[7];<br>} | int a[8];<br>int c[10];<br><br>int sample(void)<br>{<br>  a[7] = c[0] + c[9];<br><br>  return a[7];<br>} |
| ld  r1,(gp,_c$ - .MN.gptop);;<br>setlo r0,LO(_c+36);;<br>sethi r0,HI(_c+36);;<br>ld  r1,(r1);;<br>ld  r0,(r0);;<br>add  r0,r1,r0;;<br>st  (gp,_a - .MN.gptop+28),r0<br>ret;; | ld  r1,(gp,_c - .MN.gptop);;<br>ld  r0,(gp,_c - .MN.gptop+36);;<br><br><br><br>add  r0,r1,r0;;<br>st  (gp,_a - .MN.gptop+28),r0<br>ret;; |
| 10 cycles<br>8 bytes | 7 cycles<br>5 bytes |

Fig. 41

When maximum data size to be allocated to gp region is 40

| No size designation Defined outside of file | Defined inside of file/Size designation Defined outside of file |
|---|---|
| extern int a[ ];<br>extern int c[ ];<br><br>int sample(void)<br>{<br>    a[7] = c[0] + c[9];<br><br>    return a[7];<br>} | int a[8];<br>extern int c[10];<br><br>int sample(void)<br>{<br>    a[7] = c[0] + c[9];<br><br>    return a[7];<br>} |
| setlo r0,LO(_c);;<br>setlo r1,LO(_c+36)<br>sethi r0,HI(_c);;<br>sethi r1,HI(_c+36);;<br>ld   r3,(r0);;<br>setlo r2,LO(_a+28)<br>ld   r0,(r1);;<br>sethi r2,HI(_a+28);;<br>add  r1,r3,r0;;<br>mov  r0,r1<br>st   (r2),r1<br>ret ;; | ld r1,(gp,_c - .MN.gptop);;<br><br>ld r0,(gp,_c - .MN.gptop+36);;<br><br>add r0,r1,r0;;<br><br>st (gp,_a - .MN.gptop+28),r0<br>ret;; |
| 10 cycles<br>12 bytes | 7 cycles<br>5 bytes |

Fig. 42

When maximum data size to be allocated to gp region is default of 32

| Size designation Defined outside of file/ Defined inside of file "#pragma _no_gp_access" directive | No size designation Defined outside of file/ Defined inside of file "#pragma _gp_access" directive |
|---|---|
| #pragma _no_gp_access a, c<br><br>extern int a[8];<br>int c[10];<br><br>int sample(void)<br>{<br>    a[7] = c[0] + c[9];<br><br>    return a[7];<br>} | #pragma _gp_access a, c<br><br>extern int a[];<br>int c[10];<br><br>int sample(void)<br>{<br>    a[7] = c[0] + c[9];<br><br>    return a[7];<br>} |
| setlo r0,LO(_c);;<br>setlo r1,LO(_c+36)<br>sethi r0,HI(_c);;<br>sethi r1,HI(_c+36);;<br>ld r3,(r0);;<br>setlo r2,LO(_a+28)<br>ld r0,(r1);;<br>sethi r2,HI(_a+28);;<br>add r1,r3,r0;;<br>mov r0,r1<br>st (r2),r1<br>ret ;; | ld r1,(gp,_c - .MN.gptop);;<br><br>ld r0,(gp,_c - .MN.gptop+36);;<br><br>add r0,r1,r0;;<br><br>st (gp,_a - .MN.gptop+28),r0<br>ret;; |
| 10 cycles<br>12 bytes | 7 cycles<br>5 bytes |

Fig. 45

Compilation with compile option -O

| Default | "#pragma _software_pipelining_with_proepi" directive |
|---|---|
| int a[100];<br>int b[100];<br>void sample(int c)<br>{<br>   int i;<br><br>   for(i=0; i<100; i++) {<br>      a[i] = b[i] + c;<br>   }<br>} | int a[100];<br>int b[100];<br>void sample(int c)<br>{<br>   int i;<br>#pragma _software_pipelining_with_proepi<br>   for(i=0; i<100; i++) {<br>      a[i] = b[i] + c;<br>   }<br>} |
| ld  r5,(gp,_x$ - .MN.gptop);;<br><br>mov r1,98<br>settar C6,C4,L00030<br>ld  r4,(gp,_v$ - .MN.gptop);;<br>L00030<br>[C4] add r2,r3,r0<br>[C6] ld  r3,(r5+);;<br>[C4] st  (r4+),r2<br>[C6] jloop  C6,C4,tar,r1,-1;;<br><br><br><br>ret  ;; | ld  r5,(gp,_x$ - .MN.gptop);;<br>ld  r4,(r5+);;<br>mov r1,96<br>settar C6,L00023<br>ld  r3,(gp,_v$ - .MN.gptop);;<br>L00023<br>  add r2,r4,r0<br>  ld  r4,(r5+);;<br>  st  (r3+),r2<br>[C6] jloop  C6,C4,tar,r1,-1;;<br>  add r2,r4,r0;;<br>  st  (r3+),r2<br>ret  ;; |
| 2 + 2×101 + 3 = 207 cycles<br>9 bytes | 3+ 2×99 + 3 = 204 cycles<br>12 bytes |

Fig. 47

Example of increased execution speed by "#pragma _loop_unroll" directive

| Default | "#pragma _loop_unroll" directive |
|---|---|
| ```
int a[100];
int b[100];
void sample(int c)
{
    int i, ret=0;

for(i=0; i<100; i++) {
        ret += a[i] * a[i];
    }
    return ret;
}
``` | ```
int a[100];
int b[100];
void sample(int c)
{
    int i, ret=0;
#pragma _loop_unroll
    for(i=0; i<100; i++) {
        ret += a[i] * a[i];
    }
    return ret;
}
``` |
| ```
      mov r0,0
      mov r1,98;;
      settar C6,C4,L00013 ld  r3,(gp,_a$ - .MN.gptop)
      mul m0,r2,gp,0;;
L00013
[C4]  mac m0,r0,r2,r2,m0

[C6]  ld  r2,(r3+)

[C6]  jloop C6,C4,tar,r1,-1;;
      ret ;;
``` | ```
      ld  r3,(gp,_a$ - .MN.gptop);;
      mov r0,0
      mov r1,48;;
      settar C6,C2:C4,L00013
      add r5,r3,4 mul m0,r2,gp,0;;
L00013
[C2]  mac m0,r0,r2,r2,m0
[C3]  add r3,r3,8
[C3]  ld  r2,(r5+)8;;
[C3]  mac m0,r0,r4,r4,m0
[C4]  ld  r4,(r3)
[C6]  jloop C6,C2:C4,tar,r1,-1;;
      ret ;;
``` |
| 2 + 2×101 + 3 = 207 cycles<br>9 bytes | 3 + 2× 52 + 3 = 110 cycles<br>13 bytes |

Fig. 48

| Default | "#pragma _loop_unroll" directive and "#pragma _align_local_pointer" directive |
|---|---|
| int a[100];<br>int b[100];<br>void sample(int c)<br>{<br>    int i;<br><br>    int *pa=a;<br>    int *pb=b;<br><br>    for(i=0; i<100; i++) {<br>        *pa++ = i * c >> *pb++;<br>    }<br>} | int a[100];<br>int b[100];<br>void sample(int c)<br>{<br>    int i;<br>#pragma _align_local_pointer=8 pa,pb<br>    int *pa=a;<br>    int *pb=b;<br>#pragma _loop_unroll<br>    for(i=0; i<100; i++) {<br>        *pa++ = i * c >> *pb++;<br>    }<br>} |
| mov r4,0<br>ld r6,(gp,_a$ - .MN.gptop);;<br>mov r1,98<br>settar C6,C4,L00025<br>ld r5,(gp,_b$ - .MN.gptop);;<br>L00025<br>[C4] asr r2,r4,r3;;<br><br><br><br>[C6] ld r3,(r5+);;<br>[C4] add r4,r4,r0<br>[C4] st (r6+),r2<br>[C6] jloop C6,C4,tar,r1,-1;;<br>    ret ;; | mov r6,0<br>ld r8,(gp,_a$ - .MN.gptop);;<br>mov r1,48<br>settar C6,C4,L00016<br>ld r7,(gp,_b$ - .MN.gptop);;<br>L00016<br>[C2] add r6,r6,r0;;<br>[C2] stp (r8+),r2:r3<br>[C3] asr r2,r6,r4<br>[C3] add r6,r6,r0;;<br>[C3] asr r3,r6,r5<br>[C4] ldp r4:r5,(r7+)<br>[C6] jloop C6,C2:C4,tar,r1,-1;;<br>    ret ;; |
| 2 + 3×101 + 3 = 308 cycles<br>11 bytes | 2 + 3× 51 + 3 = 158 cycles<br>13 bytes |

Fig. 49

| Without "#pragma _min_iteration" directive | With "#pragma _min_iteration" directive |
|---|---|
| int a[101];<br>int b[101];<br>void sample(int c, int end)<br>{<br>    int i;<br>    int *pa=a;<br>    int *pb=b;<br><br>    for (i = 0; i <end; i++) {<br>        *pa++ = i * c >> *pb++;<br>    }<br>    *pa = end;<br>} | int a[101];<br>int b[101];<br>void sample(int c, int end)<br>{<br>    int i;<br>    int *pa=a;<br>    int *pb=b;<br>#pragma _min_iteration=4<br>    for (i = 0; i <end; i++) {<br>        *pa++ = i * c >> *pb++;<br>    }<br>    *pa = end;<br>} |
|     cmple C0,r1,0<br>    ld r5,(gp,_a$ - .MN.gptop);;<br>    mov r4,0<br>    ld r6,(gp,_b$ - .MN.gptop)<br>[C0] br L00016;;<br>    mov r3,0<br>    settar L00017<br>L00017<br>    ld r2,(r6+);;<br>    add r4,1;;<br>    cmplt C0,r4,r1<br>    asr r2,r3,r2;;<br>    add r3,r3,r0<br>    st (r5+),r2<br>[C0] jmpf tar;;<br>L00016<br>    st (r5),r1<br>    ret ;; |     mov r5,0<br>    ld r7,(gp,_a$ - .MN.gptop);;<br>    settar C6,C4,L00027<br>    sub r2,r1,2<br>    ld r6,(gp,_b$ - .MN.gptop);;<br><br><br>L00027<br>[C4] asr r3,r5,r4;;<br>[C6] ld r4,(r6+);;<br>[C4] add r5,r5,r0<br>[C4] st (r7+),r3<br>[C6] jloop C6,C4,tar,r2,-1;;<br><br><br>    st (r7),r1<br>    ret ;; |
| 2 + 4×100 + 3 = 405 cycles<br>16 bytes | 2 + 3×101 + 3 = 308 cycles<br>12 bytes |

Fig. 50

Example of loop unrolling being impossible

| C language source with unknown number of loops | Result of compilation |
|---|---|
| void sample(int c, int end)<br>{<br>    int i;<br>#pragma _align_local_pointer=8 pa, pb<br>    int *pa=a;<br>    int *pb=b;<br>#pragma _loop_unroll<br>#pragma _min_iteration=4<br>    for (i = 0; i <end; i++) {<br>        *pa++ = i *c >> *pb++;<br>    }<br>    *pa = end;<br>} | mov r5,0<br>ld r7,(gp,_a$ - .MN.gptop);;<br>settar C6,C4,L00026<br>sub r2,r1,2<br>ld r6,(gp,_b$ - .MN.gptop);;<br>L00026<br>[C4] asr r3,r5,r4;;<br>[C6] ld r4,(r6+);;<br>[C4] add r5,r5,r0<br>[C4] st (r7+),r3<br>[C6] jloop C6,C4,tar,r2,-1;;<br>    st (r7),r1<br>    ret ;; |

Fig. 51

| "#pragma _iteration_even" directive | "#pragma _iteration_odd" directive |
|---|---|
| int a[101];<br>int b[101];<br>void sample(int c, int end)<br>{<br>    int i;<br>#pragma _align_local_pointer=8 pa, pb<br>    int *pa=a;<br>    int *pb=b;<br>#pragma _min_iteration=50<br>#pragma _loop_unroll<br>#pragma _iteration_even<br>    for (i = 0; i <end; i++) {<br>        *pa++ = i * c >> *pb++;<br>    }<br>    *pa = end;<br>} | int a[101];<br>int b[101];<br>void sample(int c, int end)<br>{<br>    int i;<br>#pragma _align_local_pointer=8 pa, pb<br>    int *pa=a;<br>    int *pb=b;<br>#pragma _min_iteration=50<br>#pragma _loop_unroll<br>#pragma _iteration_odd<br>    for (i = 0; i <end; i++) {<br>        *pa++ = i * c >> *pb++;<br>    }<br>    *pa = end;<br>} |
| sub r2,r1,6;;<br>mov r6,0<br>asr r2,1<br>ld r7,(gp,_a$ - .MN.gptop);;<br>settar C6,C4,L00036<br>add r2,1<br>ld r8,(gp,_b$ - .MN.gptop);;<br>L00036<br>[C4] asr r3,r6,r4;;<br>[C4] add r6,r6,r0<br>[C4] st (r7+),r3;;<br>[C4] asr r3,r6,r5;;<br>[C6] ldp r4:r5,(r8+);;<br>[C4] add r6,r6,r0<br>[C4] st (r7+),r3<br>[C6] jloop C6,C4,tar,r2,-1;;<br><br><br><br>st (r7),r1<br>ret ;; | sub r2,r1,7;;<br>mov r6,0<br>asr r2,1<br>ld r7,(gp,_a$ - .MN.gptop);;<br>settar C6,C4,L00046<br>add r2,1<br>ld r8,(gp,_b$ - .MN.gptop);;<br>L00046<br>[C4] asr r3,r6,r4;;<br>[C4] add r6,r6,r0<br>[C4] st (r7+),r3;;<br>[C4] asr r3,r6,r5;;<br>[C6] ldp r4:r5,(r8+);;<br>[C4] add r6,r6,r0<br>[C4] st (r7+),r3<br>[C6] jloop C6,C4,tar,r2,-1;;<br>ld r2,(r8+);;<br>asr r2,r6,r2;;<br>st (r7+),r2;;<br>st (r7),r1<br>ret ;; |

Fig. 53

| "#pragma_no_if_conversion" directive | "#pragma_if_conversion" directive |
|---|---|
| int func(int a)<br>{<br>  int b ;<br>  #pragma_no_if_conversion<br>  if(a == 2)<br>    b = 0 ;<br>  else<br>    b = 1 ;<br>  return b ;<br>} | int func(int a)<br>{<br>  int b ;<br>  #pragma_if_conversion<br>  if(a == 2)<br>    b = 0 ;<br>  else<br>    b = 1 ;<br>  return b ;<br>} |
|     cmpne C0,r0,2 ;;<br>[C0] br  L00002 ;;  // Branch is generated.<br>    mov r0,0<br>    ret  ;;<br>L00002<br>    mov r0,1<br>    ret  ;; ;; |     cmpeq C0:C1,r0,2 ;;<br>[C0] mov r0,0  // Execution instruction with condition is<br>[C1] mov r0,1  // generated instead of branch instruction.<br>    ret  ;; |
| "then" side: 5 cycles, "else" side 7 cycles<br>12 bytes | 4 cycles<br>8 bytes |

Fig. 55

| No designation of alignment | Designation of option "-falign_short_array=4" |
|---|---|
| short src[8];<br>short dst[8];<br><br>void align1(void)<br>{<br>    char dummy;<br>    int i;<br><br>    for(i=0; i<8; i+=2)<br>        dst[i] = src[i] + src[i+1];<br>} | No change |
| addu r5,gp,_src - .MN.gptop<br>addu r4,gp,_src - .MN.gptop+2 ;;<br>addu r3,gp,_dst - .MN.gptop<br>mov r0,2<br>settarC6,C4,L00005 ;;<br>L00005<br>[C4] ldh r1,(r4+)4 ;; // As alignment is unknown,<br>[C4] add r1,r2,r1 // two data are loaded<br>[C6] ldh r2,(r5+)4 ;; // independently (ldh instruction).<br>[C4] sth (r3+)4,r1<br>[C6] jloop C6,C4,tar,r0,-1 ;; //L00005<br>     ret ;; | addu r5,gp,_src - .MN.gptop ;;<br>addu r4,gp,_dst - .MN.gptop ;;<br>mov r0,2<br>settarC6,C4,L00005 ;;<br>L00005<br>[C4] add r1,r2,r3 // As alignment is 4,<br>[C6] ldhp r2:r3,(r5+) ;; // pair access instruction<br>[C4] sth (r4+)4,r1 // (ldhp)is generated.<br>[C6] jloop C6,C4,tar,r0,-1 ;; //L00005<br>    ret ;; |
| 2+4×5+3=25 cycles<br>22 bytes | 2+2×5+3=15 cycles<br>18 bytes |

Fig. 56

| No designation of alignment | Use "#pragma _align_ parm_pointer" directive |
|---|---|
| ```
int align2(short * src)
{
    int   v = 0 ;
    for(int i=0 ; i<100 ; i+=2){
        v += src[i] * src[i+1] ;
    }
    return v ;
}
``` | ```
#pragma   _align_parm_pointer=4 src
int align2(short * src)
{
    int   v = 0 ;
    for(int i=0 ; i<100 ; i+=2){
        v += src[i] * src[i+1] ;
    }
    return v ;
}
``` |
| ```
      mov  r5,0
      mov  r1,48
      settar C6,C4,L00005 ;;
      mov  r4,r0
      add  r3,r0,2
      mul  m0,r2,gp,0 ;;
L00005
[C4]  ldh   r0,(r3+)4   ;;   // Apply software pipelining.
[C4]  lmac  m0,r5,r2,r0,m0  // As alignment of data is unknown,
[C6]  ldh   r2,(r4+)4        // execute ldh instruction twice.
[C6]  jloop C6,C4,tar,r1,-1 ;; //L00005
      mov  r0,r5
      ret  ;;
``` | ```
      mov  r4,0 ;;
      mov  r1,48
      settar C6,C4,L00005 ;;
      mul  m0,r2,gp,0 ;;
L00005
[C4]  lmac  m0,r4,r2,r3,m0    // Apply software pipelining.
[C6]  ldhp  r2:r3,(r0+)       // Pair access instruction is usable.
[C6]  jloop C6,C4,tar,r1,-1 ;; //L00005
      mov  r0,r4
      ret  ;;
``` |
| 2+3×51+3=160 cycles<br>24 bytes | 2+2×51+3=107 cycles<br>18 bytes |

Fig. 57

| No designation of alignment | Use "#pragma _align_local_ pointer" directive |
|---|---|
| ```
void align3(int n)
{
    short * from ;
    short * to ;
    int   i ;

from = &(src[n]) ; to = &(dst[n]) ;
    for(i=0 ; i<16 ; i++, from+=2, to+=2){
        * to = * from ;
        * (to+1) = * (from+1) ;
    }
}
``` | ```
void align3(int n)
{
#   pragma  _align_local_pointer=4 from,to
    short * from ;
    short * to ;
    int   i ;

from = &(src[n]) ; to = &(dst[n]) ;
    for(i=0 ; i<16 ; i++, from+=2, to+=2){
        * to =* from ;
        * (to+1) = * (from+1) ;
    }
}
``` |
| ```
    ld      r3,(gp,_src$ - .MN.gptop) ;;
    ld      r2,(gp,_dst$ - .MN.gptop) ;;
    add     r1,r0,r0 ;;
    mov     r0,13
    add     r6,r3,r1
    add     r5,r2,r1 ;;
    settarC6,L00016
    add     r4,r5,2
    add     r3,r6,2 ;;
L00016
    ldh     r1,(r6+)4 ;;
    ldh     r2,(r3+)4 ;;
    sth     (r5+)4,r1 ;;
    sth     (r4+)4,r2
[C6] jloop  C6,tar,r0,-1 ;;         //L00016
    ret     ;;
``` | ```
    ld      r3,(gp,_src$ - .MN.gptop) ;;
    ld      r2,(gp,_dst$ - .MN.gptop) ;;
    mov     r1,13
    add     r0,r0,r0 ;;
    settarC6,L00016
    add     r4,r3,r0
    add     r0,r2,r0 ;;
L00016
    ldhp    r2:r3,(r4+) ;;
    sthp    (r0+),r2:r3
[C6] jloop  C6,tar,r1,-1 ;;         //L00016
    ret     ;;
``` |
| 5+4×16+3=72 cycles<br>30 bytes | 5+3×16+3=56 cycles<br>22 bytes |

COMPILER APPARATUS WITH FLEXIBLE OPTIMIZATION

BACKGROUND OF THE INVENTION (1) Field of the Invention

The present invention relates to a compiler that translates a source program described in a high-level language such as C language into a machine language program and particularly to a directive concerning a compiler optimization.

(2) Description of the Related Art

A conventional compiler is made mainly for control processing applications. As for the control processing applications, precise execution performance and tuning of a code size is not required so much; rather from the viewpoint of reducing development man-hours, a user gives only rough directives (an option and the like designated at the time of compiling) such as "A higher priority on performance", "A higher priority on a code size", or "Balance between performance and a code size" and leaves most of the optimization strategy to a compiler.

On the other hand, in the field of media processing applications where critical execution performance and a critical code size are required, development is made aiming firstly to realize required performance and a required code size by executing a hand coding by an assembly language.

In recent years, however, the development man-hours have increased by enlargement and diversification of the media processing applications, and application development by a high-level language is also required in the media processing field. As a result, an attempt is made to realize the development of media processing application by a high-level language. In so doing, the user expects that a more precise tuning can be made even in the case of the development by a high-level language, and therefore it is required to control in detail the optimization strategy performed by the compiler.

Consequently, not conventional rough directives but a minute control is required, which designates ON/OFF and its degree for each category of the optimization by the compiler, and turns the optimization ON/OFF in a unit of variables and loop processing in a program.

SUMMARY OF THE INVENTION

In view of the foregoing, it is the object of the present invention to provide a highly-flexible compiler such that a user can control optimization by the compiler precisely.

To achieve the above-mentioned object, the compiler according to the present invention receives a directive on allocation of variables to a global region and executes mapping of the various variables to the global region based on the directive.

As one example, the user can designate the maximum data size of a variable to be allocated to the global region by an option at the time of compilation. This enables the user to control the data size of a variable to be allocated in the global region and therefore it is possible to perform optimization to utilize the global region effectively.

Additionally, the user can designate each variable to allocate/not to allocate it to the global region by a pragma directive put in a source program. This enables the user to distinguish variables that should be allocated to the global region with higher priority from variables that should not be allocated to the global region individually and to manage the optimum allocation of the global region.

Moreover, the compiler according to the present invention receives a directive of software pipelining and performs optimization following the directive. As one example, the user can designate executing no software pipelining by an option at the time of compilation. This restrains an increase of a code size by software pipelining. As an assembler code to which software pipelining is executed is complicated, in order to verify a function of a program, the restraint of software pipelining makes it easy to debug.

Furthermore, the user can designate, for each loop processing, executing/not executing software pipelining and executing software pipelining removing/not removing a prolog portion and an epilog portion. This enables the user to select, for each loop processing, executing/not executing software pipelining and software pipelining emphasizing a code size (removing the prolog portion and the epilog portion) or speed (not removing the prolog portion and the epilog portion).

Additionally, the compiler according to the present invention receives a directive of loop unrolling and performs optimization by loop unrolling following the directive. As one example, the user can designate not executing loop unrolling by an option at the time of compilation. This makes it possible to avoid an increase of a code size by loop unrolling.

Moreover, the user can designate, for each loop processing, executing/not executing loop unrolling by a pragma directive in the source program. This enables the user to take the number of iterations and the like into consideration for each loop processing and select optimization emphasizing execution speed or a code size.

Furthermore, the compiler according to the present invention receives a directive on the number of iterations of loop processing and performs optimization following the directive. As one example, the user can guarantee, for each loop processing, the minimum number of iterations by a pragma directive in the source program. This makes it unnecessary to generate a code (an escape code) that is needed when the number of iterations is 0 and possible to perform the optimization by software pipelining and loop unrolling.

Additionally, the user can guarantee, for each loop processing, that the number of iterations is even/odd by a pragma directive in the source program. This makes it possible to perform the optimization by loop unrolling for each loop processing even though the number of iterations is unknown and the execution speed can be improved.

Moreover, the compiler according to the present invention receives a directive on an "if" conversion and performs optimization by the "if" conversion following the directive. As one example, the user can designate not making the "if" conversion by an option at the time of compilation. This makes it possible to prevent a problem that execution of the side with fewer instructions is constrained by the side with more instructions by the "if" conversion from happening when the balance of the number of instructions is not harmonious at a "then" side and an "else" side of an "if" structure.

Furthermore, the user can designate, for each loop processing, making/not making the "if" conversion by a pragma directive in the source program. This makes it possible to take characteristics of each loop processing (balance of the number of instructions at the "then" side and the "else" side, balance of expected frequency of occurrence and the like) into consideration and make a selection (to make/not to make the "if" conversion) expected to further improve the execution speed.

Additionally, the compiler according to the present invention receives a directive on alignment for allocating array data to the memory region and performs optimization following the directive. As an example, the user can designate alignment by the number of bytes for array data of a specific type by an option at the time of compilation. A pair instruction for executing transfer of two kinds of data between the memory and the register at the same time is generated by this and the execution speed improves.

Moreover, the user can designate alignment that a pointer variable indicates by a pragma directive in the source program. This makes it possible to generate a pair instruction for each data and the execution speed improves.

As is described above, the compiler according to the present invention enables the user to designate ON/OFF and its degree for each category of the optimization by the compiler and to execute not conventional rough directives but a minute control that turns the optimization ON/OFF in a unit of variables and loop processing in a program. The compiler is especially effective in developing an application to process media that needs a precise tuning of the optimization and its practical value is extremely high.

Note that the present invention can be realized not only as the above-mentioned compiler apparatus but also as a program for exchanging units that the compiler apparatus like this includes for steps and as a source program that includes directives to the compiler apparatus. It is needless to say that such a program can be widely distributed by recording medium such as a CD-ROM and transmission medium such as Internet.

As further information about technical background to this application, Japanese patent application No. 2002-195305 filed on Jul. 3, 2002 is incorporated herein by reference.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings:

FIG. 11 is a diagram showing a configuration of a program status register (PSR) of the processor.

FIG. 12 is a diagram showing a configuration of a condition flag register (CFR) of the processor.

FIG. 21 is a diagram explaining an instruction belonging to a category "ALUadd (addition) system)".

FIG. 22 is a diagram explaining an instruction belonging to a category "ALUsub (subtraction) system)".

FIG. 23 is a diagram explaining an instruction belonging to a category "ALUlogic (logical operation) system and the like".

FIG. 24 is a diagram explaining an instruction belonging to a category "CMP (comparison operation) system".

FIG. 25 is a diagram explaining an instruction belonging to a category "mul (multiplication) system".

FIG. 26 is a diagram explaining an instruction belonging to a category "mac (sum of products operation) system".

FIG. 27 is a diagram explaining an instruction belonging to a category "msu (difference of products) system".

FIG. 28 is a diagram explaining an instruction belonging to a category "MEMld (load from memory) system".

FIG. 29 is a diagram explaining an instruction belonging to a category "MEMstore (store in memory) system".

FIG. 30 is a diagram explaining an instruction belonging to a category "BRA (branch) system".

Figure 31:
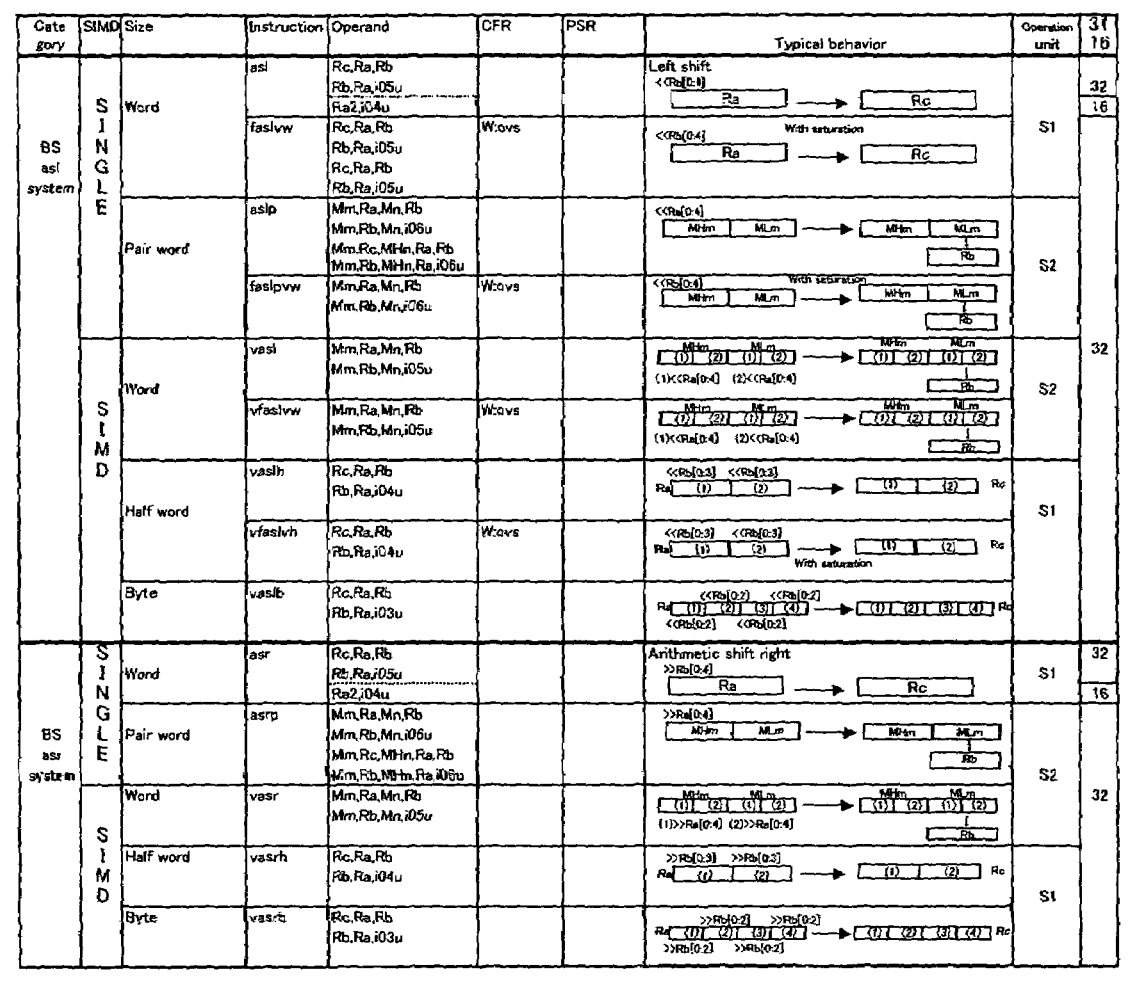

FIG. 31 is a diagram explaining an instruction belonging to a category "BSasl (arithmetic barrel shift) system and the like".

FIG. 33 is a diagram explaining an instruction belonging to a category "CNVvaln (arithmetic conversion) system".

FIG. 34 is a diagram explaining an instruction belonging to a category "CNV (general conversion) system".

FIG. 35 is a diagram explaining an instruction belonging to a category "SATvlpk (saturation processing) system".

FIG. 36 is a diagram explaining an instruction belonging to a category "ETC (et cetera) system".

FIG. 40 is a diagram showing a concrete example of optimization by the global region allocation unit.

FIG. 41 is a diagram showing a concrete example of optimization by the global region allocation unit.

FIG. 42 is a diagram showing a concrete example of optimization by the global region allocation unit.

FIG. 45 is a diagram showing a concrete example of optimization by a software pipelining unit.

FIG. 47 is a diagram showing a concrete example of optimization by a loop unrolling unit.

FIG. 48 is a diagram showing a concrete example of optimization by a loop unrolling unit.

FIG. 49 is a diagram showing a concrete example of optimization by a loop unrolling unit.

FIG. 50 is a diagram showing a concrete example of optimization by a loop unrolling unit.

FIG. 51 is a diagram showing a concrete example of optimization by a loop unrolling unit.

FIG. 53 is a diagram showing a concrete example of optimization by an "if" conversion unit.

FIG. 55 is a diagram showing a concrete example of optimization by a pair instruction generation unit.

FIG. 56 is a diagram showing a concrete example of optimization by a pair instruction generation unit.

FIG. 57 is a diagram showing a concrete example of optimization by a pair instruction generation unit.

DESCRIPTION OF THE PREFERRED EMBODIMENT(S)

The compiler according to the present embodiment of the present invention is explained below in detail using the figures.

The compiler according to the present embodiment is a cross compiler that translates a source program described in a high-level language such as C language into a machine language program that a specific processor can execute and has a characteristic that it can designate directives of optimization minutely concerning a code size and execution time of the machine language program to be generated.

For a start, an example of a processor that is an object of the compiler according to the present embodiment is explained using FIG. 1 through FIG. 36.

The processor that is the object of the compiler according to the present embodiment is, for example, a general-purpose processor that has been developed targeting on the field of AV media signal processing technology, and executable instructions has higher parallelism compared with ordinary microcomputers.

Figure 1:
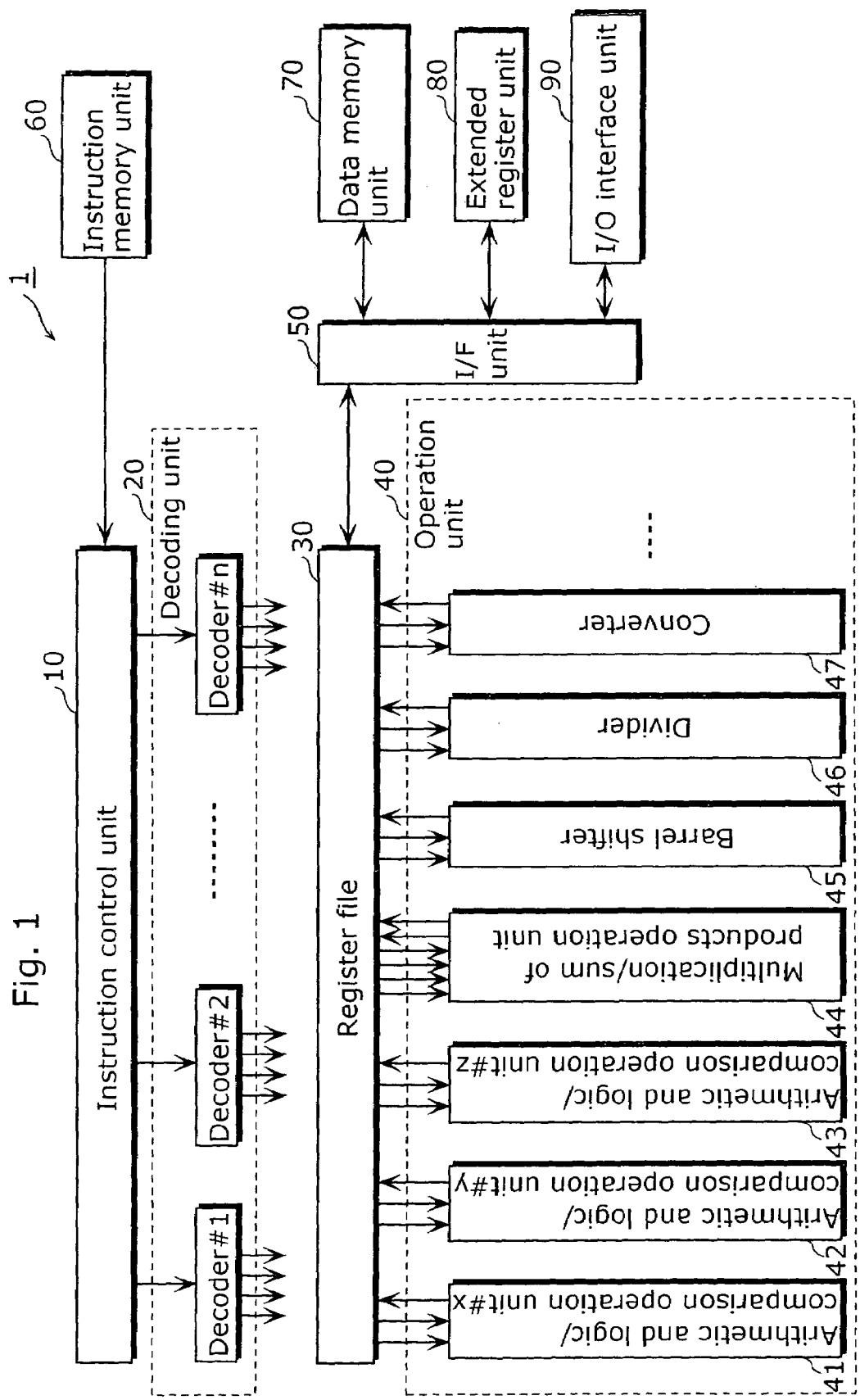
FIG. 1 is a schematic block diagram showing a processor that is an object of a compiler according to the present invention.

FIG. 1 is a schematic block diagram showing the present processor. The processor 1 is comprised of an instruction control unit 10, a decoding unit 20, a register file 30, an operation unit 40, an I/F unit 50, an instruction memory unit 60, a data memory unit 70, an extended register unit 80, and an I/O interface unit 90. The operation unit 40 includes arithmetic and logic/comparison operation units 41~43, a multiplication/sum of products operation unit 44, a barrel shifter 45, a divider 46, and a converter 47 for performing SIMD instructions. The multiplication/sum of products operation unit 44 is capable of handling maximum of 65-bit accumulation so as not to decrease bit precision. The multiplication/sum of products operation unit 44 is also capable of executing SIMD instructions as in the case of the arithmetic and logic/comparison operation units 41~43. Furthermore, the processor 1 is capable of parallel execution of an arithmetic and logic/comparison operation instruction on maximum of three data elements.

Figure 2:
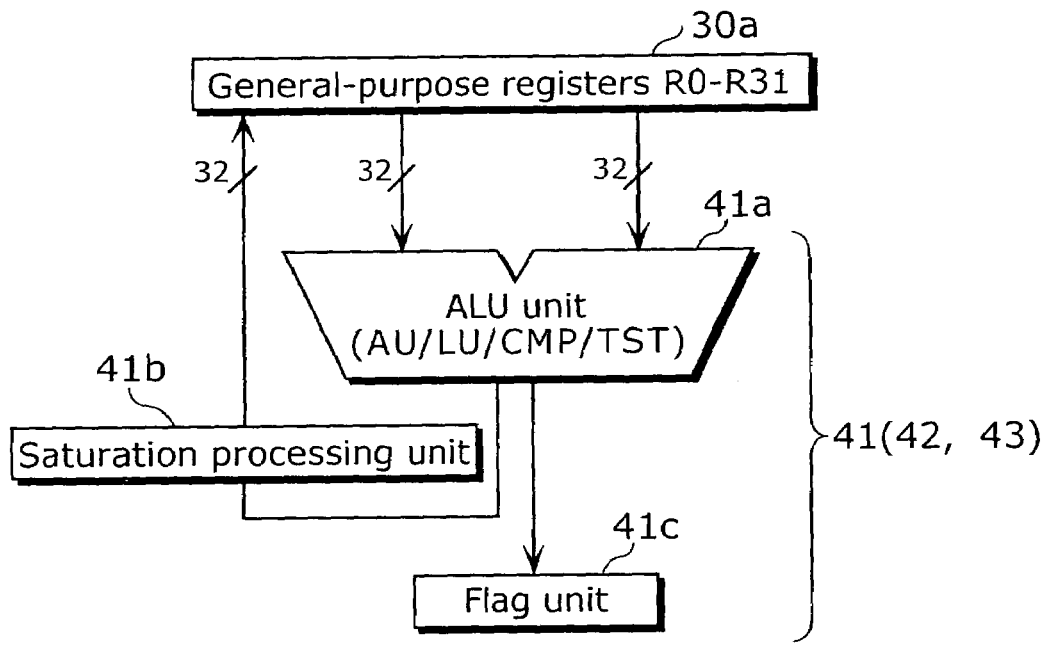
FIG. 2 is a schematic diagram showing arithmetic and logic/comparison operation units of the processor.

FIG. 2 is a schematic diagram showing the arithmetic and logic/comparison operation units 41~43. Each of the arithmetic and logic/comparison operation units 41~43 is made up of an ALU unit $41a$, a saturation processing unit $41b$, and a flag unit $41c$. The ALU unit $41a$ includes an arithmetic operation unit, a logical operation unit, a comparator, and a TST. The bit widths of operation data to be supported are 8 bits (use four operation units in parallel), 16 bits (use two operation units in parallel) and 32 bits (process 32-bit data using all operation units). For a result of an arithmetic operation, the flag unit $41c$ and the like detect an overflow and generate a condition flag. For a result of each of the operation units, the comparator and the TST, an arithmetic shift right, saturation by the saturation processing unit $41b$, the detection of maximum/minimum values, absolute value generation processing are performed.

Figure 3:
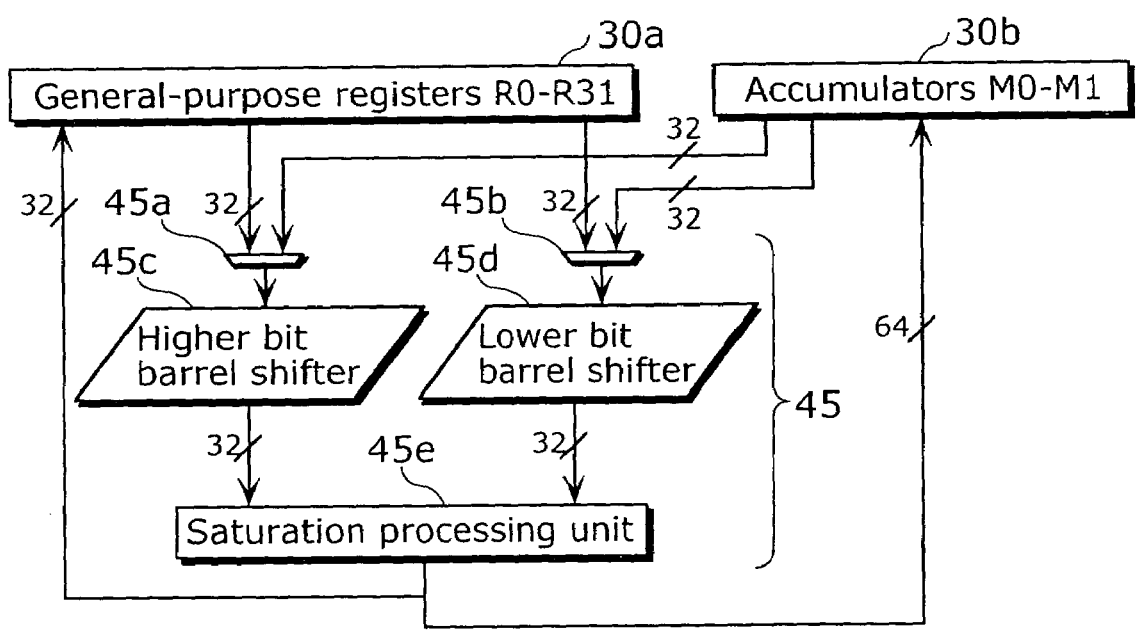
FIG. 3 is a block diagram showing a configuration of a barrel shifter of the processor.

FIG. 3 is a block diagram showing the configuration of the barrel shifter 45. The barrel shifter 45, which is made up of selectors $45a$ and $45b$, a higher bit shifter $45c$, a lower bit shifter $45d$, and a saturation processing unit $45e$, executes an arithmetic shift of data (shift in the 2's complement number system) or a logical shift of data (unsigned shift). Usually, 32-bit or 64-bit data are inputted to and outputted from the barrel shifter 45. The amount of shift of target data stored in the registers $30a$ and $30b$ are specified by another register or according to its immediate value. An arithmetic or logical shift in the range of left 63 bits and right 63 bits is performed for the data, which is then outputted in an input bit length.

The barrel shifter 45 is capable of shifting 8-, 16-, 32-, and 64-bit data in response to a SIMD instruction. For example, the barrel shifter 45 can shift four pieces of 8-bit data in parallel.

Arithmetic shift, which is a shift in the 2's complement number system, is performed for aligning decimal points at the time of addition and subtraction, for multiplying a power of 2 (2, the $2^{nd}$ power of 2, the $-1^{st}$ power of 2) and other purposes.

Figure 4:
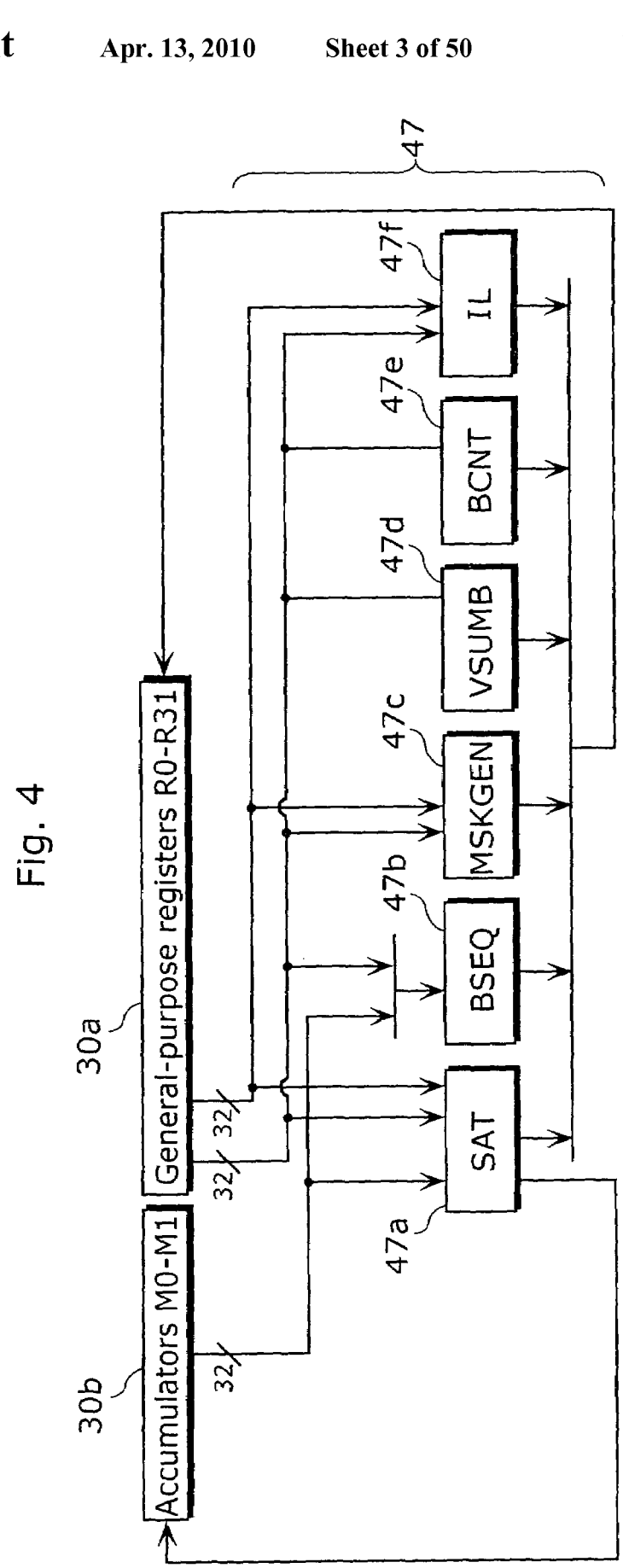
FIG. 4 is a block diagram showing a configuration of a converter of the processor.

FIG. 4 is a block diagram showing the configuration of the converter 47. The converter 47 is made up of a saturation block (SAT) $47a$, a BSEQ block $47b$, an MSKGEN block $47c$, a VSUMB block $47d$, a BCNT block $47e$, and an IL block $47f$.

The saturation block (SAT) $47a$ performs saturation processing for input data. Having two blocks for the saturation processing of 32-bit data makes it possible to support a SIMD instruction executed for two data elements in parallel.

The BSEQ block $47b$ counts consecutive 0s or 1s from the MSB.

The MSKGEN block $47c$ outputs a specified bit segment as 1, while outputting the others as 0.

The VSUMB block $47d$ divides the input data into specified bit widths, and outputs their total sum.

The BCNT block $47e$ counts the number of bits in the input data specified as 1.

The IL block $47f$ divides the input data into specified bit widths, and outputs a value resulted from exchanging the position of each data block.

Figure 5:
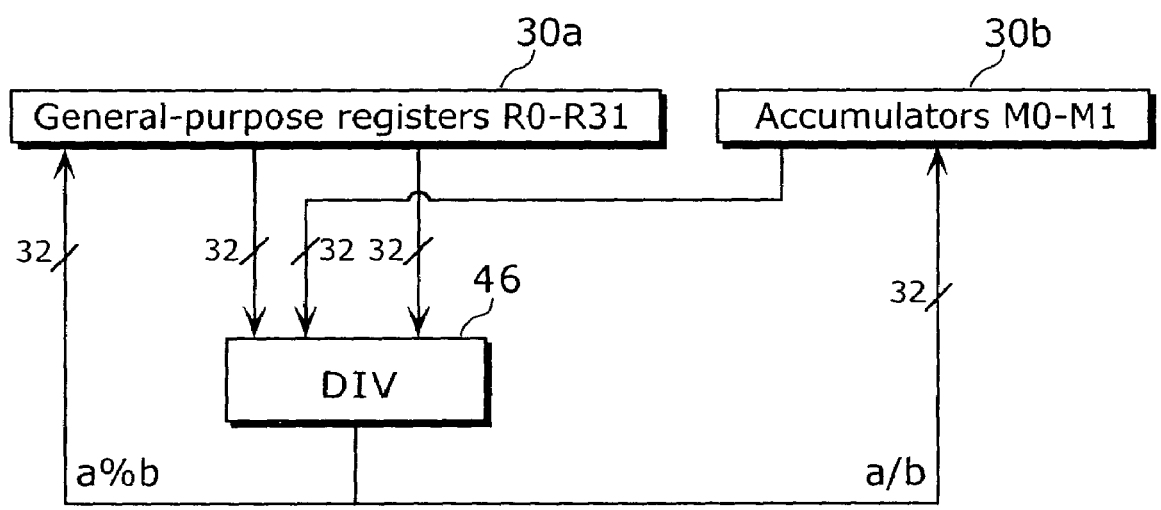
FIG. 5 is a block diagram showing a configuration of a divider of the processor.

FIG. 5 is a block diagram showing the configuration of the divider 46. Letting a dividend be 64 bits and a divisor be 32 bits, the divider 46 outputs 32 bits as a quotient and a modulo, respectively. 34 cycles are involved for obtaining a quotient and a modulo. The divider 46 can handle both singed and unsigned data. Note, however, that an identical setting is made concerning the presence/absence of signs of data serving as a dividend and a divisor. Also, the divider 46 has the capability of outputting an overflow flag, and a 0 division flag.

Figure 6:
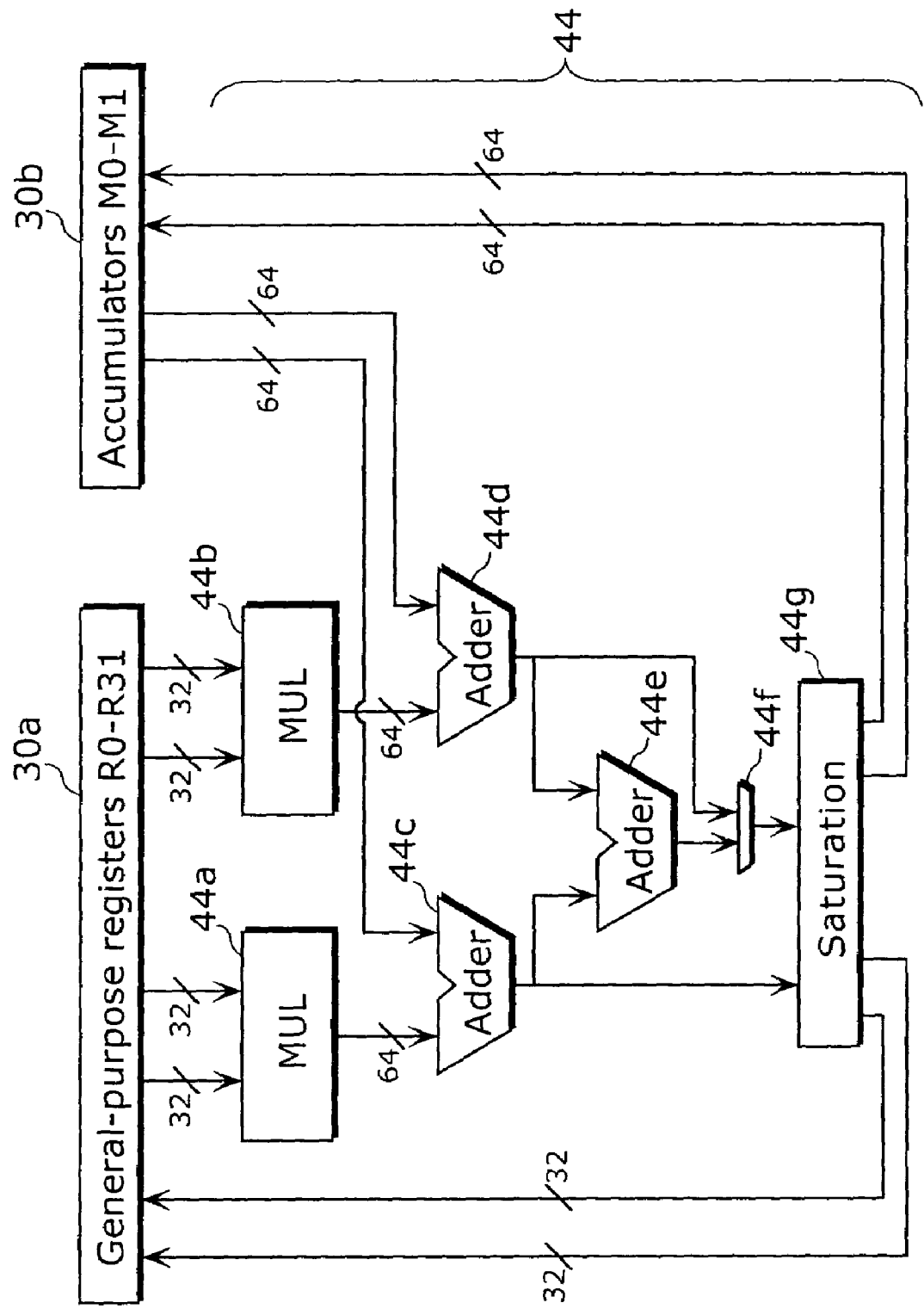
FIG. 6 is a block diagram showing a configuration of a multiplication/sum of products operation unit of the processor.

FIG. 6 is a block diagram showing the configuration of the multiplication/sum of products operation unit 44. The multiplication/sum of products operation unit 44, which is made up of two 32-bit multipliers (MUL) $44a$ and $44b$, three 64-bit adders (Adder) $44c$~$44e$, a selector $44f$ and a saturation processing unit (Saturation) 44g, performs the following multiplications and sums of products:

32×32-bit signed multiplication, sum of products, and difference of products;

32×32-bit unsigned multiplication;

16×16-bit signed multiplication, sum of products, and difference of products performed on two data elements in parallel; and 32×16-bit t signed multiplication, sum of products, and difference of products performed on two data elements in parallel;

The above operations are performed on data in integer and fixed point format (h1, h2, w1, and w2). Also, the results of these operations are rounded and saturated.

Figure 7:
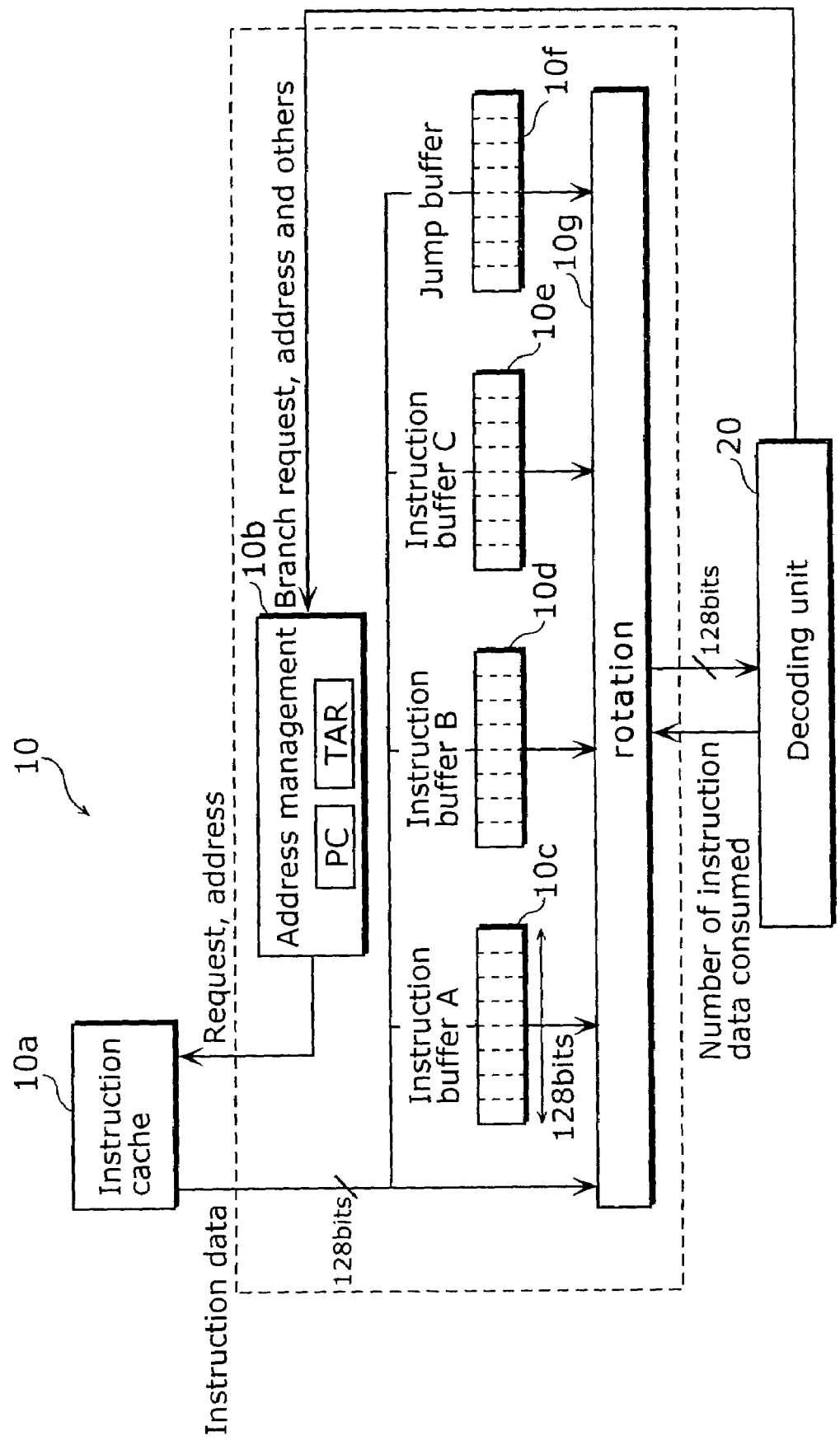
FIG. 7 is a block diagram showing a configuration of an instruction control unit of the processor.

FIG. 7 is a block diagram showing the configuration of the instruction control unit 10. The instruction control unit 10, which is made up of an instruction cache 10a, an address management unit 10b, instruction buffers 10c~10e, a jump buffer 10f, and a rotation unit (rotation) 10g, issues instructions at ordinary times and at branch points. Having three 128-bit instruction buffers (the instruction buffers 10c~10e) makes it possible to support the maximum number of parallel instruction execution. Regarding branch processing, the instruction control unit 10 stores in advance a branch destination address in the below-described TAR register via the jump buffer 10f and others before performing a branch (settar instruction). The branch is performed using the branch destination address stored in the TAR register.

Note that the processor 1 is a processor employing the VLIW architecture. The VLIW architecture is an architecture allowing a plurality of instructions (e.g. load, store, operation, and branch) to be stored in a single instruction word, and such instructions to be executed all at once. By programmers describing a set of instructions which can be executed in parallel as a single issue group, it is possible for such issue group to be processed in parallel. In this specification, the delimiter of an issue group is indicated by ";;" Notational examples are described below.

Example 1 mov r1, 0x23;;

This instruction description indicates that only an instruction "mov" shall be executed.

Example 2 mov r1, 0x38 add r0, r1, r2 sub r3, r1, r2;;

These instruction descriptions indicate that three instructions of "mov", "add" and "sub" shall be executed in parallel.

The instruction control unit 10 identifies an issue group and sends it to the decoding unit 20. The decoding unit 20 decodes the instructions in the issue group, and controls resources required for executing such instructions.

Next, an explanation is given for registers included in the processor 1.

Table 1 below lists a set of registers of the processor 1.

TABLE 1

| Register name | Bit width | No. of registers | Usage |
|---|---|---|---|
| R0~R31 | 32 bits | 32 | General-purpose registers. Used as data memory pointer, data storage and the like when operation instruction is executed. |
| TAR | 32 bits | 1 | Branch register. Used as branch address storage at branch point. |
| LR | 32 bits | 1 | Link register. |
| SVR | 16 bits | 2 | Save register. Used for saving condition flag (CFR) and various modes. |
| M0~M1 (MH0:ML0~ MH1~ML1) | 64 bits | 2 | Operation registers. Used as data storage when operation instruction is executed. |

Table 2 below lists a set of flags (flags managed in a condition flag register and the like described later) of the processor 1.

TABLE 2

| Flag name | Bit width | No. of flags | Usage |
|---|---|---|---|
| C0~C7 | 1 | 8 | Condition flags. Indicate if condition is established or not. |
| VC0~VC3 | 1 | 4 | Condition flags for media processing extension instruction. Indicate if condition is established or not. |
| OVS | 1 | 1 | Overflow flag. Detects overflow at the time of operation. |
| CAS | 1 | 1 | Carry flag. Detects carry at the time of operation. |
| BPO | 5 | 1 | Specifies bit position. Specifies bit positions to be processed when mask processing instruction is executed. |
| ALN | 2 | 1 | Specified byte alignment. |
| FXP | 1 | 1 | Fixed point operation mode. |
| UDR | 32 | 1 | Undefined register. |

Figure 8:
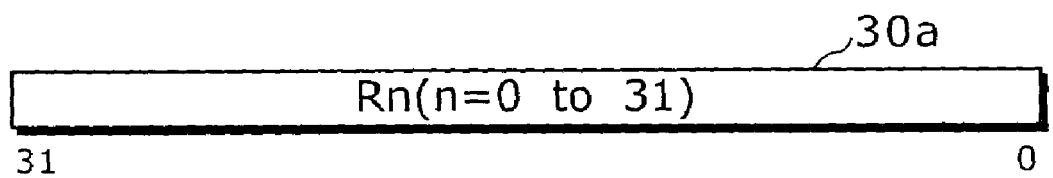
FIG. 8 is a diagram showing a configuration of general-purpose registers (R0~R31) of the processor.

FIG. 8 is a diagram showing the configuration of the general-purpose registers (R0~R31) 30a. The general-purpose registers (R0~R31) 30a are a group of 32-bit registers that constitute an integral part of the context of a task to be executed and that store data or addresses. Note that the general-purpose registers R30 and R31 are used by hardware as a global pointer and a stack pointer respectively.

Figure 9:
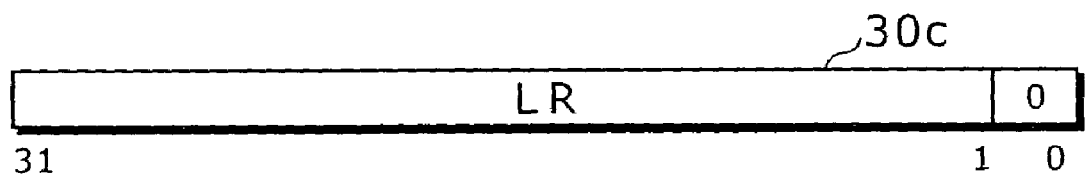
FIG. 9 is a diagram showing a configuration of a link register (LR) of the processor.

FIG. 9 is a diagram showing the configuration of a link register (LR) 30c. In connection with this link register (LR) 30c, the processor 1 also has a save register (SVR) not illustrated in the diagram. The link register (LR) 30c is a 32-bit register for storing a return address at the time of a function call. Note that the save register (SVR) is a 16-bit register for saving a condition flag (CFR.CF) of the condition flag register at the time of a function call. The link register (LR) 30c is used also for the purpose of increasing the speed of loops, as in the case of a branch register (TAR) to be explained later. 0 is always read out as the lower 1 bit, but 0 must be written at the time of writing.

For example, when "call" (brl, jmpl) instruction is executed, the processor 1 saves a return address in the link register (LR) 30c and saves a condition flag (CFR.CF) in the save register (SVR). When "jmp" instruction is executed, the processor 1 fetches the return address (branch destination address) from the link register (LR) 30c, and returns a program counter (PC). Furthermore, when "ret (jmpr)" instruction is executed, the processor 1 fetches the branch destination address (return address) from the link register (LR) 30c, and stores (restores) it in/to the program counter (PC). Moreover, the processor 1 fetches the condition flag from the save register (SVR) so as to store (restores) it in/to a condition flag area CFR.CF in the condition flag register (CFR) 32.

Figure 10:
FIG. 10 is a diagram showing a configuration of a branch register (TAR) of the processor.

FIG. 10 is a diagram showing the configuration of the branch register (TAR) 30d. The branch register (TAR) 30d is a 32-bit register for storing a branch target address, and used mainly for the purpose of increasing the speed of loops. 0 is always read out as the lower 1 bit, but 0 must be written at the time of writing.

For example, when "jmp" and "jloop" instructions are executed, the processor 1 fetches a branch destination address from the branch register (TAR) 30d, and stores it in the program counter (PC). When the instruction indicated by the address stored in the branch register (TAR) 30d is stored in a branch instruction buffer, a branch penalty will be 0. An increased loop speed can be achieved by storing the top address of a loop in the branch register (TAR) 30d.

FIG. 11 is a diagram showing the configuration of a program status register (PSR) 31. The program status register (PSR) 31, which constitutes an integral part of the context of a task to be executed, is a 32-bit register for storing the following processor status information:

Bit SWE: indicates whether the switching of VMP (Virtual Multi-Processor) to LP (Logical Processor) is enabled or disabled. "0" indicates that switching to LP is disabled and "1" indicates that switching to LP is enabled.

Bit FXP: indicates a fixed point mode. "0" indicates the mode 0 and "1" indicates the mode 1.

Bit IH: is an interrupt processing flag indicating that maskable interrupt processing is ongoing or not. "1" indicates that there is an ongoing interrupt processing and "0" indicates that there is no ongoing interrupt processing. This flag is automatically set on the occurrence of an interrupt. This flag is used to make a distinction of whether interrupt processing or program processing is taking place at a point in the program to which the processor returns in response to "rti" instruction.

Bit EH: is a flag indicating that an error or an NMI is being processed or not. "0" indicates that error/NMI interrupt processing is not ongoing and "1" indicates that error/NMI interrupt processing is ongoing. This flag is masked if an asynchronous error or an NMI occurs when EH=1. Meanwhile, when VMP is enabled, plate switching of VMP is masked.

Bit PL [1:0]: indicates a privilege level. "00" indicates the privilege level 0, i.e. the processor abstraction level, "01" indicates the privilege level 1 (non-settable), "10" indicates the privilege level 2, i.e. the system program level, and "11" indicates the privilege level 3, i.e. the user program level.

Bit LPIE3: indicates whether LP-specific interrupt 3 is enabled or disabled. "1" indicates that an interrupt is enabled and "0" indicates that an interrupt is disabled.

Bit LPIE2: indicates whether LP-specific interrupt 2 is enabled or disabled. "1" indicates that an interrupt is enabled and "0" indicates that an interrupt is disabled.

Bit LPIE1: indicates whether LP-specific interrupt 1 is enabled or disabled. "1" indicates that an interrupt is enabled and "0" indicates that an interrupt is disabled.

Bit LPIE0: indicates whether LP-specific interrupt 0 is enabled or disabled. "1" indicates that an interrupt is enabled and "0" indicates that an interrupt is disabled.

Bit AEE: indicates whether a misalignment exception is enabled or disabled. "1" indicates that a misalignment exception is enabled and "0" indicates that a misalignment exception is disabled.

Bit IE: indicates whether a level interrupt is enabled or disabled. "1" indicates that a level interrupt is enabled and "0" indicates a level interrupt is disabled.

Bit IM [7:0]: indicates an interrupt mask, and ranges from levels 0~7, each being able to be masked at its own level. Level 0 is the highest level. Of interrupt requests which are not masked by any IMs, only the interrupt request with the highest level is accepted by the processor 1. When an interrupt request is accepted, levels below the accepted level are automatically masked by hardware. IM[0] denotes a mask of level 0, IM[1] a mask of level 1, IM[2] a mask of level 2, IM[3] a mask of level 3, IM[4] a mask of level 4, IM[5] a mask of level 5, IM[6] a mask of level 6, and IM[7] a mask of level 7.

reserved: indicates a reserved bit. 0 is always read out. 0 must be written at the time of writing.

FIG. 12 is a diagram showing the configuration of the condition flag register (CFR) 32. The condition flag register (CFR) 32, which constitutes an integral part of the context of a task to be executed, is a 32-bit register made up of condition flags, operation flags, vector condition flags, an operation instruction bit position specification field, and a SIMD data alignment information field.

Bit ALN [1:0]: indicates an alignment mode. An alignment mode of "valnvc" instruction is set.

Bit BPO [4:0]: indicates a bit position. It is used in an instruction that requires a bit position specification.

Bit VC0~VC3: are vector condition flags. Starting from a byte on the LSB side or a half word through to the MSB side, each corresponds to a flag ranging from VC0 through to VC3.

Bit OVS: is an overflow flag (summary). It is set on the detection of saturation and overflow. If not detected, a value before the instruction is executed is retained. Clearing of this flag needs to be carried out by software.

Bit CAS: is a carry flag (summary). It is set when a carry occurs under "addc" instruction, or when a borrow occurs under "subc" instruction. If there is no occurrence of a carry under "addc" instruction, or a borrow under "subc" instruction, a value before the instruction is executed is retained. Clearing of this flag needs to be carried out by software.

Bit C0~C7: are condition flags, which indicate a condition (TRUE/FALSE) in an execution instruction with a condition. The correspondence between the condition of the execution instruction with the condition and the bits C0~C7 is decided by the predicate bit included in the instruction. Note that the value of the flag C7 is always 1. A reflection of a FALSE condition (writing of 0) made to the flag C7 is ignored.

reserved: indicates a reserved bit. 0 is always read out. 0 must be written at the time of writing.

Figure 13A:
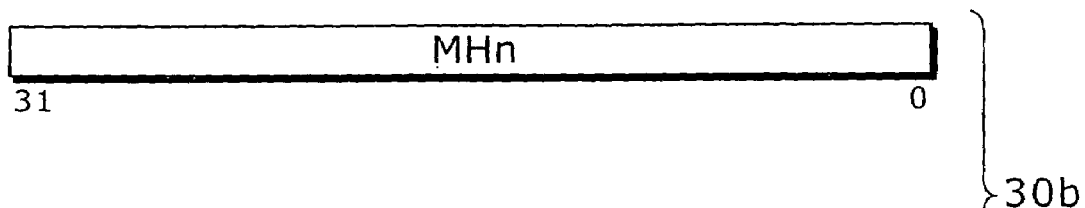
FIGS. 13A and 13B are diagrams showing configurations of accumulators (M0, M1) of the processor.
Figure 13B:
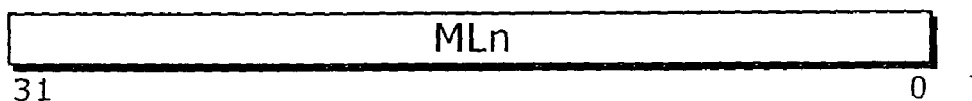

FIGS. 13A and 13B are diagrams showing the configurations of accumulators (M0, M1) 30b. Such accumulators (M0, M1) 30b, which constitute an integral part of the context of a task to be executed, are made up of a 32-bit register MH0-MH1 (register for multiply and divide/sum of products (the higher 32 bits)) shown in FIG. 13A and a 32-bit register ML0-ML1 (register for multiply and divide/sum of products (the lower 32 bits)) shown in FIG. 13B.

The register MH0-MH1 is used for storing the higher 32 bits of operation results at the time of a multiply instruction, while used as the higher 32 bits of the accumulators at the time of a sum of products instruction. Moreover, the register MH0-MH1 can be used in combination with the general-purpose registers in the case where a bit stream is handled. Meanwhile, the register ML0-ML1 is used for storing the lower 32 bits of operation results at the time of a multiply instruction, while used as the lower 32 bits of the accumulators at the time of a sum of products instruction.

Figure 14:
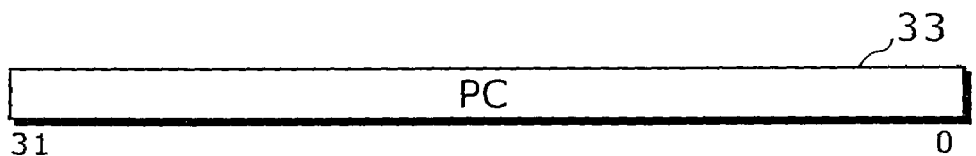
FIG. 14 is a diagram showing a configuration of a program counter (PC) of the processor.

FIG. 14 is a diagram showing the configuration of a program counter (PC) 33. This program counter (PC) 33, which constitutes an integral part of the context of a task to be executed, is a 32-bit counter that holds the address of an instruction being executed.

Figure 15:
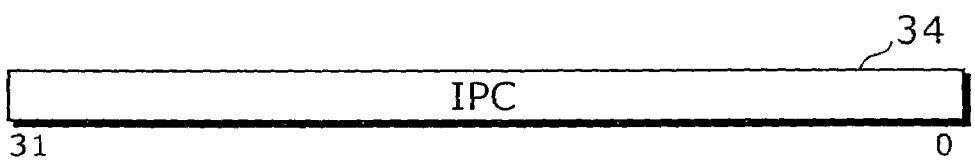
FIG. 15 is a diagram showing a configuration of a PC save register (IPC) of the processor.

FIG. 15 is a diagram showing the configuration of a PC save register (IPC) 34. This PC save register (IPC) 34, which constitutes an integral part of the context of a task to be executed is a 32-bit register.

Figure 16:
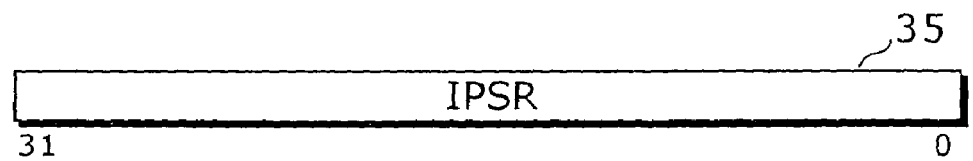
FIG. 16 is a diagram showing a configuration of a PSR save register (IPSR) of the processor.

FIG. 16 is a diagram showing the configuration of a PSR save register (IPSR) 35. This PSR save register (IPSR) 35, which constitutes an integral part of the context of a task to be executed, is a 32-bit register for saving the program status register (PSR) 31. 0 is always read out as a part corresponding to a reserved bit, but 0 must be written at the time of writing.

Next, an explanation is given for the memory space of the processor 1, which is the object of the compiler according to the present embodiment. For example, in the processor 1, a linear memory space with a capacity of 4 GB is divided into 32 segments, and an instruction SRAM (Static RAM) and a data SRAM are allocated to 128-MB segments. With a 128-MB segment serving as one block, an object block to be accessed is set in a SAR (SRAM Area Register). A direct access is made to the instruction SRAM/data SRAM when the accessed address is a segment set in the SAR, but an access request shall be issued to a bus controller (BCU) when such address is not a segment set in the SAR. An on chip memory (OCM), an external memory, an external device, an I/O port and the like are connected to the BUC. Data reading/writing from and to these devices is possible.

Figure 17:
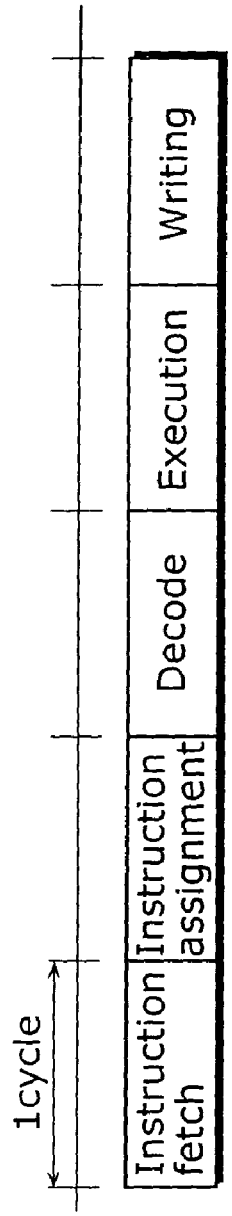
FIG. 17 is a timing diagram showing a pipeline behavior of the processor.

FIG. 17 is a timing diagram showing the pipeline behavior of the processor 1, which is the object of the compiler according to the present embodiment. As illustrated in the diagram, the pipeline of the processor 1 basically consists of the following five stages: instruction fetch; instruction assignment (dispatch); decode; execution; and writing.

Figure 18:
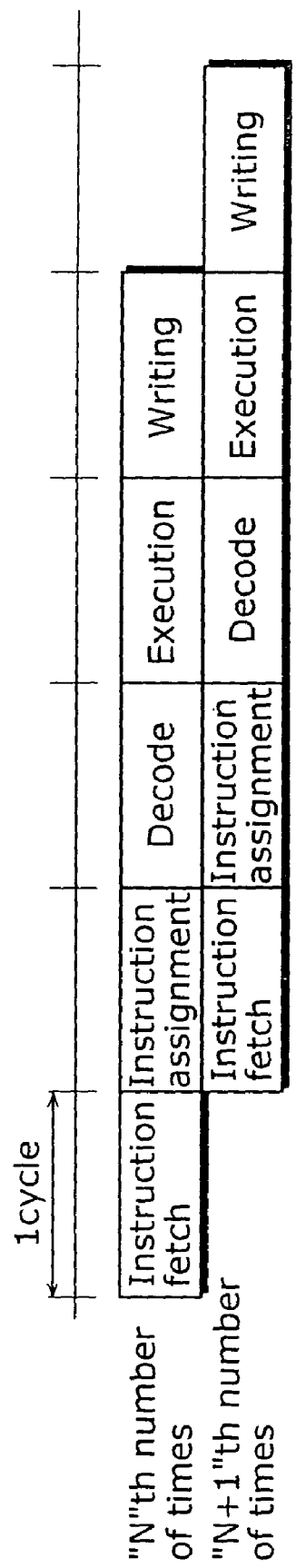
FIG. 18 is a timing diagram showing each stage of the pipeline behavior of the processor at the time of executing an instruction.
Figure 19:
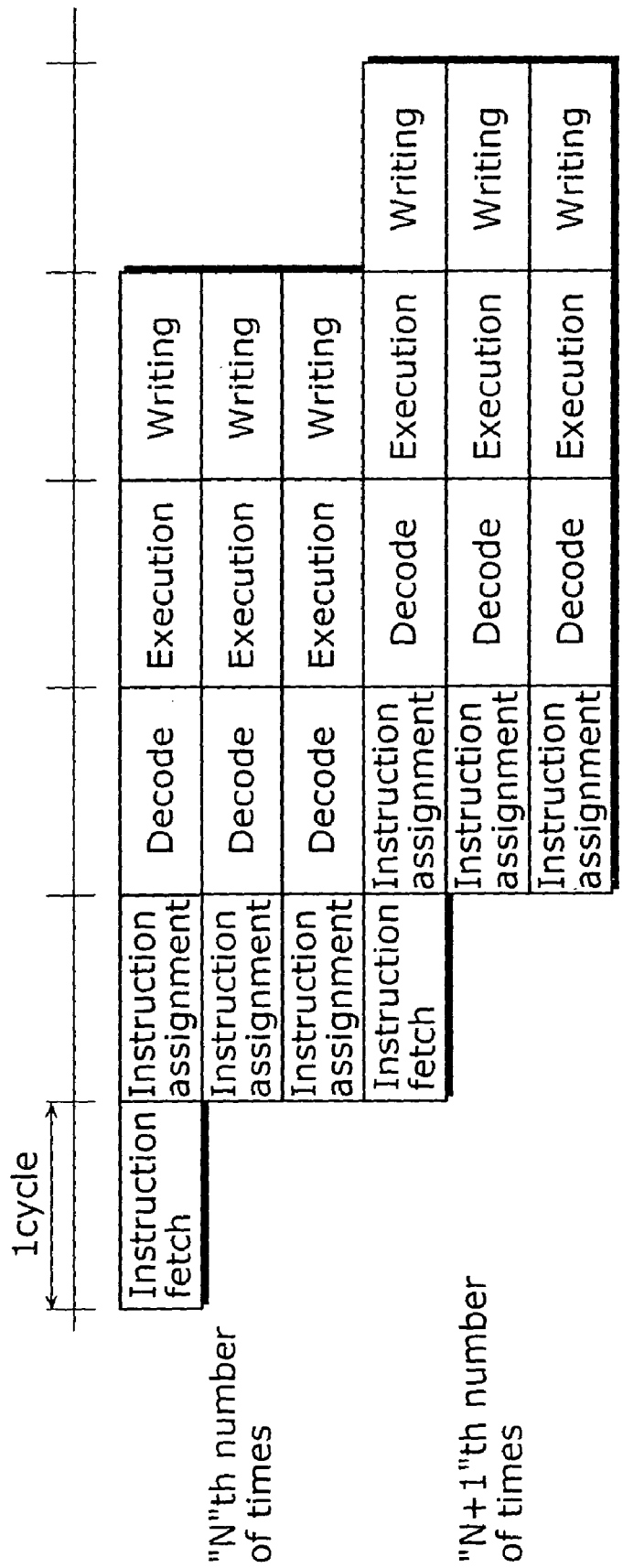
FIG. 19 is a diagram showing a parallel behavior of the processor.

FIG. 18 is a timing diagram showing each stage of the pipeline behavior of the processor 1 at the time of executing an instruction. In the instruction fetch stage, an access is made to an instruction memory which is indicated by an address specified by the program counter (PC) 33, and an instruction is transferred to the instruction buffers 10c~10e and the like. In the instruction assignment stage, the output of branch destination address information in response to a branch instruction, the output of an input register control signal, the assignment of a variable length instruction are carried out, which is followed by the transfer of the instruction to an instruction register (IR). In the decode stage, the IR is inputted to the decoding unit 20, and an operation unit control signal and a memory access signal are outputted. In the execution stage, an operation is executed and the result of the operation is outputted either to the data memory or the general-purpose registers (R0~R31) 30a. In the writing stage, a value obtained as a result of data transfer, and the operation results are stored in the general-purpose registers.

The VLIW architecture of the processor 1, which is the object of the compiler according to the present embodiment, allows parallel execution of the above processing on maximum of three data elements. Therefore, the processor 1 performs the behavior shown in FIG. 18 in parallel at the timing shown in FIG. 19.

Next, an explanation is given for a set of instructions executed by the processor 1 with the above configuration.

Tables 3~5 list categorized instructions to be executed by the processor 1, which is the object of the compiler according to the present embodiment.

TABLE 3

| Category | Operation unit | Instruction operation code |
|---|---|---|
| Memory transfer instruction (load) | M | ld, ldh, ldhu, ldb, ldbu, ldp, ldhp, ldbp, ldbh, ldbuh, ldbhp, ldbuhp |
| Memory transfer instruction (store) | M | st, sth, stb, stp, sthp, stbp, stbh, stbhp |
| Memory transfer instruction (others) | M | dpref, ldstb |
| External register transfer instruction | M | rd, rde, wt, wte |
| Branch instruction | B | br, brl, call, jmp, jmpl, jmpr, ret, jmpf, jloop, setbb, setlr, settar |
| Software interrupt instruction | B | rti, pi0, pi0l, pi1, pi1l, pi2, pi2l, pi3, pi3l, pi4, pi4l, pi5, pi5l, pi6, pi6l, pi7, pi7l, sc0, sc1, sc2, sc3, sc4, sc5, sc6, sc7 |
| VMP/interrupt control instruction | B | intd, inte, vmpsleep, vmpsus, vmpswd, vmpswe, vmpwait |
| Arithmetic operation instruction | A | abs, absvh, absvw, add, addarvw, addc, addmsk, adds, addsr, addu, addvh, addvw, neg, negvh, negvw, rsub, s1add, s2add, sub, subc, submsk, subs, subvh, subvw, max, min |
| Logical operation instruction | A | and, andn, or, sethi, xor, not |
| Compare instruction | A | cmpCC, cmpCCa, cmpCCn, cmpCCo, tstn, tstna, tstnn, tstno, tstz, tstza, tstzn, tstzo |
| Move instruction | A | mov, movcf, mvclcas, mvclovs, setlo, vcchk |
| NOP instruction | A | nop |
| Shift instruction1 | S1 | asl, aslvh, aslvw, asr, asrvh, asrvw, lsl, lsr, rol, ror |
| Shift instruction2 | S2 | aslp, aslpvw, asrp, asrpvw, lslp, lsrp |

TABLE 4

| Category | Operation unit | Instruction operation code |
|---|---|---|
| Extraction instruction | S2 | ext, extb, extbu, exth, exthu, extr, extru, extu |
| Mask instruction | C | msk, mskgen |
| Saturation instruction | C | sat12, sat9, satb, satbu, sath, satw |
| Conversion instruction | C | valn, valn1, valn2, valn3, valnvc1, valnvc2, valnvc3, valnvc4, vhpkb, vhpkh, vhunpkb, vhunpkh, vintlhb, vintlhh, vintllb, vintllh, vlpkb, vlpkbu, vlpkh, vlpkhu, vlunpkb, vlunpkbu, vlunpkh, vlunpkhu, vstovb, vstovh, vunpk1, vunpk2, vxchngh, vexth |
| Bit count instruction | C | bcnt1, bseq, bseq0, bseq1 |
| Others | C | byterev, extw, mskbrvb, mskbrvh, rndvh, movp |
| Multiply instruction1 | X1 | fmulhh, fmulhhr, fmulhw, fmulhww, hmul, lmul |
| Multiply instruction2 | X2 | fmulww, mul, mulu |
| Sum of products instruction1 | X1 | fmachh, fmachhr, fmachw, fmachww, hmac, lmac |
| Sum of products instruction2 | X2 | fmacww, mac |
| Difference of products instruction1 | X1 | fmsuhh, fmsuhhr, fmsuhw, fmsuww, hmsu, lmsu |
| Difference of products instruction2 | X2 | fmsuww, msu |
| Divide instruction | DIV | div, divu |
| Debugger instruction | DBGM | dbgm0, dbgm1, dbgm2, dbgm3 |

TABLE 5

| Category | Operation unit | Instruction operation code |
|---|---|---|
| SIMD arithmetic operation instruction | A | vabshvh, vaddb, vaddh, vaddhvc, vaddhvh, vaddrhvc, vaddsb, vaddsh, vaddsrb, vaddsrh, vasubb, vcchk, vhaddh, vhaddhvh, vhsubh, vhsubhvh, vladdh, vladdhvh, vlsubh, vlsubhvh, vnegb, vnegh, vneghvh, vsaddb, vsaddh, vsgnh, vsrsubb, vsrsubh, vssubb, vssubh, vsubb, vsubh, vsubhvh, vsubsh, vsumh, vsumh2, vsumrh2, vxaddh, vxaddhvh, vxsubh, vxsubhvh, vmaxb, vmaxh, vminb, vminh, vmovt, vsel |
| SIMD compare instruction | A | vcmpeqb, vcmpeqh, vcmpgeb, vcmpgeh, vcmpgtb, vcmpgth, vcmpleb, vcmpleh, vcmpltb, vcmplth, vcmpneb, vcmpneh, vscmpeqb, vscmpeqh, vscmpgeb, vscmpgeh, vscmpgtb, vscmpgth, vscmpleb, vscmpleh, vscmpltb, vscmplth, vscmpneb, vscmpneh |
| SIMD shift instruction1 | S1 | vaslb, vaslh, vaslvh, vasrb, vasrh, vasrvh, vlslb, vlslh, vlsrb, vlsrh, vrolb, vrolh, vrorb, vrorh |
| SIMD shift instruction2 | S2 | vasl, vaslvw, vasr, vasrvw, vlsl, vlsr |
| SIMD saturation instruction | C | vsath, vsath12, vsath8, vsath8u, vsath9 |
| Other SIMD instruction | C | vabssumb, vrndvh |
| SIMD multiply instruction | X2 | vfmulh, vfmulhr, vfmulw, vhfmulh, vhfmulhr, vhfmulw, vhmul, vlfmulh, vlfmulhr, vlfmulw, vlmul, vmul, vpfmulhww, vxfmulh, vxfmulhr, vxfmulw, vxmul |
| SIMD sum of products instruction | X2 | vfmach, vfmachr, vfmacw, vhfmach, vhfmachr, vhfmacw, vhmac, vlfmach, vlfmachr, vlfmacw, vlmac, vmac, vpfmachww, vxfmach, vxfmachr, vxfmacw, vxmac |
| SIMD difference of products instruction | X2 | vfmsuh, vfmsuw, vhfmsuh, vhfmsuw, vhmsu, vlfmsuh, vlfmsuw, vlmsu, vmsu, vxfmsuh, vxfmsuw, vxmsu |

Note that "Operation units" in the above tables refer to operation units used in the respective instructions. More specifically, "A" denotes ALU instruction, "B" branch instruction, "C" conversion instruction, "DIV" divide instruction, "DBGM" debug instruction, "M" memory access instruction, "S1" and "S2" shift instructions, and "X1" and "X2" multiply instructions.

Figure 20:
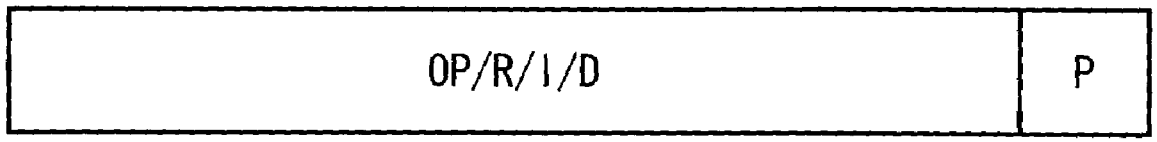
FIG. 20 is a diagram showing format of instructions executed by the processor.

FIG. 20 is a diagram showing the format of the instructions executed by the processor 1.

The following describes what acronyms stand for in the diagrams: "P" is predicate (execution condition: one of the eight condition flags C0~C7 is specified); "OP" is operation code field; "R" is register field; "I" is immediate field; and "D" is displacement field.

Figure 32:
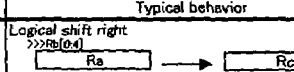
FIG. 32 is a diagram explaining an instruction belonging to a category "BSlsr (logical barrel shift) system and the like".

FIGS. 21~36 are diagrams explaining outlined functionality of the instructions executed by the processor 1. More specifically, FIG. 21 explains an instruction belonging to the category "ALUadd (addion) system"; FIG. 22 explains an instruction belonging to the category "ALUsub (subtraction) system"; FIG. 23 explains an instruction belonging to the category "ALUlogic (logical operation) system and the like"; FIG. 24 explains an instruction belonging to the category "CMP (comparison operation) system"; FIG. 25 explains an instruction belonging to the category "mul (multiplication) system"; FIG. 26 explains an instruction belonging to the category "mac (sum of products operation) system"; FIG. 27 explains an instruction belonging to the category "msu (difference of products) system"; FIG. 28 explains an instruction belonging to the category "MEMld (load from memory) system"; FIG. 29 explains an instruction belonging to the category "MEMstore (store in memory) system"; FIG. 30 explains an instruction belonging to the category "BRA (branch) system"; FIG. 31 explains an instruction belonging to the category "BSasl (arithmetic barrel shift) system and the like"; FIG. 32 explains an instruction belonging to the category "BSasl (logical barrel shift) system and the like"; FIG. 33 explains an instruction belonging to the category "CNVvaln (arithmetic conversion) system"; FIG. 34 explains an instruction belonging to the category "CNV (general conversion) system"; FIG. 35 explains an instruction belonging to the category "SATvlpk (saturation processing) system"; and FIG. 36 explains an instruction belonging to the category "ETC (et cetera) system".

The following describes the meaning of each column in these diagrams: "SIMD" indicates the type of an instruction (distinction between SISD (SINGLE) and SIMD); "Size" indicates the size of individual operand to be an operation target; "Instruction" indicates the operation code of an operation; "Operand" indicates the operands of an instruction; "CFR" indicates a change in the condition flag register; "PSR" indicates a change in the processor status register; "Typical behavior" indicates the overview of a behavior; "Operation unit" indicates a operation unit to be used; and "3116" indicates the size of an instruction.

The operations of the processor 1 concerning main instructions used in concrete examples that will be described later are explained below.

ld Rb,(Ra,D10)

Load word data to a register Rb from the address that adds a displacement value (D10) to a register Ra.

ldh Rb,(Ra+)I9

Sign-extend and load half word data from the address indicated by the register Ra. Further, add an immediate value (I9) to the register Ra and store it in the register Ra.

ldp Rb:Rb+1,(Ra+)

Sign-extend and load two kinds of word data to the resisters Rb and Rb+1 from the address indicated by the resister Ra. Further, add 8 to the register Ra and store it in the register Ra.

ldhp Rb:Rb+1, (Ra+)

Sign-extend and load two kinds of half word data from the address indicated by the register Ra. Further, add 4 to the register Ra and store it in the register Ra.

setlo Ra,I16

Sing-extend an immediate value (I16) and store it in the register Ra.

sethi Ra,I16

Store the immediate value (I16) in the upper 16 bits of the register Ra. There is no influence to the lower 16 bits of the register Ra.

ld Rb,(Ra)

Load word data to the register Rb from the address indicated by the register Ra.

add Rc,Ra,Rb

Add the registers Ra and Rb and store it in the register Rb.

addu Rb,GP,I13

Add an immediate value (I13) to a register GP and store it to the register Rb.

st (GP,D13),Rb

Store half word data stored in the register Rb to the address that adds a displacement value (D13) to the register GP.

sth (Ra+)I9,Rb

Store half word data stored in the register Rb in the address indicated by the register Ra. Further, add an immediate value (I9) to the register Ra and store it in the register Ra.

stp (Ra+),Rb:Rb+1

Store two kinds of word data stored in the registers Rb and Rb+1 in the address indicated by the register Ra.

ret

It is used to a return from a sub routine call. Branch to an address stored in LR. Transfer SVR. CF to CFR. CF.

mov Ra,I16

Sign-extend the immediate value (I16) and store it in the register Ra.

settar C6, D9

It executes the following processing. (1) Store an address that adds PC and a displacement value (D9) into a branch register TAR. (2) Fetch an instruction of the address and store it in an instruction buffer to branch. (3) Set C6 at 1.

settar C6,Cm,D9

It executes the following processing. (1) Store an address that adds PC and a displacement value (D9) in the branch register TAR. (2) Fetch an instruction of the address and store it in the instruction buffer to branch. (3) Set C4 and C6 at 1 and C2 and C3 at 0.

jloop C6,TAR,Ra2, −1

It is used by a loop. It executes the following processing. (1) Add −1 to a register Ra2 and store it in the register Ra2. When the register Ra2 becomes 0 or less, set C6 at 0. (2) Jump to the address indicated by the branch register TAR.

jloop C6,Cm,TAR,Ra2, −1

It is used by the loop. It executes the following processing. (1) Set 0 at Cm. (2) Add −1 to the register Ra2 and store it in the register Ra2. When the register Ra2 becomes 0 or less, set 0 at C6. (3) Jump to the address indicated by the branch register TAR.

jloop C6,C2:C4,TAR,Ra2,−1

It is used by the loop. It executes the following processing. (1) Transfer C3 to C2, C4 to C3 and C6. (2) Add −1 to the register Ra2 and store it in the register Ra2. When the register Ra2 becomes 0 or less, set 0 at C4. (3) Jump to the address indicated by the branch register TAR.

mul Mm,Rb,Ra,I8

Carry out a signed multiplication to the register Ra and an immediate value (I8) and store the result in a registers Mm and the register Rb.

mac Mm,Rc,Ra,Rb,Mn

Carry out an integer multiplication to the registers Ra and Rb and add them to a register Mn. Store the result in the register Mm and a register Rc.

lmac Mm,Rc,Ra,Rb,Mn

Manage the register Rb in a half word vector form. Carry out an integer multiplication to the lower 16 bits of the registers Ra and Rb, and add them to the register Mn. Store the result in the registers Mm and Rc.

jloop C6,C2:C4,TAR,Ra2, −1

It is used by the loop. It executes the following processing. (1) Transfer C3 to C2, C4 to C3 and C6. (2) Add −1 to the register Ra2 and store it in the register Ra2. When the register Ra2 becomes 0 or less, set 0 at C4. (3) Jump to the address indicated by the branch register TAR.

asr Rc,Ra,Rb

Perform an arithmetic shift right to the register Ra by only the number of bits indicated by the register Rb. The register Rb is saturated within ±31. In the case of negative, it becomes an arithmetic shift left.

br D9

Add the displacement value (D9) to the present PC and branch it to its address.

jmpf TAR

Branch to the address stored in the branch register TAR.

cmpCC Cm,Ra,I5

It is possible to describe the following CC relation conditions in CC.

eq/ne/gt/ge/gtu/geu/le/lt/leu/ltu

When CC is eq/ne/gt/ge/le/lt, I5 is a signed value and sign-extend and compare. When CC is gtu/geu/leu/ltu, I5 is an unsigned value.

(A compiler)

Next, a compiler, according to the present embodiment, whose object is the above-described processor 1, is explained.

Figure 37:
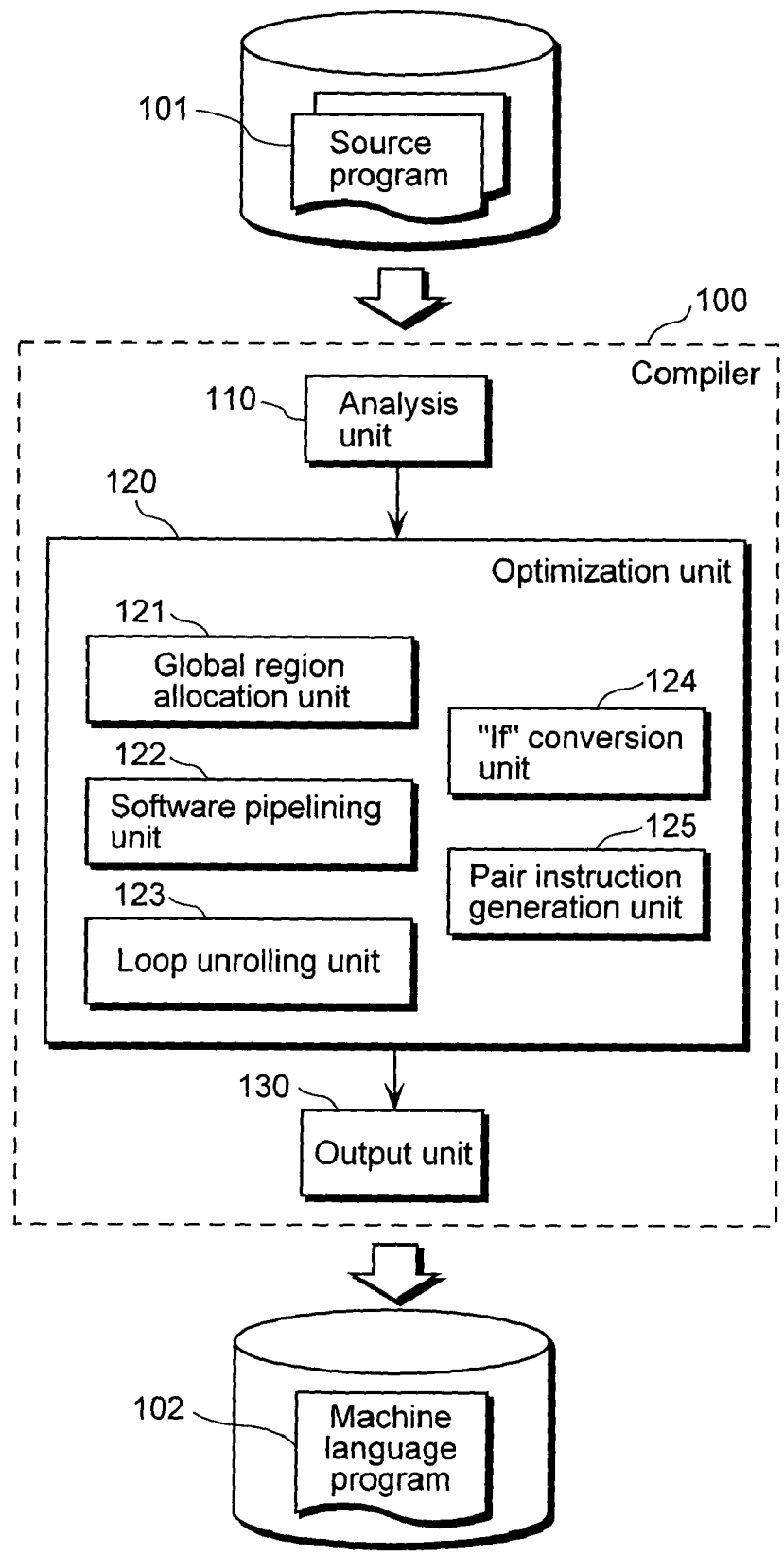
FIG. 37 is a function block diagram showing the configuration of a compiler according to the present invention.

FIG. 37 is a function block diagram showing the configuration of a compiler 100 according to the present embodiment. This compiler 100 is a cross compiler that translates the source program 101 described and designated in a high-level language such as C language into a machine language program 102 whose object processor is the above-described processor 1, is realized by a program executed on a computer such as a personal computer, and is largely divided into and configured with an analysis unit 110, an optimization unit 120, and an output unit 130.

The analysis unit 110 transmits to the optimization unit 120 and the output unit 130 directives (options and pragmas) to the compiler 100 and converts a program that is an object of the compiler into internal type data by performing lexical analysis on the source program 101 that is an object to be compiled and a directive from a user to this compiler 100.

By the way, "an option" is a directive to the compiler 100 that the user can arbitrarily designate together with designation of the source program 101 that is an object to be compiled on startup of the compiler 100 and includes a directive to optimize the code size and the execution time of the generated language program 102. For example, the user can input into a computer c:¥>ammmp-cc-o-max-gp-datasize=40 sample.c using the command "ammp-cc" when he compiles the source program 101 "sample.c". The additional directives "-o" and "-max-gp-datasize=40" in this command are the options. The directives by the options like these are treated as the directives to the entire source program 101.

Additionally, "a pragma (or a pragma directive)" is a directive to the compiler 100 that the user can arbitrarily designate (place) in the source program 101 and includes a directive to optimize the code size and the execution time of the generated language program 102 like the option. In the compiler 100 according to the present embodiment, the pragma is a character string starting with "#pragma". For example, the user can describe a statement that #pragma_no_gp_access the name of a variable in the source program 101. This statement is the pragma (the pragma directive). The pragma like this is, different from the option, treated as an individual directive concerning only the variable placed immediately after the pragma and loop processing and the like.

The optimization unit 120 executes an overall optimization processing to the source program 101 (internal type data) outputted from the analysis unit 110, following a directive from the analysis unit 110 and the like to realize the optimization selected from (1) the optimization with a higher priority on increasing the speed of execution, (2) the optimization with a higher priority on reducing the code size, and (3) the optimization of both of the execution speed and the code size. In addition to this, the optimization unit 120 has a processing unit (a global region allocation unit 121, a software pipelining unit 122, a loop unrolling unit 123, an "if" conversion unit 124, and a pair instruction generation unit 125) that performs an individual optimization processing designated by the option and the pragma from the user.

The global region allocation unit 121 performs optimization processing following the option and the pragma concerning designation of the maximum data size of a variable (an array) allocated in a global region (a memory region that can be referred to beyond a function as a common data region), designation of the variable allocated to the global region and designation of the variable that is not allocated to the global region.

The software pipelining unit 122 performs optimization processing following the option and the pragma concerning a directive that the software pipelining is not executed, a directive that the software pipelining is executed whenever possible to remove a prologue unit and an epilogue unit and a directive that the software pipelining is executed whenever possible without removing the prologue unit and an epilogue unit.

The loop unrolling unit 123 executes optimization processing following the option and the pragma concerning a directive that the loop unrolling is executed, a directive that the loop unrolling is not executed, a guarantee that minimum number of loops are iterated, a guarantee that even number of loops are iterated and a guarantee that an odd number of loops are iterated.

The "if" conversion unit 124 performs optimization processing following the option and the pragma concerning a directive that an "if" conversion is executed and a directive that an "if" conversion is not executed.

The pair instruction generation unit 125 performs optimization processing following the pragma concerning designation of aligns of an array and a head address of a structure and a guarantee for alignment of data that a pointer variable and a local pointer variable of a function argument indicate.

The output unit 130 replaces the internal type data with a corresponding machine language instruction and resolves a label and an address such as a module to the source program 101 to which the optimization processing is executed by the optimization unit 120, and by so doing, generates the machine language program 102 and outputs it as a file and the like.

Next, characteristic operations of the compiler 100 according to the present embodiment, configured as described above are explained showing a concrete example.

(The Global Region Allocation Unit 121)

For a start, operations of the global region allocation unit 121 and their significance are explained. The global region allocation unit 121 performs, largely divided, (1) the optimization concerning designation of maximum data size of the global region allocation and (2) the optimization concerning designation of the global region allocation.

For a start, (1) the optimization concerning designation of maximum data size of the global region allocation is explained.

The above-mentioned processor 1 is equipped with a global pointer register (gp; a general-purpose register R30) and holds the head address of the global region (hereafter called the gp region). It is possible to access the range whose displacement from the head of the gp region is 14 bits at the maximum with one instruction. It is possible to allocate an external variable and a static variable in this gp region. In the case of exceeding the range that is accessible by one instruction, the performance decreases on the contrary and therefore it is necessary to be cautious.

Figure 38A:
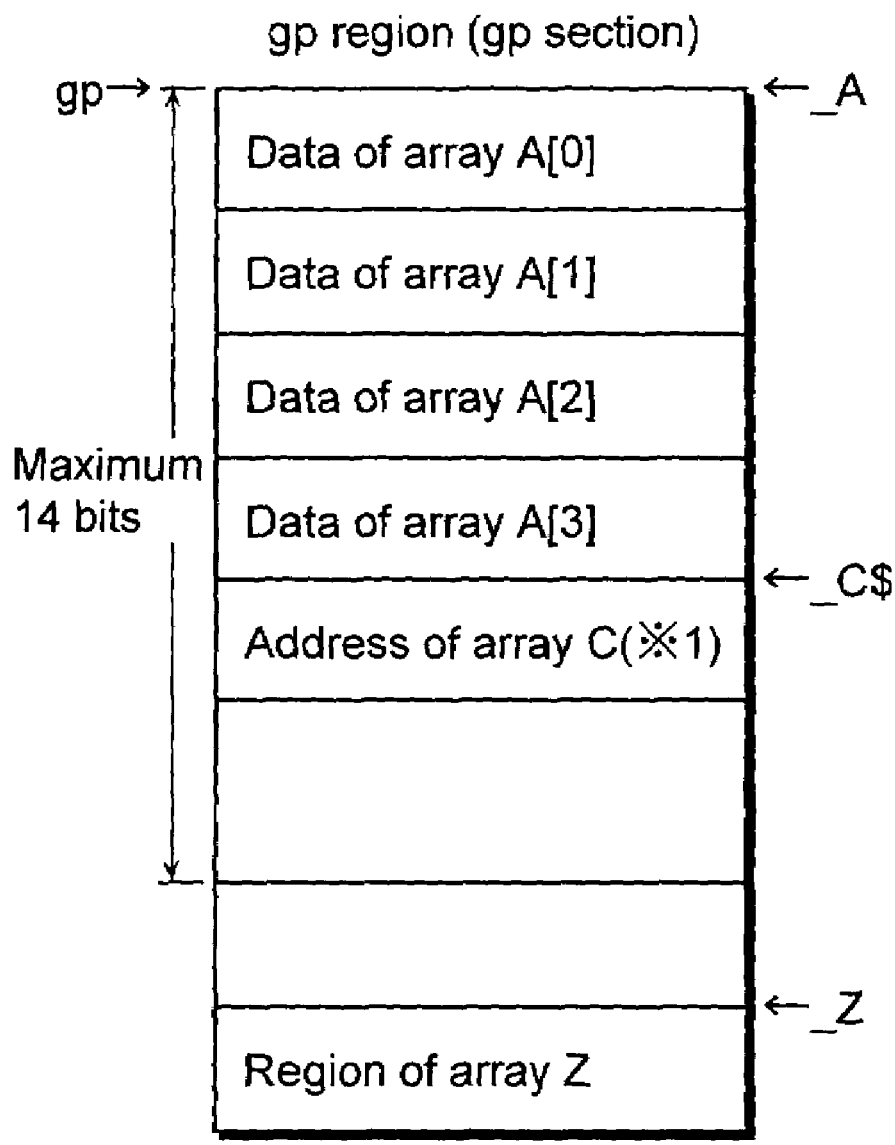
FIG. 38A is a diagram showing an allocation example of data and the like in a global region.

FIG. 38A is a diagram showing an allocation example of data and the like in the global region. Here, the value of the data size of the array A does not exceed that of the maximum data size; the value of the data size of the array C exceeds that of the maximum data size.

It is possible to access by one instruction the array A whose entity fits into the gp region as an example below shows.

Example: ld r1,(gp,_A - .MN.gptop);;

Note that in this example, ".MN.gptop" is a section name (a label) that indicates the same address as the global pointer register.

On the other hand, in the case of the array C that exceeds the maximum data size allocated to the gp region, the entity is allocated to a region other than the gp region; only the address of the array C is allocated to the gp region (in addition, when the after-mentioned directive #pragma _no_gp_access is used, neither the entity nor the address is not stored in the gp region).

In this case, it takes plural instructions to access the array C as an example below shows.

Figure 38B:
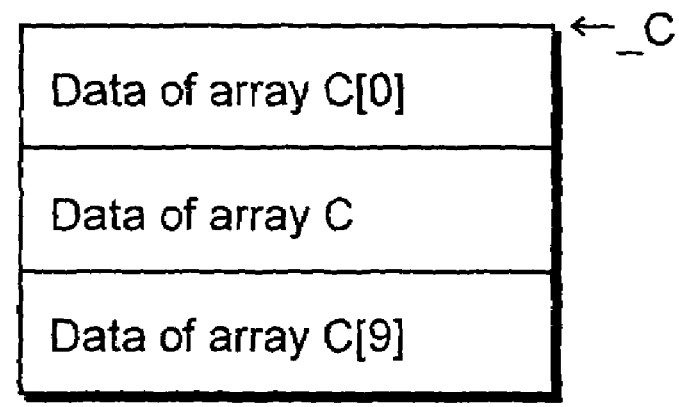
FIG. 38B is a diagram showing an allocation example of data outside the global region.

Example: in the case of indirect access to the gp address ld r1,(gp,_C$ - .MN.gptop);;

ld r1,(r1,8);;

Example: in the case of absolute address access setlo r0,LO(_C+8);;

sethi r0,HI(_C+8);;

ld r0,(r0);;

By the way, like the allocation example in a region other than the global region shown in FIG. 38B, also in the case of an array Z whose entity is allocated out of the range of the gp region that can be accessed by one instruction, the following code is generated.

ld r0,(gp,_Z - .MN.gptop);;

This code exceeds the range that is accessed by one instruction and therefore it is unfolded into plural instructions by a linker. Consequently, it is not one-instruction access.

Note that the one-instruction access range of the gp region is a 14-bit range at the maximum but its range is different based on the type and the size of an object. In other words, an 8-byte type has a 14-bit range; a 4-byte type has a 13-bit range; a 2-byte type has a 12-bit range; and 1-byte type has an 11-bit range.

The compiler 100 allocates entities of arrays and structures whose data sizes are smaller than or equal to the maximum data size (32-byte default) in the gp region. On the other hand, as for an object that exceeds the maximum data size allocated in the global region, the entity is allocated outside the gp region; in the gp region, only the head address of the object is allocated.

Here, when the gp region is not tight, allocating the object whose data size is 32 bytes or more makes it possible to generate a better code.

Consequently, by using the following option, the user can designate an arbitrary value as this maximum data size. The compile option: -mmax-gp-datasize=NUM Here, NUM is a designated byte (32-bit default) of the maximum data size of one array and structure that can be allocated in global region.

Figure 39:
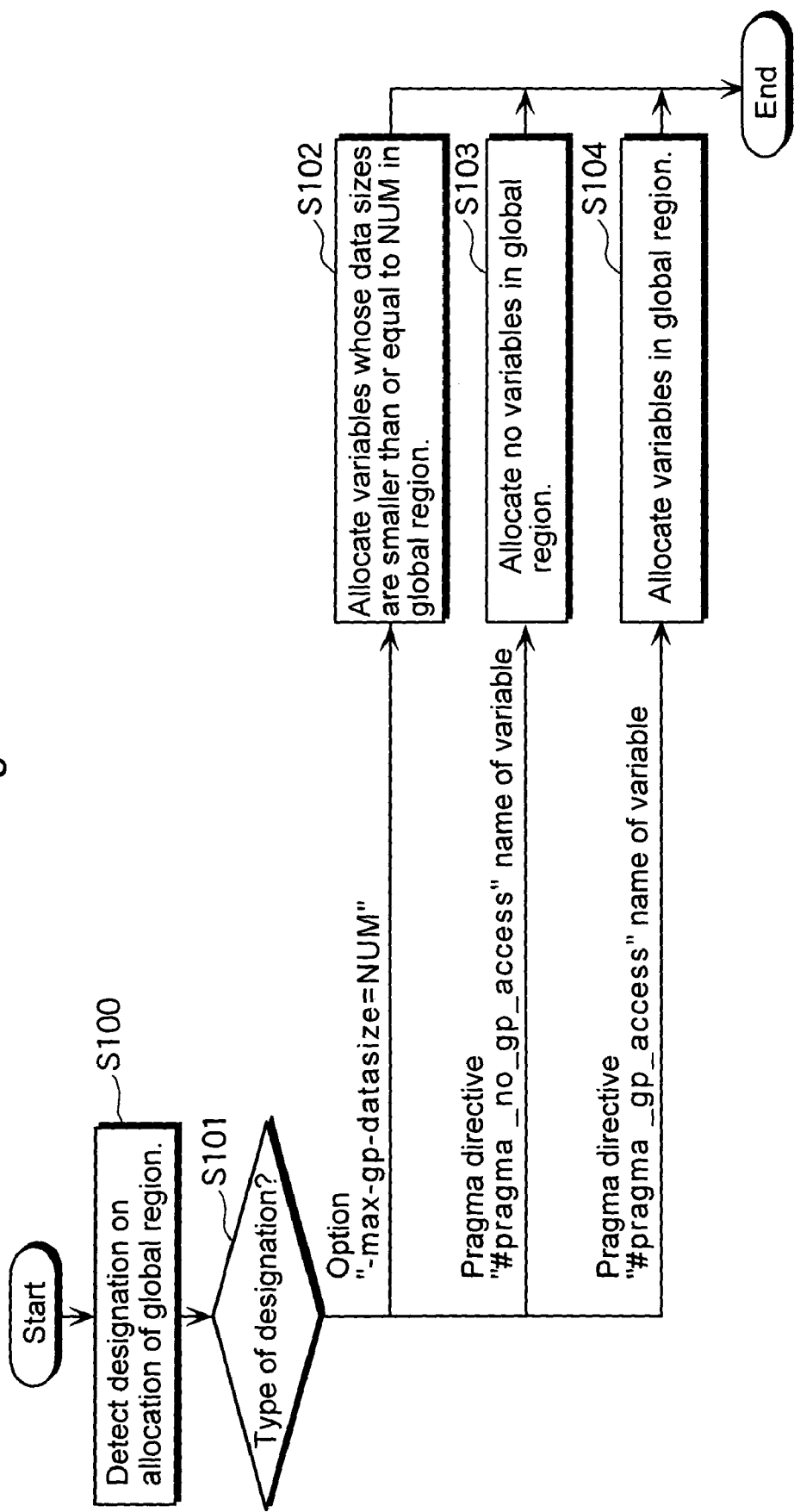
FIG. 39 is a flowchart showing operations of a global region allocation unit.

FIG. 39 is a flowchart showing operations of the global region allocation unit 121. When the above-mentioned option is detected by the analysis unit 110 (Steps S100, S101), the global region allocation unit 121 allocates all the variables (the arrays) whose sizes are smaller than or equal to the designated size (NUM bytes) declared by the source program 101 in the global region; as for the variables whose size exceeds the NUM bytes, the global region allocation unit 121 allocates only the head addresses in the global region and the entities in memory region other than the global region (Step S102). This option makes possible the optimization to increase the speed and reduce the size.

In addition, this -mmax-gp-datasize option cannot designate the allocations of each variable. To designate each variable to allocate/not to allocate in the gp region, it is good to use the after-mentioned #pragma _gp_access directive. Moreover, it is desirable to allocate an external variable and a static variable in the gp region that can be accessed by one instruction whenever possible. Further, in the case of accessing an external variable defined by another file using an extern declaration, it is desirable to specify the size of the external variable without omission. For example, when the external variable is defined as int a[8];

it is desirable to declare extern int a[8];

in the file to be used.

Note that in the case of using the #pragma _gp_access directive to the extern declaration external variable, it is absolutely necessary to match the designation of the definition (the allocated region) to the designation of the side of use (how to access).

Next, a concrete example by using the option like this is shown.

FIG. 40 is a diagram showing concrete examples of the optimization when the maximum data size is changed. In other words, the examples of generated codes obtained by two cases are shown:

(1) the case of compiling at the state of default and (2) as a result, since there is still free space in the gp region, like a command example below, the case of compiling by changing the maximum data size.

c:¥>ammmp-cc -O -mmax-gp-datasize=40 sample.c

Here, the object size of the array C is assumed to be 40 bytes. The left column of FIG. 40 is an example of the generated code in the case of compiling at the state of default; the right column is an example of the generated code in the case of compiling by changing the maximum data size. By the way, the highest section, the upper middle section, the lower middle section, and the lowest section show the title, a sample program (the source program 101), a code generated from there (the machine language program 102), and the number of the cycles and the code size of the generated code, respectively. (Hereafter, same in other figures showing the concrete examples of the optimization).

As is known from the generated codes in the left column of FIG. 40, since the entity of the array C is allocated to a region other than the gp region, it is an absolute address access with plural instructions. On the other hand, as is known from the generated codes in the right column of FIG. 40, the maximum data size (40) is designated in order that the entity of the array C is allocated to the gp region, it is a gp relative access with one-instruction access, and therefore the execution speed increases. In other words, an 8-byte code executed in 10 cycles is generated by default; 5-byte code executed in 7 cycles is generated by changing the maximum data size.

As another concrete example, a concrete example in the case of an external variable defined outside of a file is shown in FIG. 41. Here, the maximum data size allocated to the gp region is assumed to be 40. The left column of FIG. 41 shows an example of a code that is generated when there is no size designation concerning the external variable defined outside of the file; the right column of FIG. 41 shows an example of a code that is generated when there is the size designation.

As is shown in the left column of FIG. 41, the sizes of an externally defined array A and an externally defined array C are both unknown, the compiler 100 cannot judge whether they are allocated to the gp region, and therefore a code of an absolute address access is generated with plural instructions.

On the other hand, as is shown in the right column of FIG. 41, since the defined size of the array A is 40 bytes or less, the entity is allocated to the gp region; a code of the gp relative access with one instruction is generated using the global pointer register (gp). Furthermore, since the size of the externally defined array C is explicitly designated and is smaller than or equal to the maximum data size allocated to the gp region, the entity of the array C is assumed to be allocated to the gp region, the code of the gp relative access is generated. As described above, when the size of the external variable defined outside of the file is not designated, 12-byte code executed in 10 cycles is generated; when the maximum data size is changed and the size of the external variable is designated, 5-byte code executed in 7 cycles is generated.

Next, (2) the optimization concerning designation of the global region allocation by the global region allocation unit 121 is explained.

By the above-mentioned designation of the maximum data size allocated to the global region (-mmax-gp-datasize option), the allocation of the gp region is designated only by the maximum data size, and therefore even the variables that is not expected may be allocated to the gp region.

Consequently, a #pragma directive that designates the allocation of the gp region for each variable is prepared.

pragma directives pragma _no_gp_access the name of a variable [, the name of a variable, . . . ]

pragma _gp_access the name of a variable [, the name of a variable, . . . ]

Here, the brackets means that what is inside them can be omitted. In the case of designating plural variables, it is right to delimit the names of the variables with "," (a comma). In addition, when an option and a pragma directive overlap or contradict each other, the pragma directive gets a higher priority than the option.

To the pragma directive like this, the compiler 100 operates as described below. In FIG. 39, namely, when the pragma directive "#pragma _no_gp_access the name of a variable [, the name of a variable, . . . ]" is detected by the analysis unit 110 (Steps S100, S101), as for the variable designated here, the global region allocation unit 121 generates a code that the variable is not allocated to the global region (Step S103) in spite of the option designation. On the other hand, when the pragma directive #pragma _gp_access the name of a variable

[, the name of a variable, . . . ]" is detected by the analysis unit 110 (Steps S100, S101), as for the variable designated here, the global region allocation unit 121 generates a code that the variable is allocated to the global region (Step S104) in spite of the option designation. By these #pragma directives, optimization to increase speed and reduce a size becomes possible.

By the way, when a #pragma _no_gp_access directive is designated, the global region allocation unit 121 does not allocate the entity or the address of the variable in the gp region. Additionally, the global region allocation unit 121 gives a higher priority to the #pragma _gp_access directive than designation of the maximum data size. If different designation for the same variable appears, the operations of the compiler 100 become unstable. It is desirable to allocate an external variable and a static variable in the gp region that can be accessed by one instruction whenever possible.

Next, a concrete example of the optimization using the pragma directive like this is explained. Since using the #pragma _gp_access directive enables the external variable and the static variable that are the maximum data size of the gp region allocation or larger to be allocated in the gp region, a case in point is shown.

FIG. 42 is a diagram showing an example of a code generated when the #pragma _no_gp_access directive is used (the left column) and an example of a code generated when the #pragma _gp_access directive is used (the right column).

As shown in the left column of FIG. 42, since the size of the array C is 40 bytes, in the case of default, only the head address is allocated in the gp region and the entity is not allocated in the gp region. Furthermore, since the size of the array defined externally is 32 bytes, in the case of default, the compiler 100 judges that the entity is allocated in the gp region.

By the #pragma _no_gp_access directive, however, as for the array C, neither the head address nor the entity is allocated in the gp region; the entity is allocated in other region than the gp region; a code of an absolute address access is generated. Since it is also assumed that the entity of the array A defined externally is allocated in other region than the gp region, the code of the absolute address access is generated.

On the other hand, as shown in the right column of FIG. 42, the array C is not allocated in the gp region in the case of default because the size is 40 bytes but the entity of the array C is allocated in the gp region by the #pragma _gp_access directive. Although the size of the array A defined outside the file is unknown, it is assumed that the array A is allocated in the gp region and therefore a gp relative access code is generated.

As described above, when the #pragma _no_gp_access directive is used, 12-byte code executed in 10 cycles is generated, while a 5-byte code executed in 7 cycles is generated when the #pragma _gp_access directive is used.

In addition, when the #pragma _gp_access directive is used to an external variable of extern declaration, it is desirable that the designation of the definition (the region to be allocated) agrees with the designation of the user side (how to access) without fail.

(The Software Pipelining Unit 122)

Next, the operations of the software pipelining unit 122 and their significance are explained.

The software pipelining optimization is one technique to enhance the speed of the loop. When this optimization is performed, the loop structure is converted into a prolog portion, a kernel portion, and an epilog portion. Note that the software pipelining optimization is performed when it is judged that the execution speed is enhanced by it. The kernel portion overlaps individual iteration (repetition) with the previous iteration and the subsequent iteration. Because of this, the average processing time per iteration is reduced.

Figure 43A:
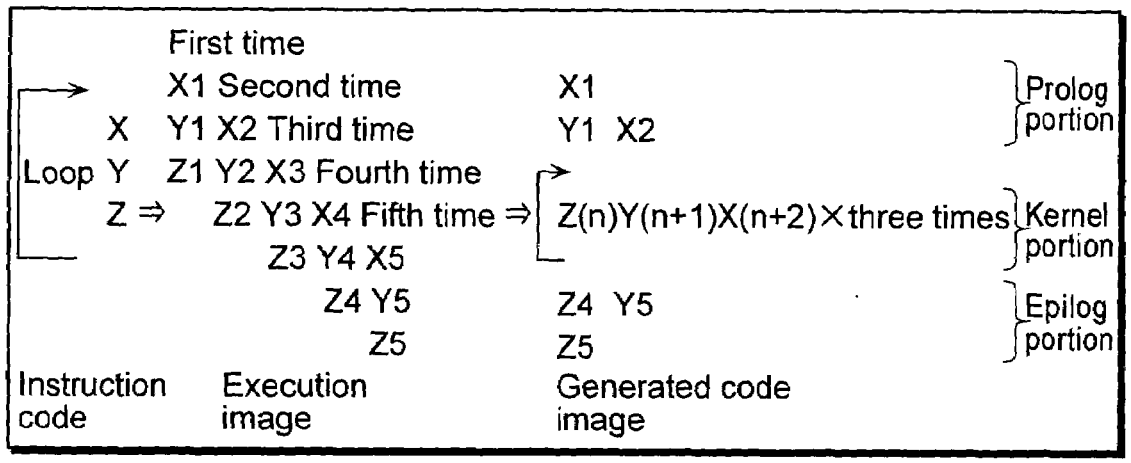
FIG. 43 is a diagram explaining optimization of software pipelining.

FIG. 43A is a conceptual diagram of the prolog portion, the kernel portion, and the epilog portion in the loop processing. Here is shown an example of an instruction code, an execution image, and a generation code image when instructions X, Y, and Z that have no dependency among the iterations are iterated five times. Note that the loop processing is an iteration processing by a "for" statement, a "while" statement, a "do" statement and the like.

Figure 43B:
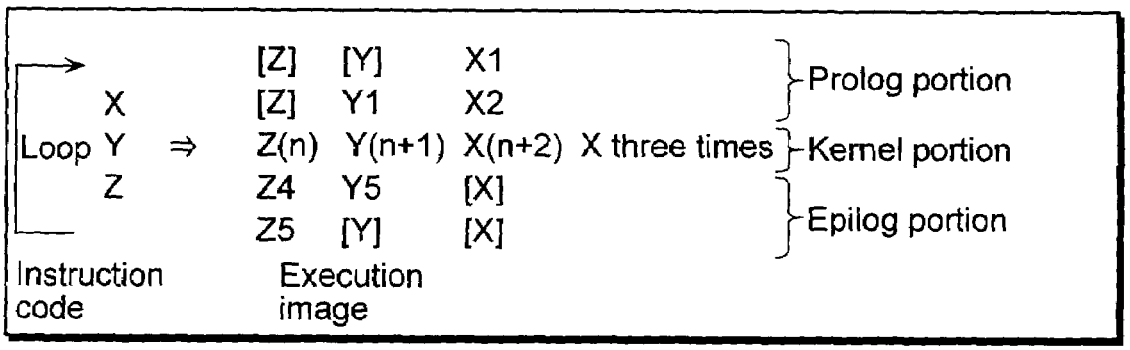
Figure 43C:
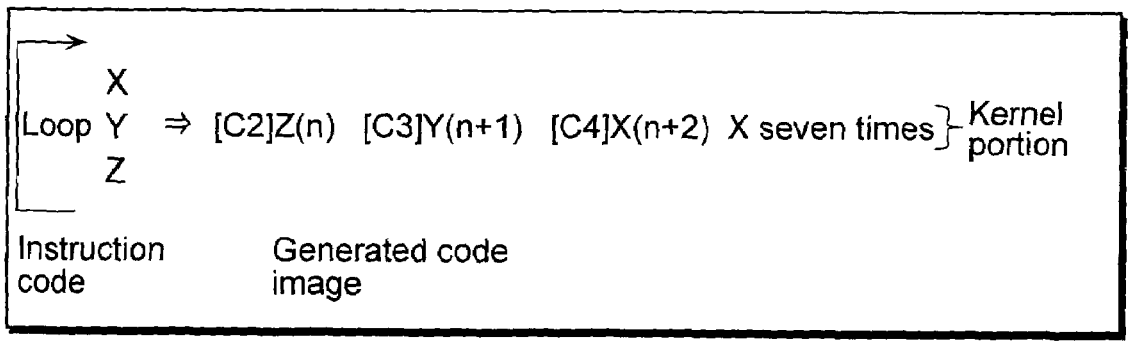

Here, the prolog portion and the epilog portion are removed if possible as the processes of FIG. 43B and FIG. 43C show. If not possible, however, the prolog portion and the epilog portion are not removed and the code size may increase. Because of this, an option and a #pragma directive that designate the operation of the software pipelining optimization are prepared.

FIG. 43B is a conceptual diagram showing processing to remove the prolog portion and the epilog portion in the loop processing. In other words, FIG. 43B shows the generation code image reordered based on the generation code image in the loop of five iterations of the instructions X, Y and Z that have no dependency on one another among the iterations, which is shown in the conceptual diagram of FIG. 43A indicating the prolog portion, the kernel portion and the epilog portion. Note that the instructions enclosed in brackets are read in but not executed.

Because of this, it is understandable that the prolog portion and the epilog portion become the same instruction lines as the kernel portion. Consequently, the number of the loops increases by the number of the executions of the prolog portion and the epilog portion (4 times), but it is possible to generate the code only by the kernel portion by controlling the instructions enclosed in the brackets by the predicates (the execution conditions) as shown in FIG. 43C.

The execution order of the generation code shown in FIG. 43C is as follows:

In the first execution, the instructions to which the predicates [C2] and [C3] are added are not executed. Consequently, only [C4]X is executed.

In the second execution, the instruction to which the predicate [C2] is added is not executed. Consequently, only [C3]Y and [C4]X are executed.

In the third to the fifth executions, all the instructions, [C2]Z, [C3]Y, and [C4]X are executed.

In the sixth execution, the instruction to which the predicate [C4] is added is not executed. Consequently, only [C2]Z and [C3]Y are executed.

In the seventh execution, the instructions to which the predicates [C3] and [C4] are added are not executed. Consequently, only [C2]Z is executed.

As just described, by the first and the second loops of the kernel portion, the prolog portion is executed; by the sixth and the seventh loops, the epilog portion is executed.

Consequently, in the loops that include the prolog portion and the epilog portion, the code size increases but the number of loops decreases, and therefore, it is expectable that the execution speed increases. On the contrary, in the loops that exclude the prolog portion and the epilog portion, the code size can be reduced but the number of loops increases, and therefore, the number of execution cycles increases.

Consequently, to make the selection of the optimization like this possible to be designated, the following compile option and pragma directives are prepared.

The compile option: -fno-software-pipelining

The #pragma directives:
pragma _no_software_pipelining
pragma _software_pipelining_no_proepi
pragma _software_pipelining_with_proepi By the way, when the option and the pragma directives overlap or contradict, the pragma directives get a higher priority.

Figure 44:
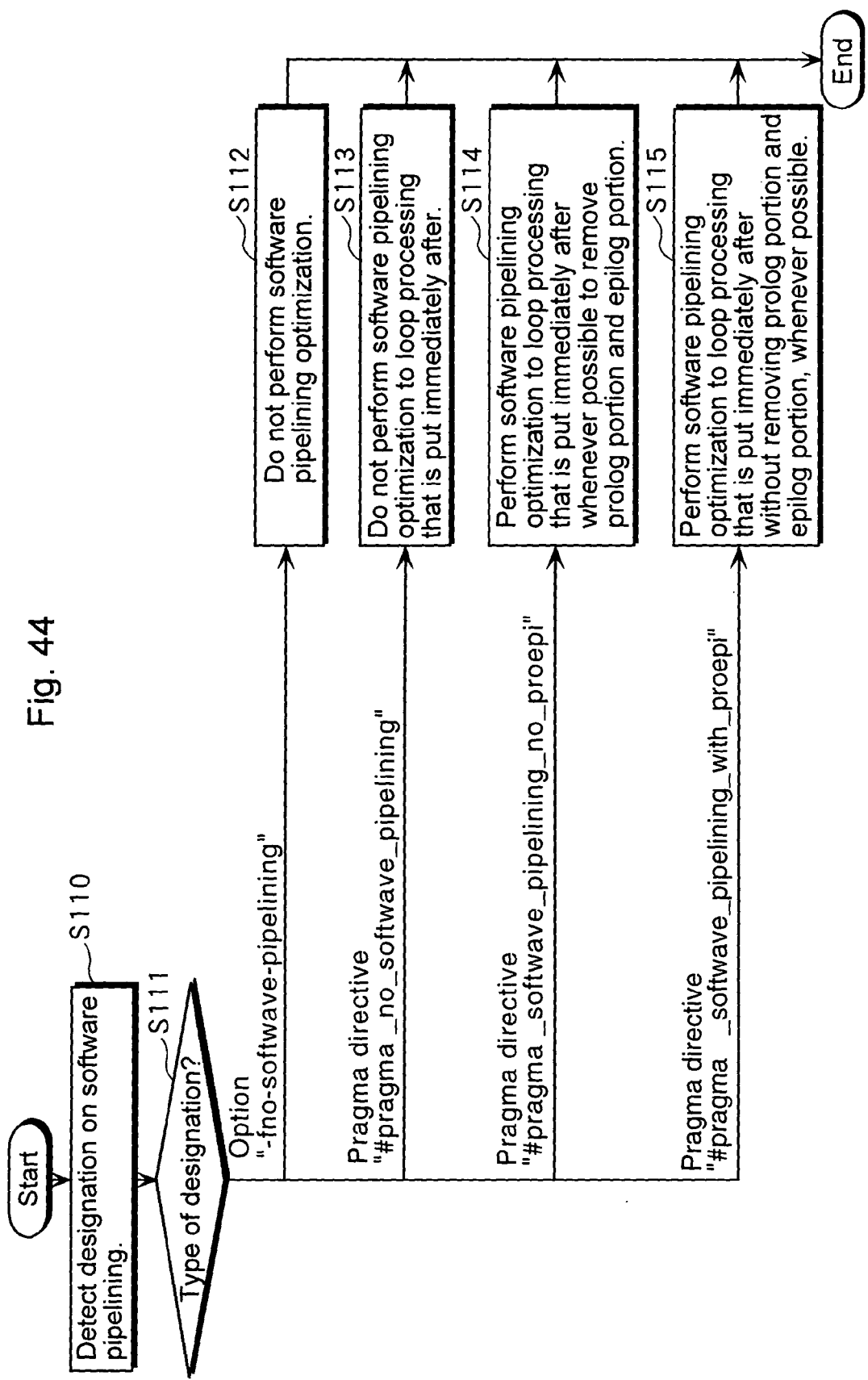
FIG. 44 is a flowchart showing operations of a software pipelining unit.

FIG. 44 is a flowchart showing operations of the software pipelining unit 122. When the option "-fno-software-pipelining" is detected by the analysis unit 110 (Steps S110, S111), the software pipelining unit 122 does not perform the software pipelining optimization to all the loop processing in the source program 101 that is the object (Step S112). Because of this option, it is avoided that the code size increases.

Additionally, the pragma directive "#pragma _no_software _pipelining" is detected by the analysis unit (Steps S110, S111), the software pipelining unit 122, in spite of the option designation, does not perform the software pipelining optimization to one loop processing that is put immediately after this designation (Step S113). Because of this, the code size is reduced.

Furthermore, when the pragma directive "#pragma _software_pipelining_no_proepi" is detected by the analysis unit 110 (Steps S110, S111), the software pipelining unit 122, in spite of the option designation, performs the software pipelining optimization to one loop processing that is put immediately after this designation whenever possible to remove the prolog portion and the epilog portion (Step S114). Because of this, it is achievable to increase the speed and reduce the size.

Moreover, when the pragma directive "#pragma _ software _ pipelining_with_proepi" is detected by the analysis unit 110 (Steps S110, S111), the software pipelining unit 122, in spite of the option designation, performs the software pipelining optimization to one loop processing that is put immediately after this designation without removing the prolog portion and the epilog portion, whenever possible (Step S115). Because of this, the speed increases.

Note that the software pipelining unit 122, to the directive "#pragma _software_pipelining_no_proepi", performs the software pipe lining optimization whenever possible to remove the prolog portion and the epilog portion but does not remove the prolog portion and the epilog portion even if it is possible, to the directive "#pragma _software_pipelining_with_proepi". The reason is that even the loop from which the prolog portion and the epilog portion can be removed, as an example shown in FIG. 45, by restraining the removal of the prolog portion and the epilog portion, the code size increases but it is expectable that the execution speed increases. Additionally, as will be described later, when the smallest iteration number of the loop processing is same as or larger than the number of iterations that overlap by the software pipelining, the software pipelining unit 122 performs the software pipelining optimization.

FIG. 45 is a diagram showing an example of the software pipelining optimization. In addition, in this example, the source program 101 is compiled with a compile option –0 (the optimization of the execution speed and the reduction of the code size) to perform the software pipelining optimization.

As is known from the example of the machine language program 102 shown in the lower middle section of the left column in FIG. 45, when the software pipelining optimization of the default is executed, the codes of the prolog portion and the epilog portion are also removed; the loop number is 101 and the cycle number of the kernel portion is 2; the optimization is performed by the total of 207 cycles and the performance of the loop is improved.

On the other hand, as is known from the source program 101 shown in the upper middle section of the right column in FIG. 45, the directive "#pragma _software_pipelining_with_ proepi" is additionally designated to the source program 101 in the left column and it is an example of restraining the removal of the prolog portion and the epilog portion of the loop. As is known from the example of the machine language program 102 shown in the lower middle section of the right column in FIG. 45, the code size increases compared with the left side because the codes of the prolog portion and the epilog portion are generated, but the loop number decreases to 99 and the cycle number of the kernel portion is 2, and therefore, it is executed by the total of 204 cycles and the execution speed further increases than the case in the left column. By the way, when the prolog portion and the epilog portion can be executed parallel with a peripheral cord, the influence of the decreased speed by the prolog portion and the epilog portion can be concealed.

(The Loop Unrolling Unit 123)

Next, the operations of the loop unrolling unit 123 and their significance are explained. The loop unrolling unit 123, largely divided, performs (1) optimization concerning designation of the loop unrolling and (2) optimization concerning a guarantee for the number of iterations of the loop.

For a start, (1) the optimization concerning the designation of the loop unrolling is explained.

The loop unrolling optimization is one technique to enhance the speed of the loop. Executing plural iterations at the same time enhances the speed of the execution within the loop. The execution of the loop unrolling optimization can enhance the speed of the execution by the generation of and the improved parallel degree of the ldp/stp instruction. However, since the code size increases, and in some cases, shortage of registers generates spill, the performance may decrease on the contrary.

Note that a load pair (a store pair) instruction (ldp/stp instruction) is an instruction that realizes two load instructions (store instructions) in one instruction. Additionally, "spill" means to save the register which is used on the stack temporarily to reserve an available register. In this case, a load/store instruction is generated to save and return the register.

An option and #pragma directives that designate these operations of the loop unrolling optimization are prepared.

The compile option: -fno-loop-unroll

The #pragma directives:

pragma _loop_unroll pragma _no_loop_unroll

Figure 46:
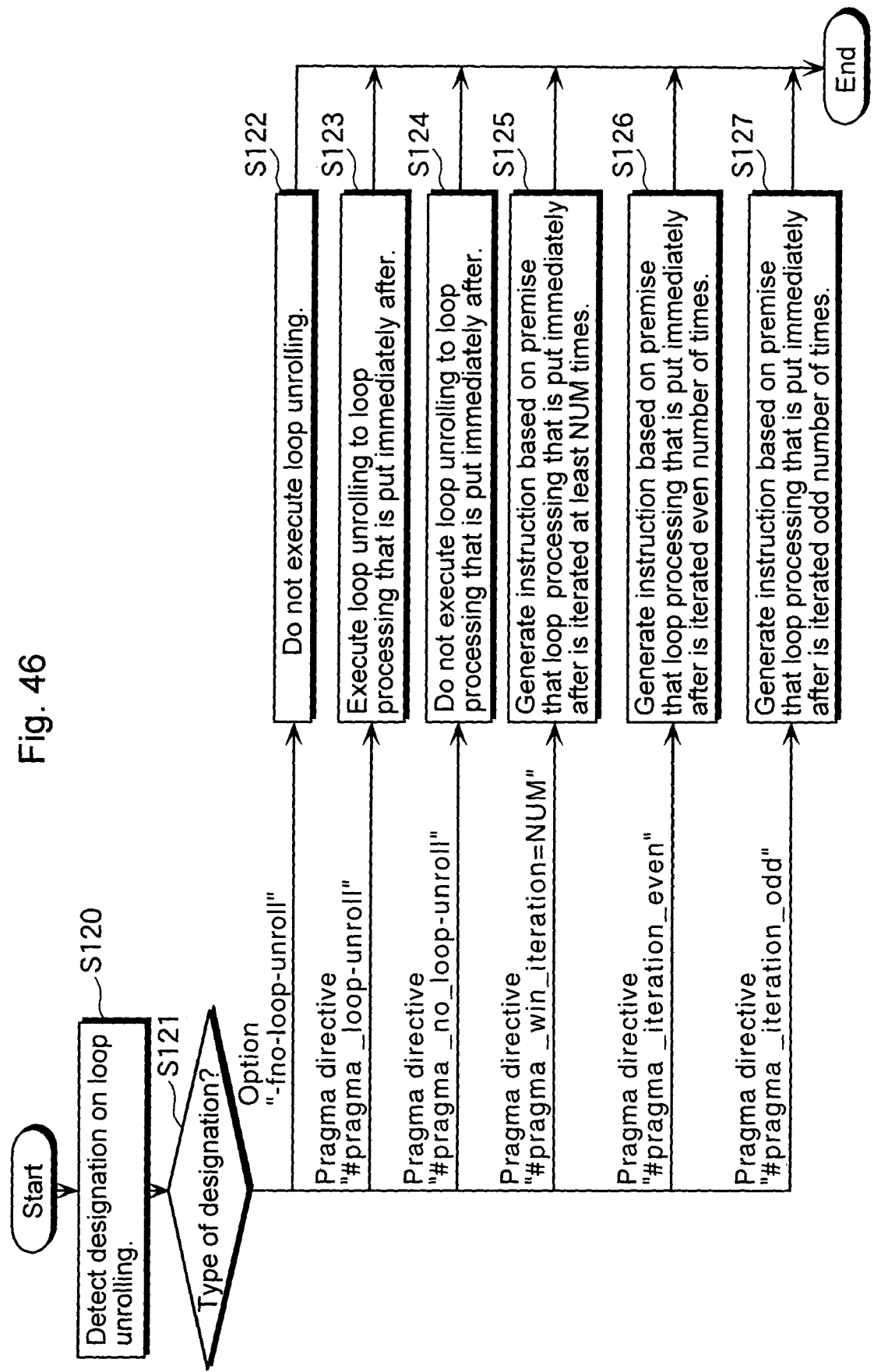
FIG. 46 is a flowchart showing operations of a loop unrolling unit.

FIG. 46 is a flowchart showing operations of the loop unrolling unit 123. When an option "-fno-loop-unroll" is detected by the analysis unit 110 (Steps S120, S121), the loop unrolling unit 123 does not perform the loop unrolling optimization to all the loop processing in the source program 101 that is an object (Step S122). Because of this option, it is avoided that the code size increases.

Additionally, when a pragma directive "#pragma _ loop_unroll" is detected by the analysis unit 110 (Steps S120, S121), the loop unrolling unit 123 performs the loop unrolling optimization to one loop processing that is put immediately after (Step S123). Because of this, the speed increases.

Furthermore, when a pragma directive "#pragma _ no_loop_unroll" is detected by the analysis unit 110 (Steps S120, S121), the loop unrolling unit 123 does not perform the loop unrolling optimization to one loop processing that is put immediately after (Step S124). Because of this, it is avoided that the code size increases.

In addition, when –0/–0t (the optimization that gives a high priority to the execution speed) is designated for optimization level designation, the loop unrolling unit 123 performs the loop unrolling optimization by default if the loop unrolling optimization is possible. When –0s (the optimization that gives a high priority to reduction of the code size) is designated for optimization level designation, the loop unrolling unit 123 does not perform the loop unrolling optimization. Consequently, the user can control the application of the loop unrolling optimization for each loop with the "#pragma _ no_loop_unroll" directive and the "#pragma loop _unroll" directive, combining with these compile options to designate the optimization level.

FIG. 47 is a diagram showing an example of the optimization by the #pragma _loop_unroll directive. In the left column of FIG. 47 is an example of the case of compiling adding only the compile option to designate the optimization level –0; the right column of FIG. 47 is the example of the case of compiling combined with the #pragma _loop_unroll directive.

As is known from the example of the machine language program 102 shown in the lower middle section of the left column in FIG. 47, the software pipelining optimization with the prolog portion and the epilog portion removed is applied. Because of this, three instructions (2 cycles) of the kernel portion are executed 101 times and it takes tatal 207 cycles as a whole.

On the other hand, as is known from the example of the machine language program 102 shown in the lower middle section of the right column, the software pipe ling optimization similarly to the left side is performed and the prolog portion and the epilog portion are removed. On top of that, in the language program 102 in this right column, since the number of loops is reduced by one-half by the loop unrolling optimization, the six instructions (2 cycles) of the kernel portion is executed 52 times or total 110 cycles as a whole, the speed increases.

Next, a method for using the loop unrolling optimization more effectively by generation of a pair memory access instruction (ldp/stp) is shown.

In the loop unrolling optimization, the present iteration and the next iteration are executed at the same time; the following load/store of data in the successive region may be generated.

ld r1,(r4);;

ld r2,(r4,4);;

If the data to be accessed is always aligned in 8 bytes and placed, the following pair access memory instruction (ldp instruction) can be generated.

ldp r1:r2,(r4+);;

FIG. 48 is a diagram showing an example of using the loop unrolling optimization more effectively by generating the pair memory access instruction (lds/stp). Here, the software pipelining optimization is applied.

In the example in the right column of FIG. 48, as is known from the example of the machine language program 102 shown in the lower middle section, the number of loops is reduced by one-half by the loop unrolling optimization. Moreover, clearly specifying the address in which pointer variables pa and pb are aligned in 8 bytes by using a #pragma _ align_local_pointer directive, the load pair (the store pair) instruction is generated. Because of these optimizations, in an example of the left column, five instructions in 3 cycles of the kernel portion are executed 101 times and the total is 308 cycles as a whole; in an example of the right column, 7 instructions in 3 cycles of the kernel portion are executed 51 times and the total is 158 cycles as a whole and therefore the speed increases.

Next, (2) the optimization concerning the guarantee for the number of iterations of the loop is explained. To describe the program, when the number of loops cannot be specified in the compiler 100, each optimization to increase the speed of the loop cannot be performed effectively.

Consequently, the user can make the optimizations to increase the speed of the loop of the software pipelining and the like performed more effectively by providing information of the number of loops by the below-mentioned #pragma directives.

The #pragma directives:

pragma _min_iteration=NUM pragma _iteration_even pragma _iteration_odd

In FIG. 46, the pragma directive "#pragma _ min_iteration=NUM" is detected by the analysis unit 110 (Steps S120, S121), the loop unrolling unit 123 performs the loop unrolling optimization based on the premise that one loop processing that is put immediately after is iterated at least NUM times (Step S125). For example, when the minimum iteration numbers guaranteed are equivalent to or larger than the number of the development by the loop unrolling, the loop unrolling unit 123 executes the loop unroll of the loop processing. Because of this, the increase of the speed and the reduction of the size are attempted.

Additionally, the pragma directive "#pragma _iteration _ even" is detected (Steps S120, S121), the loop unrolling unit 123 performs the loop unrolling optimization based on the premise that one loop processing that is put immediately after is iterated an even number of times (Step S126). Because of this, the execution speed increases.

Furthermore, the pragma directive "#pragma _iteration _ odd" is detected (Steps S120, S121), the loop unrolling unit 123 performs the loop unrolling optimization based on the premise that one loop processing that is put immediately after is iterated an odd number of times (Step S127). Because of this, the execution speed increases.

In addition, when the value of 1 or more is designated by the "#pragma _min_iteration" directive, there is an effect that an escape code to be generated for the case of never passing through the loop can be removed. Moreover, when the loop unrolling optimization is expected to the loop whose iteration is unknown, if it is decided whether an even number loop or an odd number loop, by using the "_iteration_even/#pragma _ iteration_odd" directive, it is possible to apply the loop unrolling optimization and therefore it is expectable that the execution speed increases.

FIG. 49 is a diagram showing an example of the optimization by the "#pragma _min_iteration" directive. Here, in the loop whose iteration numbers are unknown, the service result of the "#pragma _min_iteration" directive is shown. By the way, to compare the cycles, the value of the argument end is assumed to be 100.

In the left column of FIG. 49, as is known from the example of the machine language program 102 shown in the lower middle section, since the loop numbers are unknown, in the case of never executing the loop, a "cmple/br" instruction (an escape code) to jump over the main body of the loop is generated. Moreover, since it is impossible to generate the loop instruction, the loop is generated by an addition instruction, a comparison instruction, and a jump instruction. Since the loop unit iterates the 7 instructions in 4 cycles 100 times, the total number of the cycles is 405 as a whole.

On the other hand, in the right column of FIG. 49, as is known from the example of the source program 101 shown in the upper middle section, the iteration number is unknown, but iterating at least 4 times is designated by the "#pragma _ min_iteration" directive. Because of this, there is no need to consider the case that the number of the loops is 0, it is not necessary for the loop unrolling unit 123 to generate the escape code.

Additionally, the loop unrolling unit 123 can generate the loop instruction, considering the minimum number of the loops. For example, the minimum iteration number guaranteed (4) is larger than the number of development by the loop unrolling (3 cycles in this example), the loop unrolling unit 123 executes the loop unroll.

Further, in this example, the software pipelining optimization is further possible. This is because the software pipelining unit 122 performs the software pipelining optimization since the minimum iteration number guaranteed (4) is equivalent to or larger than the number of iterations that overlap by the software pipelining.

As is known from the example of the machine language program 102 shown in the lower middle section of the right column, since the loop unit iterates the 5 instructions in 3 cycles 101 times, the number of the cycles is total 308 as a whole and therefore the increase of the execution speed and the reduction of the size are realized.

FIG. 50 and FIG. 51 are diagrams showing an example of the optimization by the "#pragma iteration_even/#pragma _ iteration_odd" directive. FIG. 50 is a diagram showing an example of the source program 101 (the left column) and an example of the machine language program 102 generated from there (the right column). As is known from FIG. 50, when the actual number of the loops is unknown, the loop unrolling optimization cannot be applied. This is because different codes are generated by the loop unrolling optimization in the case that the number of the loops is even and in the case that the number of the loops is odd.

As is shown in FIG. 51, however, in the case of the loop whose iteration number is unknown, it is possible to apply the loop unrolling optimization by designating whether it is the loop of even number or the loop of odd number.

In the left column of FIG. 51, since the "#pragma _iteration_even" directive designates that the number of the loops is even, the loop unrolling optimization by the loop unrolling unit 123 is performed and a code for even number is generated as is known from the example of the machine language program 102 shown in the lower middle section of the left column.

Furthermore, in the right column of FIG. 51, since the "#pragma _iteration_odd" directive designates that the number of the loops is odd, the loop unrolling optimization by the loop unrolling unit 123 is performed and a code for odd number is generated as is known from the example of the machine language program 102 shown in the lower middle section of the right column. As is known from the example of this right column, the generation codes in the case of even number shown in the left column are almost same as those in the case of odd number in the initialization unit and the loop unit; the code that executes the last one time of the loops is generated in the later processing unit.

As just described, even if the number of loops is unknown, by guaranteeing whether it is an even number or an odd number, the loop unrolling unit 123 can perform the loop unrolling optimization and the execution speed increases because of this.

(The "If" Conversion Unit 124)

Next, the operations of the "if" conversion unit 124 and their significance are explained.

In ordinary cases, when the "if" construction of C language program is compiled, a branch instruction (a br instruction) is generated. On the other hand, the "if" conversion is rewriting the "if" construction of the C language program only to the execution instruction with conditions without using the branch instruction. Because of this, since the execution order is fixed (the execution is done in sequence), the irregularities of the pipeline are avoided and therefore the execution speed can increase. Note that the execution instruction with the conditions is the instruction that is executed only when the conditions included in the instruction (the predicates) agree with the state (the condition flag) of the processor 1.

By the "if" conversion, the execution time of the "if" construction in the worst case is shortened but its execution time in the best case becomes same as the worst execution time (after the shortening). Because of this, there are the case that the "if" conversion should be applied and the case that the "if" conversion should not be applied depending on the characteristics of the "if" construction (frequency that the conditions hold or that the conditions do not hold and the execution cycle numbers for each path).

For this reason, the user can give directives to apply or not to apply the "if" conversion by a compile option or instructions.

The compile option: -fno-if-conversion

The #pragma directives:

pragma _if_conversion pragma _no_if_conversion

By the way, when the option and the pragma directives overlap or contradict, the pragma directives get a higher priority.

Figure 52:
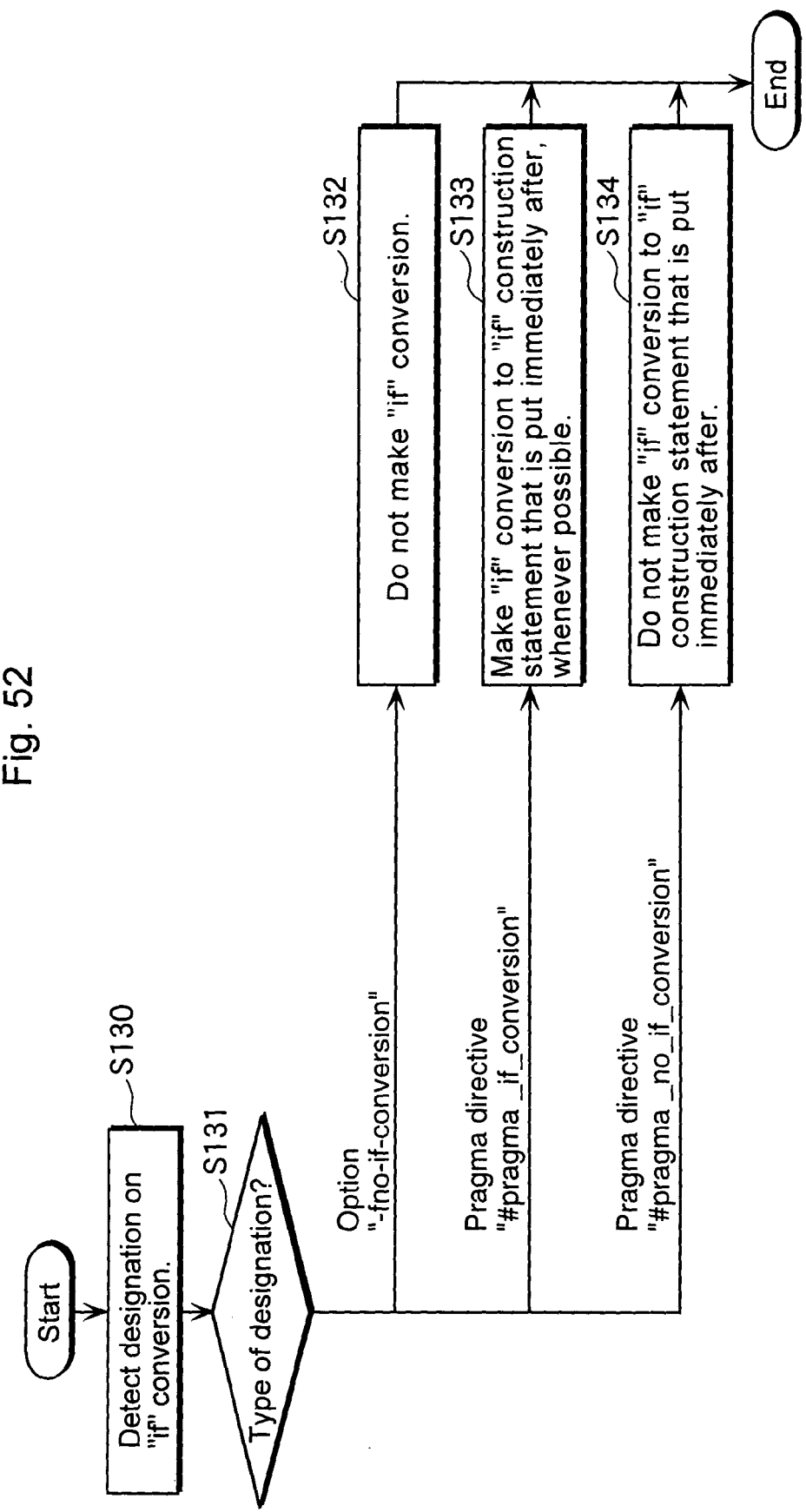
FIG. 52 is a flowchart showing operations of an "if" conversion unit.

FIG. 52 is a flowchart showing the operations of the "if" conversion unit 124. When the option "-fno-if-conversion" is detected by the analysis unit 110 (Steps S130, S131), the "if" conversion unit 124 does not make the "if" conversion to all the "if" construction statements in the source program 101 that is the object (Step S132). In addition, when the option is not detected, the "if" conversion unit 124 converts the "if" construction statement by the "if" conversion when the "if" construction statement is possible to convert by the "if" conversion and its time of the worst case is short compared with that before the "if" conversion.

Additionally, the pragma directive "#pragma_if_conversion" is detected by the analysis unit 110 (Steps S130, S131), the "if" conversion unit 124, in spite of the option designation, makes the "if" conversion to one "if" construction statement that is put immediately after whenever possible (Step S133). Because of this, the speed increases.

Furthermore, the program directive "#pragma _no_if_conversion" is detected by the analysis unit 110 (Steps S130, S131), the "if" conversion unit 124, in spite of the option designation, does not make the "if" conversion to one "if" construction statement that is put immediately after (Step S134). Because of this, the speed increases.

FIG. 53 is a diagram showing the examples of the machine language program 102 in the case of being compiled by the "#pragma _no_if_conversion" directive and in the case of being compiled by the "#pragma _if_conversion" directive.

In the left column of FIG. 53, as is known from the example of the machine language program 102 in the lower middle section, the branch instruction is generated by restraining the "if" conversion (the number of execution cycles: 5 or 7, the code size: 12 bytes).

On the other hand, in the right column of FIG. 53, as is known from the example of the machine language program 102 in the lower middle section, by making the "if" conversion by the # pragma directive, the branch instruction is replaced by the execution instruction with the condition (the instruction with the predicate) (the number of execution cycles: 4, the code size: 8 bytes) As just described, by making the "if" conversion, the execution speed ratio, 1.25 times and the code size ratio, 67% are achieved.

(The Pair Instruction Generation Unit 125)

Next, the operations of the pair instruction generation unit 125 and their significance are explained. The pair instruction generation unit 125, largely divided, performs (1) optimization concerning the configuration of the alignment of the array and the construction and (2) optimization concerning the guarantee of alignment of the pointer and the local pointer of the dummy argument.

For a start, (1) the optimization concerning the configuration of the alignment of the array and the construction is explained.

The user can designates the alignment of the head addresses of the array and the construction, using the following options. Arrangement of the alignment makes the pairing (execution of the transfer between the two registers and the memory by one instruction) of the memory access instructions possible and the increase of the execution speed is expectable. On the other hand, the value of the alignment is enlarged; unused region of the data grows; and there is a possibility that the data size increases.

The compile options:

-falign_char_array=NUM (NUM=2, 4, or 8)

-falign_short_array=NUM (NUM=4 or 8)

-falign_int_array=NUM (NUM=8)

-falign_all_array=NUM (NUM=2, 4, or 8)

-falign_struct=NUM (NUM=2, 4, or 8)

The above-mentioned options are, in sequence from the above, the char-type array, the short-type array, the int-type array, the arrays of all the 3 data types, and the alignment of the structure. Additionally, "NUM" shows the size (in bite) to be aligned.

Figure 54:
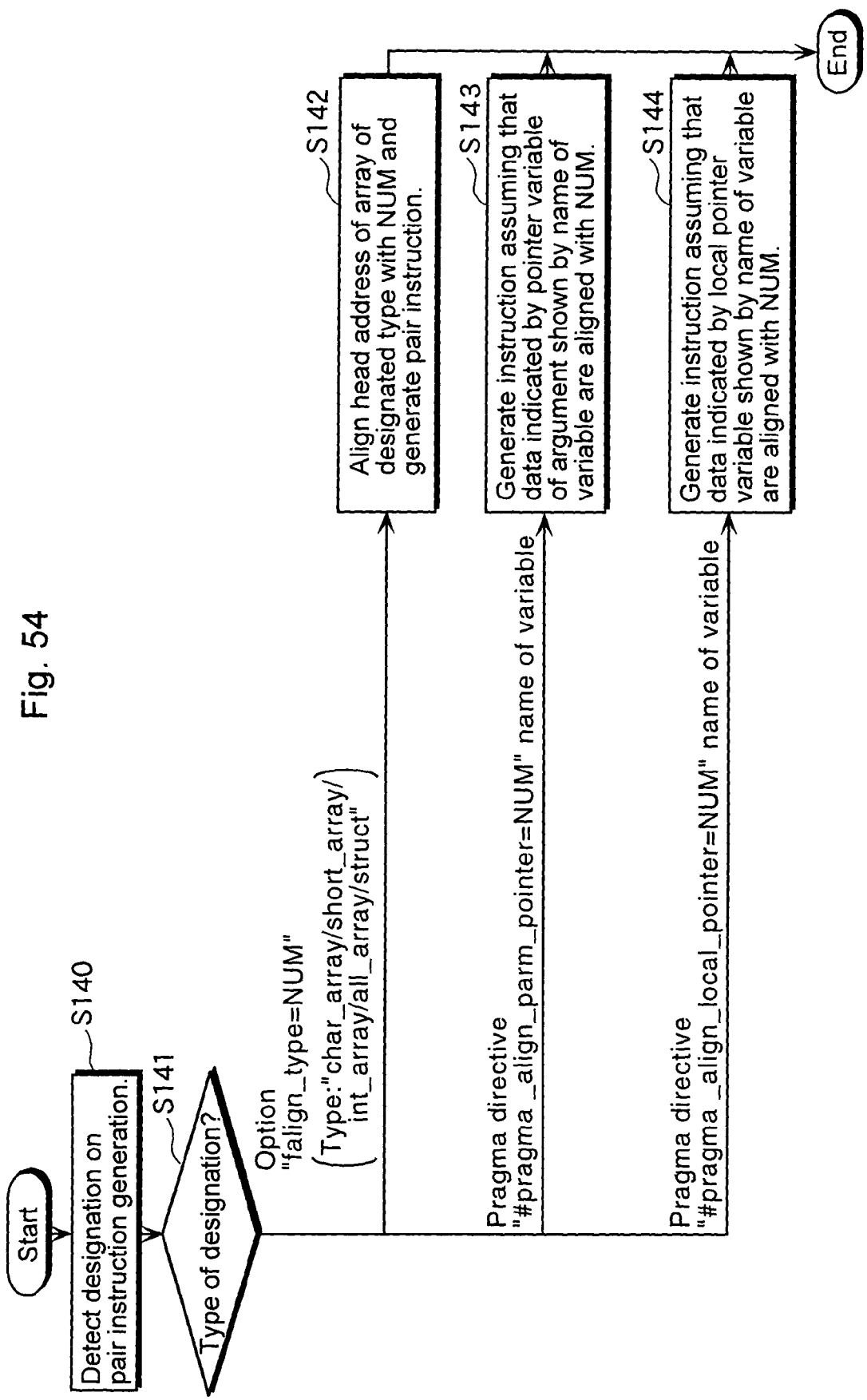
FIG. 54 is a flowchart showing operations of a pair instruction generation unit.

FIG. 54 is a flowchart showing the operations of the pair instruction generation unit 125. When any of the above-mentioned options is detected by the analysis unit (Steps S140, S141), the pair instruction generation unit 125, as for all the arrays or the structures of the designated types declared by the source program 101 that is the object, places the arrays or the constructions in the memory in order that their head address become the alignment of the designated NUM bytes; and the pair instruction generation unit 125 executes the paring (generation of the instruction for executing the transfer between the two registers and the memory in parallel) to the instruction to access the arrays or the structures whenever possible (Step S142). Because of this, the execution speed increases.

FIG. 55 is a diagram showing the assembly codes in the case of compiling a sample program without an option and in the case of compiling the sample program with the option "-falign-short-array=4".

In the case of without the option shown in the left column of FIG. 55, as is known from the example of the machine language program 102 shown in the lower middle section, since the alignment is unknown, it is impossible to execute the pairing (execution of the transfer between the two registers and the memory by one instruction) of the load instructions (the number of the execution cycles: 25, the code size: 22).

On the other hand, in the case of with the option shown in the right column of FIG. 55, since the array is aligned with 4 bytes, as is known from the example of the machine language program 101 shown in the lower middle section, the paring is executed by the optimization unit 120 (the number of the execution cycles: 15, the code size: 18). As just described, by the designation of the alignment, the execution speed ratio, 1.67 times and the code size ratio, 82% are achieved.

Next, (2) the optimization concerning the guarantee of alignment of the pointer and the local pointer of the dummy argument by the pair instruction generation unit 125 is explained.

By the user's guarantee of the alignment of the data indicated by the pointer variable of the function argument and the alignment of the data indicated by the local pointer variable using the following pragma directives, the pairing of the memory access instructions by the optimization unit 120 becomes possible, and therefore the increase of the execution speed is expectable.

The #pragma directives:

pragma _align_parm_pointer=NUM the name of a variable [, the name of a variable, . . . ]

pragma _align_local_pointer=NUM the name of a variable [, the name of a variable, . . . ]

Note that "NUM" represents the size to be aligned (2, 4, or 8 bytes). Additionally, when the data indicated by the pointer variable guaranteed by the above-mentioned #pragma directives are not aligned in the designated bite boundary, the normal operation of the program is not guaranteed.

In FIG. 54, when the pragma directive "#pragma _align_parm_pointer=NUM the name of a variable [, the name of a variable, . . . ]" is detected by the analysis unit 110 (Steps S140, S141), the pair instruction generation unit 125 assumes that the data indicated by the pointer variable of the argument shown by "the name of a variable" are aligned with NUM bytes at the time of passage of the argument and executes the paring to the instructions that access to the array whenever possible (Step S143). Because of this, the execution speed increases.

Furthermore, when the pragma directive "#pragma _align_local_pointer=NUM the name of a variable [, the name of a variable, . . . ]" is detected by the analysis unit 110 (Steps S140, S141), the pair instruction generation unit 125 assumes that the data indicated by the local pointer variable shown by "the name of a variable" are always aligned with NUM bytes within the function and executes the paring to the instructions that access to the array whenever possible (Step S144). Because of this, the execution speed increases.

FIG. 56 is a diagram shown an example of optimization by the pragma directive "#pragma _align_parm_pointer=NUM the name of a variable [, the name of a variable, . . . ]".

As shown in the left column of FIG. 56, when "#pragma _align_parm_pointer" directive is not given, since the alignment of the data indicated by the pointer variable src is unknown, each data is loaded individually as is known from the example of the machine language program 102 shown in the lower middle section (the number of the execution cycles: 160, the code size: 24 bytes).

On the other hand, as shown in the right column of FIG. 56, when the #pragma directive is given, the data are aligned in the 4-bite boundary, the pairing of reading memory out is executed as is known from the example of the machine language program 102 shown in the lower middle section (the number of the execution cycles: 107, the code size: 18 bytes). As just described, by designating the alignment, the execution speed ratio, 1.50 times and the code size ratio, 43% are achieved.

FIG. 57 is a diagram showing an example of the optimization by the pragma directive "#pragma _ align_local_pointer=NUM the name of a variable [, the name of a variable, . . . ]".

As shown in the left column of FIG. 57, when "#pragma _ align_local_pointer" directive is not given, since the alignment of the data indicated by the pointer variables "from" and "to" is unknown, each array element is individually loaded as is known form the example of the machine language program 102 shown in the lower middle section (the number of the execution cycles: 72, the code size: 30).

On the other hand, as shown in the right column of FIG. 57, by giving the "#pragma _align_parm_pointer" directive, the pairing to read the memory out becomes possible using the fact that the pointer variables "from" and "to" are aligned in the 4-bite boundary as is known from the example of the machine language program 102 shown in the lower middle section. (The number of the execution cycles: 56, the code size: 22). As just described, by designating the alignment, the execution speed ratio, 1.32 times and the code size ratio, 73% are achieved.

What is claimed is:

1. A computing device comprising:
a processor; and
a compiler apparatus for translating a source program into a machine language program, said compiler apparatus comprising:
a directive acquisition unit operable to acquire a directive for optimizing a machine language program to be generated; and
an optimization unit operable to perform optimization by generating a sequence of machine language instructions following the acquired directive,
wherein the directive acquisition unit detects a directive with a specific value for guaranteeing that data indicated by a pointer variable shown by the name of a specific variable in the source program is aligned by the specific value in a memory region,
wherein the optimization unit performs the optimization to align the data indicated by the pointer variable in the memory region by the specific value of alignment, and
wherein the optimization unit generates a pair instruction for transferring two kinds of data at the same time regarding a memory access instruction for accessing the data to be aligned in the memory region.

2. The computing device according to claim 1, wherein the pointer variable is an argument.

3. The computing device according to claim 1, wherein the pointer variable is a local variable.

4. A computing device comprising:
a processor; and
a compiler apparatus for translating a source program into a machine language program, said compiler apparatus comprising:
a directive acquisition unit operable to acquire a directive for optimizing a machine language program to be generated; and
an optimization unit operable to perform optimization by generating a sequence of machine language instructions following the acquired directive,
wherein the directive acquisition unit detects a directive with a minimum number for guaranteeing a minimum number of iterations of specific loop processing when the number of iterations of specific loop processing is not specified in the source program, and
wherein the optimization unit restrains generation of an escape code that is needed when the minimum number is a value equal to 1 or more.

5. A computing device comprising:
a processor; and
a compiler apparatus for translating a source program into a machine language program, said compiler apparatus comprising:
a directive acquisition unit operable to acquire a directive for optimizing a machine language program to be generated; and
an optimization unit operable to perform optimization by generating a sequence of machine language instructions following the acquired directive,
wherein the directive acquisition unit detects a directive with a specific number for guaranteeing a specific number of iterations of specific loop processing in the source program, the specific number in the directive being a designated value of the number of iterations of specific loop processing when the number of iterations of specific loop processing is not specified in the source program,
wherein the optimization unit performs the optimization by loop unrolling when the specific number is a value equal to or more than an unrolling number, and
wherein the unrolling number denotes a factor indicating how many times a code size of a loop is increased during loop unrolling.

6. A computing device comprising:
a processor; and
a compiler apparatus for translating a source program into a machine language program, said compiler apparatus comprising:
a directive acquisition unit operable to acquire a directive for optimizing a machine language program to be generated; and
an optimization unit operable to perform optimization by generating a sequence of machine language instructions following the acquired directive,
wherein the directive acquisition unit detects a directive for guaranteeing that the number of iterations of specific loop processing in the source program is one of a set of values, and
wherein the optimization unit performs the optimization by loop unrolling depending on whether the guaranteed set of values is a set of only even values or a set of only odd values.

7. A computer-readable recording medium having a compiler stored thereon for causing a computer to translate a source program into a machine language program, said compiler comprising:
a directive acquisition unit operable to acquire a directive for optimizing a machine language program to be generated; and
an optimization unit operable to perform optimization by generating a sequence of machine language instructions following the acquired directive,
wherein the directive acquisition unit detects a directive with a specific value for guaranteeing that data indicated by a pointer variable shown by the name of a specific variable in the source program is aligned by the specific value in a memory region, wherein the optimization unit performs the optimization to align the data indicated by the pointer variable in the memory region by the specific value of alignment, and wherein the optimization unit generates a pair instruction for transferring two kinds of data at the same time regarding a memory access instruction for accessing the data to be aligned in the memory region.

8. A computer-readable recording medium having a compiler stored thereon for causing a computer to translate a source program into a machine language program, said compiler comprising:

a directive acquisition unit operable to acquire a directive for optimizing a machine language program to be generated; and an optimization unit operable to perform optimization by generating a sequence of machine language instructions following the acquired directive, wherein the directive acquisition unit detects a directive with a minimum number for guaranteeing a minimum number of iterations of specific loop processing when the number of iterations of specific loop processing is not specified in the source program, and wherein the optimization unit restrains generation of an escape code that is needed when the minimum number is a value equal to 1 or more.

9. A computer-readable recording medium having a compiler stored thereon for causing a computer to translate a source program into a machine language program, said compiler comprising:

a directive acquisition unit operable to acquire a directive for optimizing a machine language program to be generated; and an optimization unit operable to perform optimization by generating a sequence of machine language instructions following the acquired directive, wherein the directive acquisition unit detects a directive with a specific number for guaranteeing a specific number of iterations of specific loop processing in the source program, the number in the directive being a designated value of the number of iterations of specific loop processing when the number of iterations of specific loop processing is not specified in the source program, wherein the optimization unit performs the optimization by loop unrolling when the specific number is a value equal to or more than an unrolling number, and wherein the unrolling number denotes a factor indicating how many times a code size of a loop is increased during loop unrolling.

10. A computer-readable recording medium having a compiler stored thereon for causing a computer to translate a source program into a machine language program, said compiler comprising:

a directive acquisition unit operable to acquire a directive for optimizing a machine language program to be generated; and an optimization unit operable to perform optimization by generating a sequence of machine language instructions following the acquired directive, wherein the directive acquisition unit detects a directive for guaranteeing that the number of iterations of specific loop processing in the source program is one of a set of values, and wherein the optimization unit performs the optimization by loop unrolling depending on whether the guaranteed set of values is a set of only even values or a set of only odd values.

* * * * *